United States Patent
Dangi et al.

(10) Patent No.: US 10,114,832 B1
(45) Date of Patent: Oct. 30, 2018

(54) GENERATING A DATA STREAM WITH A PREDICTABLE CHANGE RATE

(71) Applicant: EMC IP Holding Company LLC, Hopkinton, MA (US)

(72) Inventors: Salil Dangi, Mission Viejo, CA (US); James Zarbock, Lake Forest, CA (US); Ernest Daza, Rancho Santa Margarita, CA (US); Scott H. Ogata, Lake Forest, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 917 days.

(21) Appl. No.: 14/489,363

(22) Filed: Sep. 17, 2014

(51) Int. Cl.
G06F 17/30 (2006.01)
G06F 3/06 (2006.01)

(52) U.S. Cl.
CPC ...... G06F 17/30156 (2013.01); G06F 3/0641 (2013.01)

(58) Field of Classification Search
CPC .................. G06F 17/30156; G06F 3/0641
See application file for complete search history.

(56) References Cited

U.S. PATENT DOCUMENTS

| | | | | |
|---|---|---|---|---|
| 6,307,938 B1 * | 10/2001 | Matyas, Jr. | ............... | G06F 7/72 380/44 |
| 6,430,732 B1 * | 8/2002 | Hwang | ............... | G06F 17/5072 716/121 |
| 8,112,802 B2 * | 2/2012 | Hadjieleftheriou | ............... | G06F 21/6227 707/687 |
| 8,290,150 B2 * | 10/2012 | Erhart | ............... | H04L 9/302 380/44 |
| 8,638,926 B2 * | 1/2014 | Schneider | ............... | H04L 9/085 380/277 |
| 8,660,994 B2 * | 2/2014 | Slater | ............... | G06F 11/1453 707/664 |
| 2010/0017436 A1 | 1/2010 | Wolge | | |
| 2011/0119432 A1 * | 5/2011 | Yoon | ............... | G11C 7/1006 711/103 |
| 2011/0299581 A1 | 12/2011 | Le-Gall | | |
| 2012/0233135 A1 * | 9/2012 | Tofano | ............... | G06F 17/30489 707/692 |

(Continued)

OTHER PUBLICATIONS

Author Unknown, Mac Performance Guide, Understanding Compressible vs Incompressible Data, May 6, 2012.

(Continued)

*Primary Examiner* — Scott A. Waldron
*Assistant Examiner* — Andalib F Lodhi
(74) *Attorney, Agent, or Firm* — Van Pelt, Yi & James LLP

(57) ABSTRACT

Generating a data stream with a predictable change rate is disclosed, including: receiving a change rate parameter; and using the change rate parameter to provide a modified data stream that differs from a corresponding unmodified non-deduplicatable data stream by an amount determined based at least in part on the change rate parameter, including by: modifying at least a portion of a plurality of data blocks associated with the non-deduplicatable data stream to obtain a corresponding portion of the modified data stream, wherein a data block of the plurality of data blocks is associated with a block size that is based on a segmenting attribute associated with a storage destination.

20 Claims, 54 Drawing Sheets

(56) References Cited

U.S. PATENT DOCUMENTS

2014/0279874 A1* 9/2014 Reiter ............... G06F 11/3414
707/610

OTHER PUBLICATIONS

Eric W. Weisstein, Goldbach Conjecture, Jun. 7, 2000, mathworld.wolfram.com/goldbachconjecture.html.
Matt Bach, Puget Systems, SSDs: Advertised vs. Actual Performance, Jan. 25, 2016, pugetsystems.com/labs/articles/SSDs-Advertised-vs-Actual- Performance-179/.
M. Ram Murty, Prime Numbers and Irreducible Polynomials, May 2002, The Mathematical Association of America, Monthly 109, p. 452.

* cited by examiner

Sample Primes that are a Member of the Set PrimeM

| Decimal | Hexadecimal | Category | Reason For Categorization |
|---|---|---|---|
| 16,975,109 | 01 03 05 05 | Bad | All bytes are primes but 05 is repeated |
| 16,975,117 | 01 03 05 0D | Good | All bytes are primes with no repeats |
| 16,975,139 | 01 03 05 23 | Bad | 23 hex (35 decimal) is not a prime |
| 16,975,157 | 01 03 05 35 | Good | All bytes are primes with no repeats |
| 16,975,183 | 01 03 05 4F | Good | All bytes are primes with no repeats |
| 16,975,207 | 01 03 05 67 | Good | All bytes are primes with no repeats |
| 16,975,213 | 01 03 05 6D | Good | All bytes are primes with no repeats |
| 16,975,223 | 01 03 05 77 | Bad | 77 hex (119 decimal) is not a prime |
| 16,975,253 | 01 03 05 95 | Good | All bytes are primes with no repeats |
| 16,975,261 | 01 03 05 9D | Good | All bytes are primes with no repeats |
| 16,975,307 | 01 03 05 CB | Bad | CB hex (203 decimal) is not a prime |
| 16,975,331 | 01 03 05 E3 | Good | All bytes are primes with no repeats |
| 16,975,337 | 01 03 05 E9 | Good | All bytes are primes with no repeats |
| 16,975,349 | 01 03 05 F5 | Bad | F5 hex (245 decimal) is not a prime |
| 16,975,363 | 01 03 06 03 | Bad | All bytes are primes but 03 is repeated |
| 16,975,369 | 01 03 06 09 | Bad | 09 hex (9 decimal) is not a prime |
| 16,975,393 | 01 03 06 21 | Bad | 06 and 21 hex (6 and 33 decimal) are not primes |
| 50,661,131 | 03 05 07 0B | Good | All bytes are primes with no repeats |
| 50,661,133 | 03 05 07 0D | Good | All bytes are primes with no repeats |
| 50,661,167 | 03 05 07 2F | Good | All bytes are primes with no repeats |
| 50,661,187 | 03 05 07 43 | Good | All bytes are primes with no repeats |
| 50,661,211 | 03 05 07 5B | Bad | 5B hex (91 decimal) is not a prime |
| 50,661,217 | 03 05 07 61 | Good | All bytes are primes with no repeats |
| 50,661,227 | 03 05 07 6B | Good | All bytes are primes with no repeats |
| 50,661,229 | 03 05 07 6D | Good | All bytes are primes with no repeats |
| 50,661,263 | 03 05 07 8F | Bad | 8F hex (143 decimal) is not a prime |
| 50,661,283 | 03 05 07 A3 | Good | All bytes are primes with no repeats |
| 50,661,301 | 03 05 07 B5 | Good | All bytes are primes with no repeats |
| 50,661,307 | 03 05 07 BB | Bad | BB hex (187 decimal) is not a prime |
| 50,661,323 | 03 05 07 CB | Bad | CB hex (203 decimal) is not a prime |
| 50,661,329 | 03 05 07 D1 | Bad | D1 hex (209 decimal) is not a prime |
| 50,661,349 | 03 05 07 E5 | Good | All bytes are primes with no repeats |
| 50,661,371 | 03 05 07 FB | Good | All bytes are primes with no repeats |
| 50,661,379 | 03 05 08 03 | Bad | 08 is not a prime and 03 is repeated |

FIG. 6

1,032 Bytes of Sample Sequence Data Generated Using an Unconstrained primeM
seed=0E00000E, primeM=01000201, Data is compressible

| | | | | | |
|---|---|---|---|---|---|
| 0F00020F | 10000410 | 11000611 | 12000812 | 13000A13 | 14000C14 |
| 15000E15 | 16001016 | 17001217 | 18001418 | 19001619 | 1A00181A |
| 1B001A1B | 1C001C1C | 1D001E1D | 1E00201E | 1F00221F | 20002420 |
| 21002621 | 22002822 | 23002A23 | 24002C24 | 25002E25 | 26003026 |
| 27003227 | 28003428 | 29003629 | 2A00382A | 2B003A2B | 2C003C2C |
| 2D003E2D | 2E00402E | 2F00422F | 30004430 | 31004631 | 32004832 |
| 33004A33 | 34004C34 | 35004E35 | 36005036 | 37005237 | 38005438 |
| 39005639 | 3A00583A | 3B005A3B | 3C005C3C | 3D005E3D | 3E00603E |
| 3F00623F | 40006440 | 41006641 | 42006842 | 43006A43 | 44006C44 |
| 45006E45 | 46007046 | 47007247 | 48007448 | 49007649 | 4A00784A |
| 4B007A4B | 4C007C4C | 4D007E4D | 4E00804E | 4F00824F | 50008450 |
| 51008651 | 52008852 | 53008A53 | 54008C54 | 55008E55 | 56009056 |
| 57009257 | 58009458 | 59009659 | 5A00985A | 5B009A5B | 5C009C5C |
| 5D009E5D | 5E00A05E | 5F00A25F | 6000A460 | 6100A661 | 6200A862 |
| 6300AA63 | 6400AC64 | 6500AE65 | 6600B066 | 6700B267 | 6800B468 |
| 6900B669 | 6A00B86A | 6B00BA6B | 6C00BC6C | 6D00BE6D | 6E00C06E |
| 6F00C26F | 7000C470 | 7100C671 | 7200C872 | 7300CA73 | 7400CC74 |
| 7500CE75 | 7600D076 | 7700D277 | 7800D478 | 7900D679 | 7A00D87A |
| 7B00DA7B | 7C00DC7C | 7D00DE7D | 7E00E07E | 7F00E27F | 8000E480 |
| 8100E681 | 8200E882 | 8300EA83 | 8400EC84 | 8500EE85 | 8600F086 |
| 8700F287 | 8800F488 | 8900F689 | 8A00F88A | 8B00FA8B | 8C00FC8C |
| 8D00FE8D | 8E01008E | 8F01028F | 90010490 | 91010691 | 92010892 |
| 93010A93 | 94010C94 | 95010E95 | 96011096 | 97011297 | 98011498 |
| 99011699 | 9A01189A | 9B011A9B | 9C011C9C | 9D011E9D | 9E01209E |
| 9F01229F | A00124A0 | A10126A1 | A20128A2 | A3012AA3 | A4012CA4 |
| A5012EA5 | A60130A6 | A70132A7 | A80134A8 | A90136A9 | AA0138AA |
| AB013AAB | AC013CAC | AD013EAD | AE0140AE | AF0142AF | B00144B0 |
| B10146B1 | B20148B2 | B3014AB3 | B4014CB4 | B5014EB5 | B60150B6 |
| B70152B7 | B80154B8 | B90156B9 | BA0158BA | BB015ABB | BC015CBC |
| BD015EBD | BE0160BE | BF0162BF | C00164C0 | C10166C1 | C20168C2 |
| C3016AC3 | C4016CC4 | C5016EC5 | C60170C6 | C70172C7 | C80174C8 |
| C90176C9 | CA0178CA | CB017ACB | CC017CCC | CD017ECD | CE0180CE |
| CF0182CF | D00184D0 | D10186D1 | D20188D2 | D3018AD3 | D4018CD4 |
| D5018ED5 | D60190D6 | D70192D7 | D80194D8 | D90196D9 | DA0198DA |
| DB019ADB | DC019CDC | DD019EDD | DE01A0DE | DF01A2DF | E001A4E0 |
| E101A6E1 | E201A8E2 | E301AAE3 | E401ACE4 | E501AEE5 | E601B0E6 |
| E701B2E7 | E801B4E8 | E901B6E9 | EA01B8EA | EB01BAEB | EC01BCEC |
| ED01BEED | EE01C0EE | EF01C2EF | F001C4F0 | F101C6F1 | F201C8F2 |
| F301CAF3 | F401CCF4 | F501CEF5 | F601D0F6 | F701D2F7 | F801D4F8 |
| F901D6F9 | FA01D8FA | FB01DAFB | FC01DCFC | FD01DEFD | FE01E0FE |
| FF01E2FF | 0001E500 | 0101E701 | 0201E902 | 0301EB03 | 0401ED04 |
| 0501EF05 | 0601F106 | 0701F307 | 0801F508 | 0901F709 | 0A01F90A |
| 0B01FB0B | 0C01FD0C | 0D01FF0D | 0E02010E | 0F02030F | 10020510 |

... the sequence continues".

FIG. 9A

Frequency Analysis Table for All Byte Values in the Sample Sequence
Length: 1,032 bytes
seed=0E00000E, primeM=01000201

1,032 Bytes of Sample Sequence Data Generated Using a Constrained primeM
seed=0E00000E, primeM=0103050D, Data is not compressible

```
0F03051B   10060A28   11090F35   120C1442   130F194F   14121E5C
15152369   16182876   171B2D83   181E3290   1921379D   1A243CAA
1B2741B7   1C2A46C4   1D2D4BD1   1E3050DE   1F3355EB   20365AF8
21396005   223C6512   233F6A1F   24426F2C   25457439   26487946
274B7E53   284E8360   2951886D   2A548D7A   2B579287   2C5A9794
2D5D9CA1   2E60A1AE   2F63A6BB   3066ABC8   3169B0D5   326CB5E2
336FBAEF   3472BFFC   3575C509   3678CA16   377BCF23   387ED430
3981D93D   3A84DE4A   3B87E357   3C8AE864   3D8DED71   3E90F27E
3F93F78B   4096FC98   419A01A5   429D06B2   43A00BBF   44A310CC
45A615D9   46A91AE6   47AC1FF3   48AF2500   49B22A0D   4AB52F1A
|4BB83427   4CBB3934   4DBE3E41   4EC1434E   4FC4485B   50C74D68|
|51CA5275   52CD5782   53D05C8F   54D3619C   55D666A9   56D96BB6|
|57DC70C3   58DF75D0   59E27ADD   5AE57FEA   5BE884F7   5CEB8A04|
|5DEE8F11   5EF1941E   5FF4992B   60F79E38   61FAA345   62FDA852|
|6400AD5F   6503B26C   6606B779   6709BC86   680CC193   690FC6A0|
|6A12CBAD   6B15D0BA   6C18D5C7   6D1BDAD4   6E1EDFE1   6F21E4EE|
7024E9FB   7127EF08   722AF415   732DF922   7430FE2F   7534033C
76370849   773A0D56   783D1263   79401770   7A431C7D   7B46218A
7C492697   7D4C2BA4   7E4F30B1   7F5235BE   80553ACB   81583FD8
825B44E5   835E49F2   84614EFF   8564540C   86675919   876A5E26
886D6333   89706840   8A736D4D   8B76725A   8C797767   8D7C7C74
8E7F8181   8F82868E   90858B9B   918890A8   928B95B5   938E9AC2
94919FCF   9594A4DC   9697A9E9   979AAEF6   989DB403   99A0B910
9AA3BE1D   9BA6C32A   9CA9C837   9DACCD44   9EAFD251   9FB2D75E
A0B5DC6B   A1B8E178   A2BBE685   A3BEEB92   A4C1F09F   A5C4F5AC
A6C7FAB9   A7CAFFC6   A8CE04D3   A9D109E0   AAD40EED   ABD713FA
ACDA1907   ADDD1E14   AEE02321   AFE3282E   B0E62D3B   B1E93248
B2EC3755   B3EF3C62   B4F2416F   B5F5467C   B6F84B89   B7FB5096
B8FE55A3   BA015AB0   BB045FBD   BC0764CA   BD0A69D7   BE0D6EE4
BF1073F1   C01378FE   C1167E0B   C2198318   C31C8825   C41F8D32
C522923F   C625974C   C7289C59   C82BA166   C92EA673   CA31AB80
CB34B08D   CC37B59A   CD3ABAA7   CE3DBFB4   CF40C4C1   D043C9CE
D146CEDB   D249D3E8   D34CD8F5   D44FDE02   D552E30F   D655E81C
D758ED29   D85BF236   D95EF743   DA61FC50   DB65015D   DC68066A
DD6B0B77   DE6E1084   DF711591   E0741A9E   E1771FAB   E27A24B8
E37D29C5   E4802ED2   E58333DF   E68638EC   E7893DF9   E88C4306
E98F4813   EA924D20   EB95522D   EC98573A   ED9B5C47   EE9E6154
EFA16661   F0A46B6E   F1A7707B   F2AA7588   F3AD7A95   F4B07FA2
F5B384AF   F6B689BC   F7B98EC9   F8BC93D6   F9BF98E3   FAC29DF0
FBC5A2FD   FCC8A80A   FDCBAD17   FECEB224   FFD1B731   00D4BC3E
01D7C14B   02DAC658   03DDCB65   04E0D072   05E3D57F   06E6DA8C
07E9DF99   08ECE4A6   09EFE9B3   0AF2EEC0   0BF5F3CD   0CF8F8DA
0DFBFDE7   0EFF02F4   10020801   11050D0E   1208121B   130B1728
                ... the sequence continues
```

FIG. 10A

Frequency Analysis Table for All Byte Values in the Sample Sequence
Length: 1,032 bytes
seed=0E00000E, primeM=0103050D, 1,032 Bytes

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 3 | 5 | 4 | 5 | 4 | 4 | 6 | 3 | 5 | 5 | 4 | 5 | 4 | 5 | 3 | 5 |
| 1 | 6 | 3 | 7 | 5 | 3 | 6 | 3 | 4 | 4 | 5 | 4 | 5 | 4 | 2 | 6 | 5 |
| 2 | 2 | 5 | 3 | 4 | 5 | 4 | 3 | 4 | 6 | 3 | 5 | 4 | 2 | 6 | 4 | 3 |
| 3 | 5 | 3 | 4 | 4 | 5 | 3 | 3 | 6 | 3 | 4 | 5 | 2 | 5 | 5 | 3 | 4 |
| 4 | 4 | 4 | 3 | 6 | 3 | 3 | 6 | 2 | 5 | 5 | 2 | 5 | 4 | 4 | 4 | 4 |
| 5 | 4 | 3 | 6 | 2 | 4 | 6 | 2 | 5 | 4 | 3 | 5 | 4 | 4 | 3 | 5 | 3 |
| 6 | 4 | 6 | 2 | 3 | 4 | 4 | 5 | 3 | 4 | 4 | 4 | 5 | 3 | 4 | 4 | 4 |
| 7 | 5 | 3 | 4 | 4 | 4 | 5 | 3 | 4 | 4 | 4 | 5 | 3 | 4 | 3 | 5 | 5 |
| 8 | 3 | 4 | 3 | 5 | 5 | 3 | 4 | 3 | 5 | 4 | 4 | 3 | 5 | 4 | 4 | 4 |
| 9 | 4 | 3 | 5 | 4 | 4 | 3 | 5 | 4 | 3 | 5 | 3 | 4 | 5 | 4 | 3 | 3 |
| A | 4 | 5 | 3 | 5 | 4 | 2 | 6 | 3 | 4 | 5 | 3 | 4 | 4 | 5 | 3 | 4 |
| B | 5 | 2 | 6 | 3 | 3 | 6 | 3 | 4 | 4 | 3 | 4 | 4 | 5 | 2 | 5 | 5 |
| C | 2 | 6 | 3 | 3 | 5 | 4 | 4 | 4 | 4 | 3 | 5 | 5 | 2 | 4 | 5 | 3 |
| D | 5 | 4 | 3 | 4 | 5 | 4 | 3 | 5 | 3 | 4 | 6 | 2 | 4 | 4 | 4 | 5 |
| E | 4 | 3 | 3 | 6 | 4 | 3 | 5 | 2 | 5 | 6 | 2 | 4 | 4 | 4 | 4 | 5 |
| F | 3 | 3 | 6 | 3 | 4 | 5 | 2 | 5 | 5 | 3 | 4 | 4 | 4 | 4 | 4 | 4 |

FIG. 10B

Frequency Analysis Table for All Byte Values in the Sample Sequence
Length 12,288 Bytes
seed=0E00000E, primeM=0103050D

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 47 | 48 | 48 | 49 | 48 | 48 | 50 | 47 | 48 | 50 | 48 | 48 | 48 | 49 | 48 | 49 |
| 1 | 49 | 46 | 51 | 49 | 47 | 50 | 47 | 49 | 49 | 48 | 50 | 47 | 48 | 49 | 50 | 49 |
| 2 | 48 | 50 | 49 | 50 | 50 | 47 | 51 | 50 | 48 | 49 | 50 | 49 | 49 | 51 | 47 | 49 |
| 3 | 52 | 47 | 50 | 49 | 48 | 48 | 48 | 50 | 47 | 49 | 49 | 46 | 51 | 48 | 47 | 49 |
| 4 | 47 | 50 | 46 | 49 | 49 | 46 | 50 | 46 | 48 | 50 | 46 | 49 | 47 | 49 | 49 | 46 |
| 5 | 49 | 47 | 49 | 47 | 48 | 49 | 46 | 50 | 47 | 47 | 50 | 48 | 47 | 48 | 48 | 47 |
| 6 | 49 | 49 | 46 | 47 | 49 | 46 | 48 | 47 | 48 | 47 | 47 | 48 | 46 | 48 | 48 | 46 |
| 7 | 49 | 46 | 47 | 49 | 48 | 49 | 46 | 49 | 49 | 47 | 49 | 47 | 47 | 48 | 50 | 47 |
| 8 | 47 | 49 | 48 | 48 | 49 | 46 | 48 | 49 | 48 | 47 | 48 | 48 | 48 | 49 | 47 | 48 |
| 9 | 48 | 48 | 49 | 47 | 47 | 50 | 46 | 49 | 48 | 47 | 49 | 47 | 50 | 47 | 48 | 49 |
| A | 46 | 49 | 48 | 47 | 49 | 47 | 48 | 47 | 49 | 49 | 46 | 49 | 47 | 47 | 50 | 47 |
| B | 47 | 47 | 49 | 47 | 48 | 49 | 46 | 49 | 48 | 46 | 47 | 47 | 48 | 46 | 47 | 48 |
| C | 45 | 49 | 46 | 48 | 46 | 46 | 49 | 47 | 46 | 48 | 48 | 48 | 48 | 47 | 48 | 48 |
| D | 49 | 46 | 49 | 48 | 47 | 49 | 47 | 48 | 48 | 48 | 48 | 47 | 49 | 47 | 48 | 49 |
| E | 47 | 47 | 47 | 50 | 47 | 47 | 49 | 45 | 50 | 49 | 45 | 49 | 47 | 49 | 47 | 48 |
| F | 48 | 47 | 49 | 47 | 47 | 49 | 47 | 48 | 48 | 47 | 49 | 47 | 48 | 48 | 47 | 49 |

FIG. 10C

Table of Accumulator (Generated Data) Internal Byte Value Rotations
primeM=0103050D

| Byte3 | Byte2 | Byte1 | Byte0 |
|---|---|---|---|
| 4B | B8 | 34 | 27 |
| 4C | BB | 39 | 34 |
| 4D | BE | 3E | 41 |
| 4E | C1 | 43 | 4E |
| 4F | C4 | 48 | 5B |
| 50 | C7 | 4D | 68 |
| 51 | CA | 52 | 75 |
| 52 | CD | 57 | 82 |
| 53 | D0 | 5C | 8F |
| 54 | D3 | 61 | 9C |
| 55 | D6 | 66 | A9 |
| 56 | D9 | 6B | B6 |
| 57 | DC | 70 | C3 |
| 58 | DF | 75 | D0 |
| 59 | E2 | 7A | DD |
| 5A | E5 | 7F | EA |
| 5B | E8 | 84 | F7 |
| 5C | EB | 8A | 04 |
| 5D | EE | 8F | 11 |
| 5E | F1 | 94 | 1E |
| 5F | F4 | 99 | 2B |
| 60 | F7 | 9E | 38 |
| 61 | FA | A3 | 45 |
| 62 | FD | A8 | 52 |
| 64 | 00 | AD | 5F |
| 65 | 03 | B2 | 6C |
| 66 | 06 | B7 | 79 |
| 67 | 09 | BC | 86 |
| 68 | 0C | C1 | 93 |
| 69 | 0F | C6 | A0 |
| 6A | 12 | CB | AD |
| 6B | 15 | D0 | BA |
| 6C | 18 | D5 | C7 |
| 6D | 1B | DA | D4 |
| 6E | 1E | DF | E1 |
| 6F | 21 | E4 | EE |

```
Value added to each byte
of the accumulator each    +1    +3    +5    +13 decimal
tick of the engine plus    01    03    05    0D  hexadecimal
applicable carries at
wrap around.
```

FIG. 11

4,080 Bytes of Sample Sequence Data Generated Using Constrained primeM
seed=0E00000E, primeM=0103050D, Data is not compressible

| | | | | | |
|---|---|---|---|---|---|
| 0F03051B | 10060A28 | 11090F35 | 120C1442 | 130F194F | 14121E5C |
| 15152369 | 16182876 | 171B2D83 | 181E3290 | 1921379D | 1A243CAA |
| 1B2741B7 | 1C2A46C4 | 1D2D4BD1 | 1E3050DE | 1F3355EB | 20365AF8 |
| 21396005 | 223C6512 | 233F6A1F | 24426F2C | 25457439 | 26487946 |
| 274B7E53 | 284E8360 | 2951886D | 2A548D7A | 2B579287 | 2C5A9794 |
| 2D5D9CA1 | 2E60A1AE | 2F63A6BB | 3066ABC8 | 3169B0D5 | 326CB5E2 |
| 336FBAEF | 3472BFFC | 3575C509 | 3678CA16 | 377BCF23 | 387ED430 |
| 3981D93D | 3A84DE4A | 3B87E357 | 3C8AE864 | 3D8DED71 | 3E90F27E |
| 3F93F78B | 4096FC98 | 419A01A5 | 429D06B2 | 43A00BBF | 44A310CC |
| 45A615D9 | 46A91AE6 | 47AC1FF3 | 48AF2500 | 49B22A0D | 4AB52F1A |
| 4BB83427 | 4CBB3934 | 4DBE3E41 | 4EC1434E | 4FC4485B | 50C74D68 |
| 51CA5275 | 52CD5782 | 53D05C8F | 54D3619C | 55D666A9 | 56D96BB6 |
| 57DC70C3 | 58DF75D0 | 59E27ADD | 5AE57FEA | 5BE884F7 | 5CEB8A04 |
| 5DEE8F11 | 5EF1941E | 5FF4992B | 60F79E38 | 61FAA345 | 62FDA852 |
| 6400AD5F | 6503B26C | 6606B779 | 6709BC86 | 680CC193 | 690FC6A0 |
| 6A12CBAD | 6B15D0BA | 6C18D5C7 | 6D1BDAD4 | 6E1EDFE1 | 6F21E4EE |
| 7024E9FB | 7127EF08 | 722AF415 | 732DF922 | 7430FE2F | 7534033C |
| 76370849 | 773A0D56 | 783D1263 | 79401770 | 7A431C7D | 7B46218A |
| 7C492697 | 7D4C2BA4 | 7E4F30B1 | 7F5235BE | 80553ACB | 81583FD8 |
| 825B44E5 | 835E49F2 | 84614EFF | 8564540C | 86675919 | 876A5E26 |
| 886D6333 | 89706840 | 8A736D4D | 8B76725A | 8C797767 | 8D7C7C74 |
| 8E7F8181 | 8F82868E | 90858B9B | 918890A8 | 928B95B5 | 938E9AC2 |
| 94919FCF | 9594A4DC | 9697A9E9 | 979AAEF6 | 989DB403 | 99A0B910 |
| 9AA3BE1D | 9BA6C32A | 9CA9C837 | 9DACCD44 | 9EAFD251 | 9FB2D75E |
| A0B5DC6B | A1B8E178 | A2BBE685 | A3BEEB92 | A4C1F09F | A5C4F5AC |
| A6C7FAB9 | A7CAFFC6 | A8CE04D3 | A9D109E0 | AAD40EED | ABD713FA |
| ACDA1907 | ADDD1E14 | AEE02321 | AFE3282E | B0E62D3B | B1E93248 |
| B2EC3755 | B3EF3C62 | B4F2416F | B5F5467C | B6F84B89 | B7FB5096 |
| B8FE55A3 | BA015AB0 | BB045FBD | BC0764CA | BD0A69D7 | BE0D6EE4 |
| BF1073F1 | C01378FE | C1167E0B | C2198318 | C31C8825 | C41F8D32 |
| C522923F | C625974C | C7289C59 | C82BA166 | C92EA673 | CA31AB80 |
| CB34B08D | CC37B59A | CD3ABAA7 | CE3DBFB4 | CF40C4C1 | D043C9CE |
| D146CEDB | D249D3E8 | D34CD8F5 | D44FDE02 | D552E30F | D655E81C |
| D758ED29 | D85BF236 | D95EF743 | DA61FC50 | DB65015D | DC68066A |
| DD6B0B77 | DE6E1084 | DF711591 | E0741A9E | E1771FAB | E27A24B8 |
| E37D29C5 | E4802ED2 | E58333DF | E68638EC | E7893DF9 | E88C4306 |
| E98F4813 | EA924D20 | EB95522D | EC98573A | ED9B5C47 | EE9E6154 |
| EFA16661 | F0A46B6E | F1A7707B | F2AA7588 | F3AD7A95 | F4B07FA2 |
| F5B384AF | F6B689BC | F7B98EC9 | F8BC93D6 | F9BF98E3 | FAC29DF0 |
| FBC5A2FD | FCC8A80A | FDCBAD17 | FECEB224 | FFD1B731 | 00D4BC3E |
| 01D7C14B | 02DAC658 | 03DDCB65 | 04E0D072 | 05E3D57F | 06E6DA8C |
| 07E9DF99 | 08ECE4A6 | 09EFE9B3 | 0AF2EEC0 | 0BF5F3CD | 0CF8F8DA |
| 0DFBFDE7 | 0EFF02F4 | 10020801 | 11050D0E | 1208121B | 130B1728 |
| 140E1C35 | 15112142 | 1614264F | 17172B5C | 181A3069 | 191D3576 |
| 1A203A83 | 1B233F90 | 1C26449D | 1D2949AA | 1E2C4EB7 | 1F2F53C4 |
| 203258D1 | 21355DDE | 223862EB | 233B67F8 | 243E6D05 | 25417212 |
| 2644771F | 27477C2C | 284A8139 | 294D8646 | 2A508B53 | 2B539060 |
| 2C56956D | 2D599A7A | 2E5C9F87 | 2F5FA494 | 3062A9A1 | 3165AEAE |

```
3268B3BB  336BB8C8  346EBDD5  3571C2E2  3674C7EF  3777CCFC
387AD209  397DD716  3A80DC23  3B83E130  3C86E63D  3D89EB4A
3E8CF057  3F8FF564  4092FA71  4195FF7E  4299048B  439C0998
449F0EA5  45A213B2  46A518BF  47A81DCC  48AB22D9  49AE27E6
4AB12CF3  4BB43200  4CB7370D  4DBA3C1A  4EBD4127  4FC04634
50C34B41  51C6504E  52C9555B  53CC5A68  54CF5F75  55D26482
56D5698F  57D86E9C  58DB73A9  59DE78B6  5AE17DC3  5BE482D0
5CE787DD  5DEA8CEA  5EED91F7  5FF09704  60F39C11  61F6A11E
62F9A62B  63FCAB38  64FFB045  6602B552  6705BA5F  6808BF6C
690BC479  6A0EC986  6B11CE93  6C14D3A0  6D17D8AD  6E1ADDBA
6F1DE2C7  7020E7D4  7123ECE1  7226F1EE  7329F6FB  742CFC08
75300115  76330622  77360B2F  7839103C  793C1549  7A3F1A56
7B421F63  7C452470  7D48297D  7E4B2E8A  7F4E3397  805138A4
81543DB1  825742BE  835A47CB  845D4CD8  856051E5  866356F2
87665BFF  8869610C  896C6619  8A6F6B26  8B727033  8C757540
8D787A4D  8E7B7F5A  8F7E8467  90818974  91848E81  9287938E
938A989B  948D9DA8  9590A2B5  9693A7C2  9796ACCF  9899B1DC
999CB6E9  9A9FBBF6  9BA2C103  9CA5C610  9DA8CB1D  9EABD02A
9FAED537  A0B1DA44  A1B4DF51  A2B7E45E  A3BAE96B  A4BDEE78
A5C0F385  A6C3F892  A7C6FD9F  A8CA02AC  A9CD07B9  AAD00CC6
ABD311D3  ACD616E0  ADD91BED  AEDC20FA  AFDF2607  B0E22B14
B1E53021  B2E8352E  B3EB3A3B  B4EE3F48  B5F14455  B6F44962
B7F74E6F  B8FA537C  B9FD5889  BB005D96  BC0362A3  BD0667B0
BE096CBD  BF0C71CA  C00F76D7  C1127BE4  C21580F1  C31885FE
C41B8B0B  C51E9018  C6219525  C7249A32  C8279F3F  C92AA44C
CA2DA959  CB30AE66  CC33B373  CD36B880  CE39BD8D  CF3CC29A
D03FC7A7  D142CCB4  D245D1C1  D348D6CE  D44BDBDB  D54EE0E8
D651E5F5  D754EB02  D857F00F  D95AF51C  DA5DFA29  DB60FF36
DC640443  DD670950  DE6A0E5D  DF6D136A  E0701877  E1731D84
E2762291  E379279E  E47C2CAB  E57F31B8  E68236C5  E7853BD2
E88840DF  E98B45EC  EA8E4AF9  EB915006  EC945513  ED975A20
EE9A5F2D  EF9D643A  F0A06947  F1A36E54  F2A67361  F3A9786E
F4AC7D7B  F5AF8288  F6B28795  F7B58CA2  F8B891AF  F9BB96BC
FABE9BC9  FBC1A0D6  FCC4A5E3  FDC7AAF0  FECAAFFD  FFCDB50A
00D0BA17  01D3BF24  02D6C431  03D9C93E  04DCCE4B  05DFD358
06E2D865  07E5DD72  08E8E27F  09EBE78C  0AEEEC99  0BF1F1A6
0CF4F6B3  0DF7FBC0  0EFB00CD  0FFE05DA  11010AE7  12040FF4
13071501  140A1A0E  150D1F1B  16102428  17132935  18162E42
1919334F  1A1C385C  1B1F3D69  1C224276  1D254783  1E284C90
1F2B519D  202E56AA  21315BB7  223460C4  233765D1  243A6ADE
253D6FEB  264074F8  27437A05  28467F12  2949841F  2A4C892C
2B4F8E39  2C529346  2D559853  2E589D60  2F5BA26D  305EA77A
3161AC87  3264B194  3367B6A1  346ABBAE  356DC0BB  3670C5C8
3773CAD5  3876CFE2  3979D4EF  3A7CD9FC  3B7FDF09  3C82E416   (Cont. at
3D85E923  3E88EE30  3F8BF33D  408EF84A  4191FD57  42950264    FIG. 13C)
```

FIG. 13B

| | | | | | |
|---|---|---|---|---|---|
| 43980771 | 449B0C7E | 459E118B | 46A11698 | 47A41BA5 | 48A720B2 |
| 49AA25BF | 4AAD2ACC | 4BB02FD9 | 4CB334E6 | 4DB639F3 | 4EB93F00 |
| 4FBC440D | 50BF491A | 51C24E27 | 52C55334 | 53C85841 | 54CB5D4E |
| 55CE625B | 56D16768 | 57D46C75 | 58D77182 | 59DA768F | 5ADD7B9C |
| 5BE080A9 | 5CE385B6 | 5DE68AC3 | 5EE98FD0 | 5FEC94DD | 60EF99EA |
| 61F29EF7 | 62F5A404 | 63F8A911 | 64FBAE1E | 65FEB32B | 6701B838 |
| 6804BD45 | 6907C252 | 6A0AC75F | 6B0DCC6C | 6C10D179 | 6D13D686 |
| 6E16DB93 | 6F19E0A0 | 701CE5AD | 711FEABA | 7222EFC7 | 7325F4D4 |
| 7428F9E1 | 752BFEEE | 762F03FB | 77320908 | 78350E15 | 79381322 |
| 7A3B182F | 7B3E1D3C | 7C412249 | 7D442756 | 7E472C63 | 7F4A3170 |
| 804D367D | 81503B8A | 82534097 | 835645A4 | 84594AB1 | 855C4FBE |
| 865F54CB | 876259D8 | 88655EE5 | 896863F2 | 8A6B68FF | 8B6E6E0C |
| 8C717319 | 8D747826 | 8E777D33 | 8F7A8240 | 907D874D | 91808C5A |
| 92839167 | 93869674 | 94899B81 | 958CA08E | 968FA59B | 9792AAA8 |
| 9895AFB5 | 9998B4C2 | 9A9BB9CF | 9B9EBEDC | 9CA1C3E9 | 9DA4C8F6 |
| 9EA7CE03 | 9FAAD310 | A0ADD81D | A1B0DD2A | A2B3E237 | A3B6E744 |
| A4B9EC51 | A5BCF15E | A6BFF66B | A7C2FB78 | A8C60085 | A9C90592 |
| AACC0A9F | ABCF0FAC | ACD214B9 | ADD519C6 | AED81ED3 | AFDB23E0 |
| B0DE28ED | B1E12DFA | B2E43307 | B3E73814 | B4EA3D21 | B5ED422E |
| B6F0473B | B7F34C48 | B8F65155 | B9F95662 | BAFC5B6F | BBFF607C |
| BD026589 | BE056A96 | BF086FA3 | C00B74B0 | C10E79BD | C2117ECA |
| C31483D7 | C41788E4 | C51A8DF1 | C61D92FE | C720980B | C8239D18 |
| C926A225 | CA29A732 | CB2CAC3F | CC2FB14C | CD32B659 | CE35BB66 |
| CF38C073 | D03BC580 | D13ECA8D | D241CF9A | D344D4A7 | D447D9B4 |
| D54ADEC1 | D64DE3CE | D750E8DB | D853EDE8 | D956F2F5 | DA59F802 |
| DB5CFD0F | DC60021C | DD630729 | DE660C36 | DF691143 | E06C1650 |
| E16F1B5D | E272206A | E3752577 | E4782A84 | E57B2F91 | E67E349E |
| E78139AB | E8843EB8 | E98743C5 | EA8A48D2 | EB8D4DDF | EC9052EC |
| ED9357F9 | EE965D06 | EF996213 | F09C6720 | F19F6C2D | F2A2713A |
| F3A57647 | F4A87B54 | F5AB8061 | F6AE856E | F7B18A7B | F8B48F88 |
| F9B79495 | FABA99A2 | FBBD9EAF | FCC0A3BC | FDC3A8C9 | FEC6ADD6 |
| FFC9B2E3 | 00CCB7F0 | 01CFBCFD | 02D2C20A | 03D5C717 | 04D8CC24 |
| 05DBD131 | 06DED63E | 07E1DB4B | 08E4E058 | 09E7E565 | 0AEAEA72 |
| 0BEDEF7F | 0CF0F48C | 0DF3F999 | 0EF6FEA6 | 0FFA03B3 | 10FD08C0 |
| 12000DCD | 130312DA | 140617E7 | 15091CF4 | 160C2201 | 170F270E |
| 18122C1B | 19153128 | 1A183635 | 1B1B3B42 | 1C1E404F | 1D21455C |
| 1E244A69 | 1F274F76 | 202A5483 | 212D5990 | 22305E9D | 233363AA |
| 243668B7 | 25396DC4 | 263C72D1 | 273F77DE | 28427CEB | 294581F8 |
| 2A488705 | 2B4B8C12 | 2C4E911F | 2D51962C | 2E549B39 | 2F57A046 |
| 305AA553 | 315DAA60 | 3260AF6D | 3363B47A | 3466B987 | 3569BE94 |
| 366CC3A1 | 376FC8AE | 3872CDBB | 3975D2C8 | 3A78D7D5 | 3B7BDCE2 |
| 3C7EE1EF | 3D81E6FC | 3E84EC09 | 3F87F116 | 408AF623 | 418DFB30 |
| 4291003D | 4394054A | 44970A57 | 459A0F64 | 469D1471 | 47A0197E |
| 48A31E8B | 49A62398 | 4AA928A5 | 4BAC2DB2 | 4CAF32BF | 4DB237CC |
| 4EB53CD9 | 4FB841E6 | 50BB46F3 | 51BE4C00 | 52C1510D | 53C4561A |

| | | | | | |
|---|---|---|---|---|---|
| 54C75B27 | 55CA6034 | 56CD6541 | 57D06A4E | 58D36F5B | 59D67468 |
| 5AD97975 | 5BDC7E82 | 5CDF838F | 5DE2889C | 5EE58DA9 | 5FE892B6 |
| 60EB97C3 | 61EE9CD0 | 62F1A1DD | 63F4A6EA | 64F7ABF7 | 65FAB104 |
| 66FDB611 | 6800BB1E | 6903C02B | 6A06C538 | 6B09CA45 | 6C0CCF52 |
| 6D0FD45F | 6E12D96C | 6F15DE79 | 7018E386 | 711BE893 | 721EEDA0 |
| 7321F2AD | 7424F7BA | 7527FCC7 | 762B01D4 | 772E06E1 | 78310BEE |
| 793410FB | 7A371608 | 7B3A1B15 | 7C3D2022 | 7D40252F | 7E432A3C |
| 7F462F49 | 80493456 | 814C3963 | 824F3E70 | 8352437D | 8455488A |
| 85584D97 | 865B52A4 | 875E57B1 | 88615CBE | 896461CB | 8A6766D8 |
| 8B6A6BE5 | 8C6D70F2 | 8D7075FF | 8E737B0C | 8F768019 | 90798526 |
| 917C8A33 | 927F8F40 | 9382944D | 9485995A | 95889E67 | 968BA374 |
| 978EA881 | 9891AD8E | 9994B29B | 9A97B7A8 | 9B9ABCB5 | 9C9DC1C2 |
| 9DA0C6CF | 9EA3CBDC | 9FA6D0E9 | A0A9D5F6 | A1ACDB03 | A2AFE010 |
| A3B2E51D | A4B5EA2A | A5B8EF37 | A6BBF444 | A7BEF951 | A8C1FE5E |
| A9C5036B | AAC80878 | ABCB0D85 | ACCE1292 | ADD1179F | AED41CAC |
| AFD721B9 | B0DA26C6 | B1DD2BD3 | B2E030E0 | B3E335ED | B4E63AFA |
| B5E94007 | B6EC4514 | B7EF4A21 | B8F24F2E | B9F5543B | BAF85948 |
| BBFB5E55 | BCFE6362 | BE01686F | BF046D7C | C0077289 | C10A7796 |
| C20D7CA3 | C31081B0 | C41386BD | C5168BCA | C61990D7 | C71C95E4 |
| C81F9AF1 | C9229FFE | CA25A50B | CB28AA18 | CC2BAF25 | CD2EB432 |
| CE31B93F | CF34BE4C | D037C359 | D13AC866 | D23DCD73 | D340D280 |
| D443D78D | D546DC9A | D649E1A7 | D74CE6B4 | D84FEBC1 | D952F0CE |
| DA55F5DB | DB58FAE8 | DC5BFFF5 | DD5F0502 | DE620A0F | DF650F1C |
| E0681429 | E16B1936 | E26E1E43 | E3712350 | E474285D | E5772D6A |
| E67A3277 | E77D3784 | E8803C91 | E983419E | EA8646AB | EB894BB8 |
| EC8C50C5 | ED8F55D2 | EE925ADF | EF955FEC | F09864F9 | F19B6A06 |
| F29E6F13 | F3A17420 | F4A4792D | F5A77E3A | F6AA8347 | F7AD8854 |
| F8B08D61 | F9B3926E | FAB6977B | FBB99C88 | FCBCA195 | FDBFA6A2 |
| FEC2ABAF | FFC5B0BC | 00C8B5C9 | 01CBBAD6 | 02CEBFE3 | 03D1C4F0 |
| 04D4C9FD | 05D7CF0A | 06DAD417 | 07DDD924 | 08E0DE31 | 09E3E33E |
| 0AE6E84B | 0BE9ED58 | 0CECF265 | 0DEFF772 | 0EF2FC7F | 0FF6018C |
| 10F90699 | 11FC0BA6 | 12FF10B3 | 140215C0 | 15051ACD | 16081FDA |

FIG. 13D

Frequency Analysis Table for All Byte Values in the Sample Sequence
Length: 4,080 bytes
seed=0E00000E, constrained primeM=0103050D

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 15 | 16 | 16 | 17 | 15 | 17 | 18 | 15 | 16 | 17 | 17 | 16 | 16 | 16 | 14 | 18 |
| 1 | 17 | 14 | 18 | 16 | 16 | 19 | 17 | 15 | 16 | 17 | 16 | 17 | 16 | 14 | 18 | 17 |
| 2 | 15 | 16 | 16 | 16 | 16 | 16 | 15 | 17 | 17 | 14 | 16 | 17 | 15 | 17 | 15 | 15 |
| 3 | 17 | 15 | 16 | 16 | 17 | 15 | 15 | 18 | 15 | 16 | 17 | 14 | 17 | 17 | 14 | 16 |
| 4 | 17 | 16 | 15 | 17 | 15 | 16 | 18 | 14 | 16 | 17 | 15 | 16 | 17 | 15 | 16 | 16 |
| 5 | 16 | 16 | 17 | 14 | 16 | 18 | 15 | 16 | 16 | 15 | 17 | 17 | 14 | 16 | 16 | 15 |
| 6 | 17 | 16 | 15 | 15 | 16 | 15 | 15 | 15 | 16 | 15 | 17 | 16 | 15 | 16 | 16 | 17 |
| 7 | 16 | 15 | 16 | 16 | 17 | 16 | 15 | 16 | 16 | 16 | 16 | 16 | 16 | 15 | 17 | 16 |
| 8 | 16 | 16 | 15 | 17 | 16 | 16 | 15 | 16 | 17 | 15 | 16 | 16 | 16 | 17 | 15 | 16 |
| 9 | 15 | 17 | 17 | 14 | 16 | 17 | 14 | 17 | 16 | 15 | 17 | 15 | 16 | 17 | 16 | 15 |
| A | 16 | 17 | 15 | 16 | 16 | 15 | 18 | 15 | 15 | 17 | 16 | 16 | 16 | 16 | 15 | 17 |
| B | 16 | 15 | 17 | 15 | 15 | 18 | 16 | 15 | 16 | 15 | 15 | 17 | 15 | 13 | 17 | 17 |
| C | 14 | 17 | 16 | 15 | 16 | 16 | 16 | 16 | 16 | 15 | 17 | 16 | 15 | 15 | 17 | 16 |
| D | 16 | 16 | 15 | 16 | 18 | 15 | 15 | 17 | 15 | 17 | 16 | 15 | 16 | 16 | 16 | 16 |
| E | 17 | 15 | 15 | 18 | 15 | 16 | 17 | 13 | 17 | 17 | 14 | 16 | 17 | 16 | 15 | 17 |
| F | 15 | 16 | 18 | 14 | 15 | 16 | 16 | 16 | 16 | 15 | 16 | 16 | 16 | 16 | 16 | 16 |

FIG. 13E

4,080 Bytes of Sample Sequence Data Generated Using Constrained primeM
seed=0E00000E, primeM=0305070B, Data is not compressible

```
11050719  140A0E24  170F152F  1A141C3A  1D192345  201E2A50
2323315B  26283866  292D3F71  2C32467C  2F374D87  323C5492
35415B9D  384662A8  3B4B69B3  3E5070BE  415577C9  445A7ED4
475F85DF  4A648CEA  4D6993F5  506E9B00  5373A20B  5678A916
597DB021  5C82B72C  5F87BE37  628CC542  6591CC4D  6896D358
6B9BDA63  6EA0E16E  71A5E879  74AAEF84  77AFF68F  7AB4FD9A
7DBA04A5  80BF0BB0  83C412BB  86C919C6  89CE20D1  8CD327DC
8FD82EE7  92DD35F2  95E23CFD  98E74408  9BEC4B13  9EF1521E
A1F65929  A4FB6034  A800673F  AB056E4A  AE0A7555  B10F7C60
B414836B  B7198A76  BA1E9181  BD23988C  C0289F97  C32DA6A2
C632ADAD  C937B4B8  CC3CBBC3  CF41C2CE  D246C9D9  D54BD0E4
D850D7EF  DB55DEFA  DE5AE605  E15FED10  E464F41B  E769FB26
EA6F0231  ED74093C  F0791047  F37E1752  F6831E5D  F9882568
FC8D2C73  FF92337E  02973A89  059C4194  08A1489F  0BA64FAA
0EAB56B5  11B05DC0  14B564CB  17BA6BD6  1ABF72E1  1DC479EC
20C980F7  23CE8802  26D38F0D  29D89618  2CDD9D23  2FE2A42E
32E7AB39  35ECB244  38F1B94F  3BF6C05A  3EFBC765  4200CE70
4505D57B  480ADC86  4B0FE391  4E14EA9C  5119F1A7  541EF8B2
5723FFBD  5A2906C8  5D2E0DD3  603314DE  63381BE9  663D22F4
694229FF  6C47310A  6F4C3815  72513F20  7556462B  785B4D36
7B605441  7E655B4C  816A6257  846F6962  8774706D  8A797778
8D7E7E83  9083858E  93888C99  968D93A4  99929AAF  9C97A1BA
9F9CA8C5  A2A1AFD0  A5A6B6DB  A8ABBDE6  ABB0C4F1  AEB5CBFC
B1BAD307  B4BFDA12  B7C4E11D  BAC9E828  BDCEEF33  C0D3F63E
C3D8FD49  C6DE0454  C9E30B5F  CCE8126A  CFED1975  D2F22080
D5F7278B  D8FC2E96  DC0135A1  DF063CAC  E20B43B7  E5104AC2
E81551CD  EB1A58D8  EE1F5FE3  F12466EE  F4296DF9  F72E7504
FA337C0F  FD38831A  003D8A25  03429130  0647983B  094C9F46
0C51A651  0F56AD5C  125BB467  1560BB72  1865C27D  1B6AC988
1E6FD093  2174D79E  2479DEA9  277EE5B4  2A83ECBF  2D88F3CA
308DFAD5  339301E0  369808EB  399D0FF6  3CA21701  3FA71E0C
42AC2517  45B12C22  48B6332D  4BBB3A38  4EC04143  51C5484E
54CA4F59  57CF5664  5AD45D6F  5DD9647A  60DE6B85  63E37290
66E8799B  69ED80A6  6CF287B1  6FF78EBC  72FC95C7  76019CD2
7906A3DD  7C0BAAE8  7F10B1F3  8215B8FE  851AC009  881FC714
8B24CE1F  8E29D52A  912EDC35  9433E340  9738EA4B  9A3DF156
9D42F861  A047FF6C  A34D0677  A6520D82  A957148D  AC5C1B98
AF6122A3  B26629AE  B56B30B9  B87037C4  BB753ECF  BE7A45DA
C17F4CE5  C48453F0  C7895AFB  CA8E6206  CD936911  D098701C
D39D7727  D6A27E32  D9A7853D  DCAC8C48  DFB19353  E2B69A5E
E5BBA169  E8C0A874  EBC5AF7F  EECAB68A  F1CFBD95  F4D4C4A0
F7D9CBAB  FADED2B6  FDE3D9C1  00E8E0CC  03EDE7D7  06F2EEE2
09F7F5ED  0CFCFCF8  10020403  13070B0E  160C1219  19111924
1C16202F  1F1B273A  22202E45  25253550  282A3C5B  2B2F4366
2E344A71  3139517C  343E5887  37435F92  3A48669D  3D4D6DA8
```

| | | | | | |
|---|---|---|---|---|---|
| 405274B3 | 43577BBE | 465C82C9 | 496189D4 | 4C6690DF | 4F6B97EA |
| 52709EF5 | 5575A600 | 587AAD0B | 5B7FB416 | 5E84BB21 | 6189C22C |
| 648EC937 | 6793D042 | 6A98D74D | 6D9DDE58 | 70A2E563 | 73A7EC6E |
| 76ACF379 | 79B1FA84 | 7CB7018F | 7FBC089A | 82C10FA5 | 85C616B0 |
| 88CB1DBB | 8BD024C6 | 8ED52BD1 | 91DA32DC | 94DF39E7 | 97E440F2 |
| 9AE947FD | 9DEE4F08 | A0F35613 | A3F85D1E | A6FD6429 | AA026B34 |
| AD07723F | B00C794A | B3118055 | B6168760 | B91B8E6B | BC209576 |
| BF259C81 | C22AA38C | C52FAA97 | C834B1A2 | CB39B8AD | CE3EBFB8 |
| D143C6C3 | D448CDCE | D74DD4D9 | DA52DBE4 | DD57E2EF | E05CE9FA |
| E361F105 | E666F810 | E96BFF1B | EC710626 | EF760D31 | F27B143C |
| F5801B47 | F8852252 | FB8A295D | FE8F3068 | 01943773 | 04993E7E |
| 079E4589 | 0AA34C94 | 0DA8539F | 10AD5AAA | 13B261B5 | 16B768C0 |
| 19BC6FCB | 1CC176D6 | 1FC67DE1 | 22CB84EC | 25D08BF7 | 28D59302 |
| 2BDA9A0D | 2EDFA118 | 31E4A823 | 34E9AF2E | 37EEB639 | 3AF3BD44 |
| 3DF8C44F | 40FDCB5A | 4402D265 | 4707D970 | 4A0CE07B | 4D11E786 |
| 5016EE91 | 531BF59C | 5620FCA7 | 592603B2 | 5C2B0ABD | 5F3011C8 |
| 623518D3 | 653A1FDE | 683F26E9 | 6B442DF4 | 6E4934FF | 714E3C0A |
| 74534315 | 77584A20 | 7A5D512B | 7D625836 | 80675F41 | 836C664C |
| 86716D57 | 89767462 | 8C7B7B6D | 8F808278 | 92858983 | 958A908E |
| 988F9799 | 9B949EA4 | 9E99A5AF | A19EACBA | A4A3B3C5 | A7A8BAD0 |
| AAADC1DB | ADB2C8E6 | B0B7CFF1 | B3BCD6FC | B6C1DE07 | B9C6E512 |
| BCCBEC1D | BFD0F328 | C2D5FA33 | C5DB013E | C8E00849 | CBE50F54 |
| CEEA165F | D1EF1D6A | D4F42475 | D7F92B80 | DAFE328B | DE033996 |
| E10840A1 | E40D47AC | E7124EB7 | EA1755C2 | ED1C5CCD | F02163D8 |
| F3266AE3 | F62B71EE | F93078F9 | FC358004 | FF3A870F | 023F8E1A |
| 05449525 | 08499C30 | 0B4EA33B | 0E53AA46 | 1158B151 | 145DB85C |
| 1762BF67 | 1A67C672 | 1D6CCD7D | 2071D488 | 2376DB93 | 267BE29E |
| 2980E9A9 | 2C85F0B4 | 2F8AF7BF | 328FFECA | 359505D5 | 389A0CE0 |
| 3B9F13EB | 3EA41AF6 | 41A92201 | 44AE290C | 47B33017 | 4AB83722 |
| 4DBD3E2D | 50C24538 | 53C74C43 | 56CC534E | 59D15A59 | 5CD66164 |
| 5FDB686F | 62E06F7A | 65E57685 | 68EA7D90 | 6BEF849B | 6EF48BA6 |
| 71F992B1 | 74FE99BC | 7803A0C7 | 7B08A7D2 | 7E0DAEDD | 8112B5E8 |
| 8417BCF3 | 871CC3FE | 8A21CB09 | 8D26D214 | 902BD91F | 9330E02A |
| 9635E735 | 993AEE40 | 9C3FF54B | 9F44FC56 | A24A0361 | A54F0A6C |
| A8541177 | AB591882 | AE5E1F8D | B1632698 | B4682DA3 | B76D34AE |
| BA723BB9 | BD7742C4 | C07C49CF | C38150DA | C68657E5 | C98B5EF0 |
| CC9065FB | CF956D06 | D29A7411 | D59F7B1C | D8A48227 | DBA98932 |
| DEAE903D | E1B39748 | E4B89E53 | E7BDA55E | EAC2AC69 | EDC7B374 |
| F0CCBA7F | F3D1C18A | F6D6C895 | F9DBCFA0 | FCE0D6AB | FFE5DDB6 |
| 02EAE4C1 | 05EFEBCC | 08F4F2D7 | 0BF9F9E2 | 0EFF00ED | 120407F8 |
| 15090F03 | 180E160E | 1B131D19 | 1E182424 | 211D2B2F | 2422323A |
| 27273945 | 2A2C4050 | 2D31475B | 30364E66 | 333B5571 | 36405C7C |
| 39456387 | 3C4A6A92 | 3F4F719D | 425478A8 | 45597FB3 | 485E86BE |
| 4B638DC9 | 4E6894D4 | 516D9BDF | 5472A2EA | 5777A9F5 | 5A7CB100 |
| 5D81B80B | 6086BF16 | 638BC621 | 6690CD2C | 6995D437 | 6C9ADB42 |
| 6F9FE24D | 72A4E958 | 75A9F063 | 78AEF76E | 7BB3FE79 | 7EB90584 |

| | | | | | |
|---|---|---|---|---|---|
| 81BE0C8F | 84C3139A | 87C81AA5 | 8ACD21B0 | 8DD228BB | 90D72FC6 |
| 93DC36D1 | 96E13DDC | 99E644E7 | 9CEB4BF2 | 9FF052FD | A2F55A08 |
| A5FA6113 | A8FF681E | AC046F29 | AF097634 | B20E7D3F | B513844A |
| B8188B55 | BB1D9260 | BE22996B | C127A076 | C42CA781 | C731AE8C |
| CA36B597 | CD3BBCA2 | D040C3AD | D345CAB8 | D64AD1C3 | D94FD8CE |
| DC54DFD9 | DF59E6E4 | E25EEDEF | E563F4FA | E868FC05 | EB6E0310 |
| EE730A1B | F1781126 | F47D1831 | F7821F3C | FA872647 | FD8C2D52 |
| 0091345D | 03963B68 | 069B4273 | 09A0497E | 0CA55089 | 0FAA5794 |
| 12AF5E9F | 15B465AA | 18B96CB5 | 1BBE73C0 | 1EC37ACB | 21C881D6 |
| 24CD88E1 | 27D28FEC | 2AD796F7 | 2DDC9E02 | 30E1A50D | 33E6AC18 |
| 36EBB323 | 39F0BA2E | 3CF5C139 | 3FFAC844 | 42FFCF4F | 4604D65A |
| 4909DD65 | 4C0EE470 | 4F13EB7B | 5218F286 | 551DF991 | 5823009C |
| 5B2807A7 | 5E2D0EB2 | 613215BD | 64371CC8 | 673C23D3 | 6A412ADE |
| 6D4631E9 | 704B38F4 | 73503FFF | 7655470A | 795A4E15 | 7C5F5520 |
| 7F645C2B | 82696336 | 856E6A41 | 8873714C | 8B787857 | 8E7D7F62 |
| 9182866D | 94878D78 | 978C9483 | 9A919B8E | 9D96A299 | A09BA9A4 |
| A3A0B0AF | A6A5B7BA | A9AABEC5 | ACAFC5D0 | AFB4CCDB | B2B9D3E6 |
| B5BEDAF1 | B8C3E1FC | BBC8E907 | BECDF012 | C1D2F71D | C4D7FE28 |
| C7DD0533 | CAE20C3E | CDE71349 | D0EC1A54 | D3F1215F | D6F6286A |
| D9FB2F75 | DD003680 | E0053D8B | E30A4496 | E60F4BA1 | E91452AC |
| EC1959B7 | EF1E60C2 | F22367CD | F5286ED8 | F82D75E3 | FB327CEE |
| FE3783F9 | 013C8B04 | 0441920F | 0746991A | 0A4BA025 | 0D50A730 |
| 1055AE3B | 135AB546 | 165FBC51 | 1964C35C | 1C69CA67 | 1F6ED172 |
| 2273D87D | 2578DF88 | 287DE693 | 2B82ED9E | 2E87F4A9 | 318CFBB4 |
| 349202BF | 379709CA | 3A9C10D5 | 3DA117E0 | 40A61EEB | 43AB25F6 |
| 46B02D01 | 49B5340C | 4CBA3B17 | 4FBF4222 | 52C4492D | 55C95038 |
| 58CE5743 | 5BD35E4E | 5ED86559 | 61DD6C64 | 64E2736F | 67E77A7A |
| 6AEC8185 | 6DF18890 | 70F68F9B | 73FB96A6 | 77009DB1 | 7A05A4BC |
| 7D0AABC7 | 800FB2D2 | 8314B9DD | 8619C0E8 | 891EC7F3 | 8C23CEFE |
| 8F28D609 | 922DDD14 | 9532E41F | 9837EB2A | 9B3CF235 | 9E41F940 |
| A147004B | A44C0756 | A7510E61 | AA56156C | AD5B1C77 | B0602382 |
| B3652A8D | B66A3198 | B96F38A3 | BC743FAE | BF7946B9 | C27E4DC4 |
| C58354CF | C8885BDA | CB8D62E5 | CE9269F0 | D19770FB | D49C7806 |
| D7A17F11 | DAA6861C | DDAB8D27 | E0B09432 | E3B59B3D | E6BAA248 |
| E9BFA953 | ECC4B05E | EFC9B769 | F2CEBE74 | F5D3C57F | F8D8CC8A |
| FBDDD395 | FEE2DAA0 | 01E7E1AB | 04ECE8B6 | 07F1EFC1 | 0AF6F6CC |
| 0DFBFDD7 | 110104E2 | 14060BED | 170B12F8 | 1A101A03 | 1D15210E |
| 201A2819 | 231F2F24 | 2624362F | 29293D3A | 2C2E4445 | 2F334B50 |
| 3238525B | 353D5966 | 38426071 | 3B47677C | 3E4C6E87 | 41517592 |
| 44567C9D | 475B83A8 | 4A608AB3 | 4D6591BE | 506A98C9 | 536F9FD4 |
| 5674A6DF | 5979ADEA | 5C7EB4F5 | 5F83BC00 | 6288C30B | 658DCA16 |
| 6892D121 | 6B97D82C | 6E9CDF37 | 71A1E642 | 74A6ED4D | 77ABF458 |
| 7AB0FB63 | 7DB6026E | 80BB0979 | 83C01084 | 86C5178F | 89CA1E9A |
| 8CCF25A5 | 8FD42CB0 | 92D933BB | 95DE3AC6 | 98E341D1 | 9BE848DC |
| 9EED4FE7 | A1F256F2 | A4F75DFD | A7FC6508 | AB016C13 | AE06731E | (Cont. at
| B10B7A29 | B4108134 | B715883F | BA1A8F4A | BD1F9655 | C0249D60 | FIG. 14D) |

FIG. 14C

| | | | | | |
|---|---|---|---|---|---|
| C329A46B | C62EAB76 | C933B281 | CC38B98C | CF3DC097 | D242C7A2 |
| D547CEAD | D84CD5B8 | DB51DCC3 | DE56E3CE | E15BEAD9 | E460F1E4 |
| E765F8EF | EA6AFFFA | ED700705 | F0750E10 | F37A151B | F67F1C26 |
| F9842331 | FC892A3C | FF8E3147 | 02933852 | 05983F5D | 089D4668 |
| 0BA24D73 | 0EA7547E | 11AC5B89 | 14B16294 | 17B6699F | 1ABB70AA |
| 1DC077B5 | 20C57EC0 | 23CA85CB | 26CF8CD6 | 29D493E1 | 2CD99AEC |
| 2FDEA1F7 | 32E3A902 | 35E8B00D | 38EDB718 | 3BF2BE23 | 3EF7C52E |
| 41FCCC39 | 4501D344 | 4806DA4F | 4B0BE15A | 4E10E865 | 5115EF70 |
| 541AF67B | 571FFD86 | 5A250491 | 5D2A0B9C | 602F12A7 | 633419B2 |
| 663920BD | 693E27C8 | 6C432ED3 | 6F4835DE | 724D3CE9 | 755243F4 |
| 78574AFF | 7B5C520A | 7E615915 | 81666020 | 846B672B | 87706E36 |
| 8A757541 | 8D7A7C4C | 907F8357 | 93848A62 | 9689916D | 998E9878 |
| 9C939F83 | 9F98A68E | A29DAD99 | A5A2B4A4 | A8A7BBAF | ABACC2BA |
| AEB1C9C5 | B1B6D0D0 | B4BBD7DB | B7C0DEE6 | BAC5E5F1 | BDCAECFC |
| C0CFF407 | C3D4FB12 | C6DA021D | C9DF0928 | CCE41033 | CFE9173E |
| D2EE1E49 | D5F32554 | D8F82C5F | DBFD336A | DF023A75 | E2074180 |
| E50C488B | E8114F96 | EB1656A1 | EE1B5DAC | F12064B7 | F4256BC2 |
| F72A72CD | FA2F79D8 | FD3480E3 | 003987EE | 033E8EF9 | 06439604 |
| 09489D0F | 0C4DA41A | 0F52AB25 | 1257B230 | 155CB93B | 1861C046 |
| 1B66C751 | 1E6BCE5C | 2170D567 | 2475DC72 | 277AE37D | 2A7FEA88 |
| 2D84F193 | 3089F89E | 338EFFA9 | 369406B4 | 39990DBF | 3C9E14CA |
| 3FA31BD5 | 42A822E0 | 45AD29EB | 48B230F6 | 4BB73801 | 4EBC3F0C |
| 51C14617 | 54C64D22 | 57CB542D | 5AD05B38 | 5DD56243 | 60DA694E |
| 63DF7059 | 66E47764 | 69E97E6F | 6CEE857A | 6FF38C85 | 72F89390 |
| 75FD9A9B | 7902A1A6 | 7C07A8B1 | 7F0CAFBC | 8211B6C7 | 8516BDD2 |
| 881BC4DD | 8B20CBE8 | 8E25D2F3 | 912AD9FE | 942FE109 | 9734E814 |
| 9A39EF1F | 9D3EF62A | A043FD35 | A3490440 | A64E0B4B | A9531256 |
| AC581961 | AF5D206C | B2622777 | B5672E82 | B86C358D | BB713C98 |
| BE7643A3 | C17B4AAE | C48051B9 | C78558C4 | CA8A5FCF | CD8F66DA |
| D0946DE5 | D39974F0 | D69E7BFB | D9A38306 | DCA88A11 | DFAD911C |
| E2B29827 | E5B79F32 | E8BCA63D | EBC1AD48 | EEC6B453 | F1CBBB5E |
| F4D0C269 | F7D5C974 | FADAD07F | FDDFD78A | 00E4DE95 | 03E9E5A0 |
| 06EEECAB | 09F3F3B6 | 0CF8FAC1 | 0FFE01CC | 130308D7 | 16080FE2 |

FIG. 14D

Frequency Analysis Table for All Byte Values in the Sample Sequence
Length: 4,080 bytes
seed=0E00000E, constrained primeM=0305070B

8,184 Bytes of Merged (Interleaved) Sample Sequence Data Generated Using
Constrained primeM Primes
seed=0E00000E, primeM1=0103050D, primeM2=0305070B, Data is not compressible

| | | | | | |
|---|---|---|---|---|---|
| 0F03051B | 11050719 | 10060A28 | 140A0E24 | 11090F35 | 170F152F |
| 120C1442 | 1A141C3A | 130F194F | 1D192345 | 14121E5C | 201E2A50 |
| 15152369 | 2323315B | 16182876 | 26283866 | 171B2D83 | 292D3F71 |
| 181E3290 | 2C32467C | 1921379D | 2F374D87 | 1A243CAA | 323C5492 |
| 1B2741B7 | 35415B9D | 1C2A46C4 | 384662A8 | 1D2D4BD1 | 3B4B69B3 |
| 1E3050DE | 3E5070BE | 1F3355EB | 415577C9 | 20365AF8 | 445A7ED4 |
| 21396005 | 475F85DF | 223C6512 | 4A648CEA | 233F6A1F | 4D6993F5 |
| 24426F2C | 506E9B00 | 25457439 | 5373A20B | 26487946 | 5678A916 |
| 274B7E53 | 597DB021 | 284E8360 | 5C82B72C | 2951886D | 5F87BE37 |
| 2A548D7A | 628CC542 | 2B579287 | 6591CC4D | 2C5A9794 | 6896D358 |
| 2D5D9CA1 | 6B9BDA63 | 2E60A1AE | 6EA0E16E | 2F63A6BB | 71A5E879 |
| 3066ABC8 | 74AAEF84 | 3169B0D5 | 77AFF68F | 326CB5E2 | 7AB4FD9A |
| 336FBAEF | 7DBA04A5 | 3472BFFC | 80BF0BB0 | 3575C509 | 83C412BB |
| 3678CA16 | 86C919C6 | 377BCF23 | 89CE20D1 | 387ED430 | 8CD327DC |
| 3981D93D | 8FD82EE7 | 3A84DE4A | 92DD35F2 | 3B87E357 | 95E23CFD |
| 3C8AE864 | 98E74408 | 3D8DED71 | 9BEC4B13 | 3E90F27E | 9EF1521E |
| 3F93F78B | A1F65929 | 4096FC98 | A4FB6034 | 419A01A5 | A800673F |
| 429D06B2 | AB056E4A | 43A00BBF | AE0A7555 | 44A310CC | B10F7C60 |
| 45A615D9 | B414836B | 46A91AE6 | B7198A76 | 47AC1FF3 | BA1E9181 |
| 48AF2500 | BD23988C | 49B22A0D | C0289F97 | 4AB52F1A | C32DA6A2 |
| 4BB83427 | C632ADAD | 4CBB3934 | C937B4B8 | 4DBE3E41 | CC3CBBC3 |
| 4EC1434E | CF41C2CE | 4FC4485B | D246C9D9 | 50C74D68 | D54BD0E4 |
| 51CA5275 | D850D7EF | 52CD5782 | DB55DEFA | 53D05C8F | DE5AE605 |
| 54D3619C | E15FED10 | 55D666A9 | E464F41B | 56D96BB6 | E769FB26 |
| 57DC70C3 | EA6F0231 | 58DF75D0 | ED74093C | 59E27ADD | F0791047 |
| 5AE57FEA | F37E1752 | 5BE884F7 | F6831E5D | 5CEB8A04 | F9882568 |
| 5DEE8F11 | FC8D2C73 | 5EF1941E | FF92337E | 5FF4992B | 02973A89 |
| 60F79E38 | 059C4194 | 61FAA345 | 08A1489F | 62FDA852 | 0BA64FAA |
| 6400AD5F | 0EAB56B5 | 6503B26C | 11B05DC0 | 6606B779 | 14B564CB |
| 6709BC86 | 17BA6BD6 | 680CC193 | 1ABF72E1 | 690FC6A0 | 1DC479EC |
| 6A12CBAD | 20C980F7 | 6B15D0BA | 23CE8802 | 6C18D5C7 | 26D38F0D |
| 6D1BDAD4 | 29D89618 | 6E1EDFE1 | 2CDD9D23 | 6F21E4EE | 2FE2A42E |
| 7024E9FB | 32E7AB39 | 7127EF08 | 35ECB244 | 722AF415 | 38F1B94F |
| 732DF922 | 3BF6C05A | 7430FE2F | 3EFBC765 | 7534033C | 4200CE70 |
| 76370849 | 4505D57B | 773A0D56 | 480ADC86 | 783D1263 | 4B0FE391 |
| 79401770 | 4E14EA9C | 7A431C7D | 5119F1A7 | 7B46218A | 541EF8B2 |
| 7C492697 | 5723FFBD | 7D4C2BA4 | 5A2906C8 | 7E4F30B1 | 5D2E0DD3 |
| 7F5235BE | 603314DE | 80553ACB | 63381BE9 | 81583FD8 | 663D22F4 |
| 825B44E5 | 694229FF | 835E49F2 | 6C47310A | 84614EFF | 6F4C3815 |
| 8564540C | 72513F20 | 86675919 | 7556462B | 876A5E26 | 785B4D36 |
| 886D6333 | 7B605441 | 89706840 | 7E655B4C | 8A736D4D | 816A6257 |
| 8B76725A | 846F6962 | 8C797767 | 8774706D | 8D7C7C74 | 8A797778 |
| 8E7F8181 | 8D7E7E83 | 8F82868E | 9083858E | 90858B9B | 93888C99 |
| 918890A8 | 968D93A4 | 928B95B5 | 99929AAF | 938E9AC2 | 9C97A1BA |
| 94919FCF | 9F9CA8C5 | 9594A4DC | A2A1AFD0 | 9697A9E9 | A5A6B6DB |
| 979AAEF6 | A8ABBDE6 | 989DB403 | ABB0C4F1 | 99A0B910 | AEB5CBFC |

| | | | | | |
|---|---|---|---|---|---|
| 9AA3BE1D | B1BAD307 | 9BA6C32A | B4BFDA12 | 9CA9C837 | B7C4E11D |
| 9DACCD44 | BAC9E828 | 9EAFD251 | BDCEEF33 | 9FB2D75E | C0D3F63E |
| A0B5DC6B | C3D8FD49 | A1B8E178 | C6DE0454 | A2BBE685 | C9E30B5F |
| A3BEEB92 | CCE8126A | A4C1F09F | CFED1975 | A5C4F5AC | D2F22080 |
| A6C7FAB9 | D5F7278B | A7CAFFC6 | D8FC2E96 | A8CE04D3 | DC0135A1 |
| A9D109E0 | DF063CAC | AAD40EED | E20B43B7 | ABD713FA | E5104AC2 |
| ACDA1907 | E81551CD | ADDD1E14 | EB1A58D8 | AEE02321 | EE1F5FE3 |
| AFE3282E | F12466EE | B0E62D3B | F4296DF9 | B1E93248 | F72E7504 |
| B2EC3755 | FA337C0F | B3EF3C62 | FD38831A | B4F2416F | 003D8A25 |
| B5F5467C | 03429130 | B6F84B89 | 0647983B | B7FB5096 | 094C9F46 |
| B8FE55A3 | 0C51A651 | BA015AB0 | 0F56AD5C | BB045FBD | 125BB467 |
| BC0764CA | 1560BB72 | BD0A69D7 | 1865C27D | BE0D6EE4 | 1B6AC988 |
| BF1073F1 | 1E6FD093 | C01378FE | 2174D79E | C1167E0B | 2479DEA9 |
| C2198318 | 277EE5B4 | C31C8825 | 2A83ECBF | C41F8D32 | 2D88F3CA |
| C522923F | 308DFAD5 | C625974C | 339301E0 | C7289C59 | 369808EB |
| C82BA166 | 399D0FF6 | C92EA673 | 3CA21701 | CA31AB80 | 3FA71E0C |
| CB34B08D | 42AC2517 | CC37B59A | 45B12C22 | CD3ABAA7 | 48B6332D |
| CE3DBFB4 | 4BBB3A38 | CF40C4C1 | 4EC04143 | D043C9CE | 51C5484E |
| D146CEDB | 54CA4F59 | D249D3E8 | 57CF5664 | D34CD8F5 | 5AD45D6F |
| D44FDE02 | 5DD9647A | D552E30F | 60DE6B85 | D655E81C | 63E37290 |
| D758ED29 | 66E8799B | D85BF236 | 69ED80A6 | D95EF743 | 6CF287B1 |
| DA61FC50 | 6FF78EBC | DB65015D | 72FC95C7 | DC68066A | 76019CD2 |
| DD6B0B77 | 7906A3DD | DE6E1084 | 7C0BAAE8 | DF711591 | 7F10B1F3 |
| E0741A9E | 8215B8FE | E1771FAB | 851AC009 | E27A24B8 | 881FC714 |
| E37D29C5 | 8B24CE1F | E4802ED2 | 8E29D52A | E58333DF | 912EDC35 |
| E68638EC | 9433E340 | E7893DF9 | 9738EA4B | E88C4306 | 9A3DF156 |
| E98F4813 | 9D42F861 | EA924D20 | A047FF6C | EB95522D | A34D0677 |
| EC98573A | A6520D82 | ED9B5C47 | A957148D | EE9E6154 | AC5C1B98 |
| EFA16661 | AF6122A3 | F0A46B6E | B26629AE | F1A7707B | B56B30B9 |
| F2AA7588 | B87037C4 | F3AD7A95 | BB753ECF | F4B07FA2 | BE7A45DA |
| F5B384AF | C17F4CE5 | F6B689BC | C48453F0 | F7B98EC9 | C7895AFB |
| F8BC93D6 | CA8E6206 | F9BF98E3 | CD936911 | FAC29DF0 | D098701C |
| FBC5A2FD | D39D7727 | FCC8A80A | D6A27E32 | FDCBAD17 | D9A7853D |
| FECEB224 | DCAC8C48 | FFD1B731 | DFB19353 | 00D4BC3E | E2B69A5E |
| 01D7C14B | E5BBA169 | 02DAC658 | E8C0A874 | 03DDCB65 | EBC5AF7F |
| 04E0D072 | EECAB68A | 05E3D57F | F1CFBD95 | 06E6DA8C | F4D4C4A0 |
| 07E9DF99 | F7D9CBAB | 08ECE4A6 | FADED2B6 | 09EFE9B3 | FDE3D9C1 |
| 0AF2EEC0 | 00E8E0CC | 0BF5F3CD | 03EDE7D7 | 0CF8F8DA | 06F2EEE2 |
| 0DFBFDE7 | 09F7F5ED | 0EFF02F4 | 0CFCFCF8 | 10020801 | 10020403 |
| 11050D0E | 13070B0E | 1208121B | 160C1219 | 130B1728 | 19111924 |
| 140E1C35 | 1C16202F | 15112142 | 1F1B273A | 1614264F | 22202E45 |
| 17172B5C | 25253550 | 181A3069 | 282A3C5B | 191D3576 | 2B2F4366 |
| 1A203A83 | 2E344A71 | 1B233F90 | 3139517C | 1C26449D | 343E5887 |
| 1D2949AA | 37435F92 | 1E2C4EB7 | 3A48669D | 1F2F53C4 | 3D4D6DA8 |
| 203258D1 | 405274B3 | 21355DDE | 43577BBE | 223862EB | 465C82C9 |
| 233B67F8 | 496189D4 | 243E6D05 | 4C6690DF | 25417212 | 4F6B97EA |
| 2644771F | 52709EF5 | 27477C2C | 5575A600 | 284A8139 | 587AAD0B |
| 294D8646 | 5B7FB416 | 2A508B53 | 5E84BB21 | 2B539060 | 6189C22C |
| 2C56956D | 648EC937 | 2D599A7A | 6793D042 | 2E5C9F87 | 6A98D74D |
| 2F5FA494 | 6D9DDE58 | 3062A9A1 | 70A2E563 | 3165AEAE | 73A7EC6E |
| 3268B3BB | 76ACF379 | 336BB8C8 | 79B1FA84 | 346EBDD5 | 7CB7018F |
| 3571C2E2 | 7FBC089A | 3674C7EF | 82C10FA5 | 3777CCFC | 85C616B0 |

| | | | | | |
|---|---|---|---|---|---|
| 387AD209 | 88CB1DBB | 397DD716 | 8BD024C6 | 3A80DC23 | 8ED52BD1 |
| 3B83E130 | 91DA32DC | 3C86E63D | 94DF39E7 | 3D89EB4A | 97E440F2 |
| 3E8CF057 | 9AE947FD | 3F8FF564 | 9DEE4F08 | 4092FA71 | A0F35613 |
| 4195FF7E | A3F85D1E | 4299048B | A6FD6429 | 439C0998 | AA026B34 |
| 449F0EA5 | AD07723F | 45A213B2 | B00C794A | 46A518BF | B3118055 |
| 47A81DCC | B6168760 | 48AB22D9 | B91B8E6B | 49AE27E6 | BC209576 |
| 4AB12CF3 | BF259C81 | 4BB43200 | C22AA38C | 4CB7370D | C52FAA97 |
| 4DBA3C1A | C834B1A2 | 4EBD4127 | CB39B8AD | 4FC04634 | CE3EBFB8 |
| 50C34B41 | D143C6C3 | 51C6504E | D448CDCE | 52C9555B | D74DD4D9 |
| 53CC5A68 | DA52DBE4 | 54CF5F75 | DD57E2EF | 55D26482 | E05CE9FA |
| 56D5698F | E361F105 | 57D86E9C | E666F810 | 58DB73A9 | E96BFF1B |
| 59DE78B6 | EC710626 | 5AE17DC3 | EF760D31 | 5BE482D0 | F27B143C |
| 5CE787DD | F5801B47 | 5DEA8CEA | F8852252 | 5EED91F7 | FB8A295D |
| 5FF09704 | FE8F3068 | 60F39C11 | 01943773 | 61F6A11E | 04993E7E |
| 62F9A62B | 079E4589 | 63FCAB38 | 0AA34C94 | 64FFB045 | 0DA8539F |
| 6602B552 | 10AD5AAA | 6705BA5F | 13B261B5 | 6808BF6C | 16B768C0 |
| 690BC479 | 19BC6FCB | 6A0EC986 | 1CC176D6 | 6B11CE93 | 1FC67DE1 |
| 6C14D3A0 | 22CB84EC | 6D17D8AD | 25D08BF7 | 6E1ADDBA | 28D59302 |
| 6F1DE2C7 | 2BDA9A0D | 7020E7D4 | 2EDFA118 | 7123ECE1 | 31E4A823 |
| 7226F1EE | 34E9AF2E | 7329F6FB | 37EEB639 | 742CFC08 | 3AF3BD44 |
| 75300115 | 3DF8C44F | 76330622 | 40FDCB5A | 77360B2F | 4402D265 |
| 7839103C | 4707D970 | 793C1549 | 4A0CE07B | 7A3F1A56 | 4D11E786 |
| 7B421F63 | 5016EE91 | 7C452470 | 531BF59C | 7D48297D | 5620FCA7 |
| 7E4B2E8A | 592603B2 | 7F4E3397 | 5C2B0ABD | 805138A4 | 5F3011C8 |
| 81543DB1 | 623518D3 | 825742BE | 653A1FDE | 835A47CB | 683F26E9 |
| 845D4CD8 | 6B442DF4 | 856051E5 | 6E4934FF | 866356F2 | 714E3C0A |
| 87665BFF | 74534315 | 8869610C | 77584A20 | 896C6619 | 7A5D512B |
| 8A6F6B26 | 7D625836 | 8B727033 | 80675F41 | 8C757540 | 836C664C |
| 8D787A4D | 86716D57 | 8E7B7F5A | 89767462 | 8F7E8467 | 8C7B7B6D |
| 90818974 | 8F808278 | 91848E81 | 92858983 | 9287938E | 958A908E |
| 938A989B | 988F9799 | 948D9DA8 | 9B949EA4 | 9590A2B5 | 9E99A5AF |
| 9693A7C2 | A19EACBA | 9796ACCF | A4A3B3C5 | 9899B1DC | A7A8BAD0 |
| 999CB6E9 | AAADC1DB | 9A9FBBF6 | ADB2C8E6 | 9BA2C103 | B0B7CFF1 |
| 9CA5C610 | B3BCD6FC | 9DA8CB1D | B6C1DE07 | 9EABD02A | B9C6E512 |
| 9FAED537 | BCCBEC1D | A0B1DA44 | BFD0F328 | A1B4DF51 | C2D5FA33 |
| A2B7E45E | C5DB013E | A3BAE96B | C8E00849 | A4BDEE78 | CBE50F54 |
| A5C0F385 | CEEA165F | A6C3F892 | D1EF1D6A | A7C6FD9F | D4F42475 |
| A8CA02AC | D7F92B80 | A9CD07B9 | DAFE328B | AAD00CC6 | DE033996 |
| ABD311D3 | E10840A1 | ACD616E0 | E40D47AC | ADD91BED | E7124EB7 |
| AEDC20FA | EA1755C2 | AFDF2607 | ED1C5CCD | B0E22B14 | F02163D8 |
| B1E53021 | F3266AE3 | B2E8352E | F62B71EE | B3EB3A3B | F93078F9 |
| B4EE3F48 | FC358004 | B5F14455 | FF3A870F | B6F44962 | 023F8E1A |
| B7F74E6F | 05449525 | B8FA537C | 08499C30 | B9FD5889 | 0B4EA33B |
| BB005D96 | 0E53AA46 | BC0362A3 | 1158B151 | BD0667B0 | 145DB85C |
| BE096CBD | 1762BF67 | BF0C71CA | 1A67C672 | C00F76D7 | 1D6CCD7D |
| C1127BE4 | 2071D488 | C21580F1 | 2376DB93 | C31885FE | 267BE29E |
| C41B8B0B | 2980E9A9 | C51E9018 | 2C85F0B4 | C6219525 | 2F8AF7BF |
| C7249A32 | 328FFECA | C8279F3F | 359505D5 | C92AA44C | 389A0CE0 |
| CA2DA959 | 3B9F13EB | CB30AE66 | 3EA41AF6 | CC33B373 | 41A92201 |
| CD36B880 | 44AE290C | CE39BD8D | 47B33017 | CF3CC29A | 4AB83722 |
| D03FC7A7 | 4DBD3E2D | D142CCB4 | 50C24538 | D245D1C1 | 53C74C43 |
| D348D6CE | 56CC534E | D44BDBDB | 59D15A59 | D54EE0E8 | 5CD66164 |

```
D651E5F5  5FDB686F  D754EB02  62E06F7A  D857F00F  65E57685
D95AF51C  68EA7D90  DA5DFA29  6BEF849B  DB60FF36  6EF48BA6
DC640443  71F992B1  DD670950  74FE99BC  DE6A0E5D  7803A0C7
DF6D136A  7B08A7D2  E0701877  7E0DAEDD  E1731D84  8112B5E8
E2762291  8417BCF3  E379279E  871CC3FE  E47C2CAB  8A21CB09
E57F31B8  8D26D214  E68236C5  902BD91F  E7853BD2  9330E02A
E88840DF  9635E735  E98B45EC  993AEE40  EA8E4AF9  9C3FF54B
EB915006  9F44FC56  EC945513  A24A0361  ED975A20  A54F0A6C
EE9A5F2D  A8541177  EF9D643A  AB591882  F0A06947  AE5E1F8D
F1A36E54  B1632698  F2A67361  B4682DA3  F3A9786E  B76D34AE
F4AC7D7B  BA723BB9  F5AF8288  BD7742C4  F6B28795  C07C49CF
F7B58CA2  C38150DA  F8B891AF  C68657E5  F9BB96BC  C98B5EF0
FABE9BC9  CC9065FB  FBC1A0D6  CF956D06  FCC4A5E3  D29A7411
FDC7AAF0  D59F7B1C  FECAAFFD  D8A48227  FFCDB50A  DBA98932
00D0BA17  DEAE903D  01D3BF24  E1B39748  02D6C431  E4B89E53
03D9C93E  E7BDA55E  04DCCE4B  EAC2AC69  05DFD358  EDC7B374
06E2D865  F0CCBA7F  07E5DD72  F3D1C18A  08E8E27F  F6D6C895
09EBE78C  F9DBCFA0  0AEEEC99  FCE0D6AB  0BF1F1A6  FFE5DDB6
0CF4F6B3  02EAE4C1  0DF7FBC0  05EFEBCC  0EFB00CD  08F4F2D7
0FFE05DA  0BF9F9E2  11010AE7  0EFF00ED  12040FF4  120407F8
13071501  15090F03  140A1A0E  180E160E  150D1F1B  1B131D19
16102428  1E182424  17132935  211D2B2F  18162E42  2422323A
1919334F  27273945  1A1C385C  2A2C4050  1B1F3D69  2D31475B
1C224276  30364E66  1D254783  333B5571  1E284C90  36405C7C
1F2B519D  39456387  202E56AA  3C4A6A92  21315BB7  3F4F719D
223460C4  425478A8  233765D1  45597FB3  243A6ADE  485E86BE
253D6FEB  4B638DC9  264074F8  4E6894D4  27437A05  516D9BDF
28467F12  5472A2EA  2949841F  5777A9F5  2A4C892C  5A7CB100
2B4F8E39  5D81B80B  2C529346  6086BF16  2D559853  638BC621
2E589D60  6690CD2C  2F5BA26D  6995D437  305EA77A  6C9ADB42
3161AC87  6F9FE24D  3264B194  72A4E958  3367B6A1  75A9F063
346ABBAE  78AEF76E  356DC0BB  7BB3FE79  3670C5C8  7EB90584
3773CAD5  81BE0C8F  3876CFE2  84C3139A  3979D4EF  87C81AA5
3A7CD9FC  8ACD21B0  3B7FDF09  8DD228BB  3C82E416  90D72FC6
3D85E923  93DC36D1  3E88EE30  96E13DDC  3F8BF33D  99E644E7
408EF84A  9CEB4BF2  4191FD57  9FF052FD  42950264  A2F55A08
43980771  A5FA6113  449B0C7E  A8FF681E  459E118B  AC046F29
46A11698  AF097634  47A41BA5  B20E7D3F  48A720B2  B513844A
49AA25BF  B8188B55  4AAD2ACC  BB1D9260  4BB02FD9  BE22996B
4CB334E6  C127A076  4DB639F3  C42CA781  4EB93F00  C731AE8C
4FBC440D  CA36B597  50BF491A  CD3BBCA2  51C24E27  D040C3AD
52C55334  D345CAB8  53C85841  D64AD1C3  54CB5D4E  D94FD8CE
55CE625B  DC54DFD9  56D16768  DF59E6E4  57D46C75  E25EEDEF
58D77182  E563F4FA  59DA768F  E868FC05  5ADD7B9C  EB6E0310
5BE080A9  EE730A1B  5CE385B6  F1781126  5DE68AC3  F47D1831
5EE98FD0  F7821F3C  5FEC94DD  FA872647  60EF99EA  FD8C2D52
61F29EF7  0091345D  62F5A404  03963B68  63F8A911  069B4273
64FBAE1E  09A0497E  65FEB32B  0CA55089  6701B838  0FAA5794
6804BD45  12AF5E9F  6907C252  15B465AA  6A0AC75F  18B96CB5
6B0DCC6C  1BBE73C0  6C10D179  1EC37ACB  6D13D686  21C881D6   (Cont. at
6E16DB93  24CD88E1  6F19E0A0  27D28FEC  701CE5AD  2AD796F7   FIG. 15E)
```

FIG. 15D

| | | | | | |
|---|---|---|---|---|---|
| 711FEABA | 2DDC9E02 | 7222EFC7 | 30E1A50D | 7325F4D4 | 33E6AC18 |
| 7428F9E1 | 36EBB323 | 752BFEEE | 39F0BA2E | 762F03FB | 3CF5C139 |
| 77320908 | 3FFAC844 | 78350E15 | 42FFCF4F | 79381322 | 4604D65A |
| 7A3B182F | 4909DD65 | 7B3E1D3C | 4C0EE470 | 7C412249 | 4F13EB7B |
| 7D442756 | 5218F286 | 7E472C63 | 551DF991 | 7F4A3170 | 5823009C |
| 804D367D | 5B2807A7 | 81503B8A | 5E2D0EB2 | 82534097 | 613215BD |
| 835645A4 | 64371CC8 | 84594AB1 | 673C23D3 | 855C4FBE | 6A412ADE |
| 865F54CB | 6D4631E9 | 876259D8 | 704B38F4 | 88655EE5 | 73503FFF |
| 896863F2 | 7655470A | 8A6B68FF | 795A4E15 | 8B6E6E0C | 7C5F5520 |
| 8C717319 | 7F645C2B | 8D747826 | 82696336 | 8E777D33 | 856E6A41 |
| 8F7A8240 | 8873714C | 907D874D | 8B787857 | 91808C5A | 8E7D7F62 |
| 92839167 | 9182866D | 93869674 | 94878D78 | 94899B81 | 978C9483 |
| 958CA08E | 9A919B8E | 968FA59B | 9D96A299 | 9792AAA8 | A09BA9A4 |
| 9895AFB5 | A3A0B0AF | 9998B4C2 | A6A5B7BA | 9A9BB9CF | A9AABEC5 |
| 9B9EBEDC | ACAFC5D0 | 9CA1C3E9 | AFB4CCDB | 9DA4C8F6 | B2B9D3E6 |
| 9EA7CE03 | B5BEDAF1 | 9FAAD310 | B8C3E1FC | A0ADD81D | BBC8E907 |
| A1B0DD2A | BECDF012 | A2B3E237 | C1D2F71D | A3B6E744 | C4D7FE28 |
| A4B9EC51 | C7DD0533 | A5BCF15E | CAE20C3E | A6BFF66B | CDE71349 |
| A7C2FB78 | D0EC1A54 | A8C60085 | D3F1215F | A9C90592 | D6F6286A |
| AACC0A9F | D9FB2F75 | ABCF0FAC | DD003680 | ACD214B9 | E0053D8B |
| ADD519C6 | E30A4496 | AED81ED3 | E60F4BA1 | AFDB23E0 | E91452AC |
| B0DE28ED | EC1959B7 | B1E12DFA | EF1E60C2 | B2E43307 | F22367CD |
| B3E73814 | F5286ED8 | B4EA3D21 | F82D75E3 | B5ED422E | FB327CEE |
| B6F0473B | FE3783F9 | B7F34C48 | 013C8B04 | B8F65155 | 0441920F |
| B9F95662 | 0746991A | BAFC5B6F | 0A4BA025 | BBFF607C | 0D50A730 |
| BD026589 | 1055AE3B | BE056A96 | 135AB546 | BF086FA3 | 165FBC51 |
| C00B74B0 | 1964C35C | C10E79BD | 1C69CA67 | C2117ECA | 1F6ED172 |
| C31483D7 | 2273D87D | C41788E4 | 2578DF88 | C51A8DF1 | 287DE693 |
| C61D92FE | 2B82ED9E | C720980B | 2E87F4A9 | C8239D18 | 318CFBB4 |
| C926A225 | 349202BF | CA29A732 | 379709CA | CB2CAC3F | 3A9C10D5 |
| CC2FB14C | 3DA117E0 | CD32B659 | 40A61EEB | CE35BB66 | 43AB25F6 |
| CF38C073 | 46B02D01 | D03BC580 | 49B5340C | D13ECA8D | 4CBA3B17 |
| D241CF9A | 4FBF4222 | D344D4A7 | 52C4492D | D447D9B4 | 55C95038 |
| D54ADEC1 | 58CE5743 | D64DE3CE | 5BD35E4E | D750E8DB | 5ED86559 |
| D853EDE8 | 61DD6C64 | D956F2F5 | 64E2736F | DA59F802 | 67E77A7A |
| DB5CFD0F | 6AEC8185 | DC60021C | 6DF18890 | DD630729 | 70F68F9B |
| DE660C36 | 73FB96A6 | DF691143 | 77009DB1 | E06C1650 | 7A05A4BC |
| E16F1B5D | 7D0AABC7 | E272206A | 800FB2D2 | E3752577 | 8314B9DD |
| E4782A84 | 8619C0E8 | E57B2F91 | 891EC7F3 | E67E349E | 8C23CEFE |
| E78139AB | 8F28D609 | E8843EB8 | 922DDD14 | E98743C5 | 9532E41F |
| EA8A48D2 | 9837EB2A | EB8D4DDF | 9B3CF235 | EC9052EC | 9E41F940 |
| ED9357F9 | A147004B | EE965D06 | A44C0756 | EF996213 | A7510E61 |
| F09C6720 | AA56156C | F19F6C2D | AD5B1C77 | F2A2713A | B0602382 |
| F3A57647 | B3652A8D | F4A87B54 | B66A3198 | F5AB8061 | B96F38A3 |
| F6AE856E | BC743FAE | F7B18A7B | BF7946B9 | F8B48F88 | C27E4DC4 |
| F9B79495 | C58354CF | FABA99A2 | C8885BDA | FBBD9EAF | CB8D62E5 |
| FCC0A3BC | CE9269F0 | FDC3A8C9 | D19770FB | FEC6ADD6 | D49C7806 |
| FFC9B2E3 | D7A17F11 | 00CCB7F0 | DAA6861C | 01CFBCFD | DDAB8D27 |
| 02D2C20A | E0B09432 | 03D5C717 | E3B59B3D | 04D8CC24 | E6BAA248 |
| 05DBD131 | E9BFA953 | 06DED63E | ECC4B05E | 07E1DB4B | EFC9B769 |
| 08E4E058 | F2CEBE74 | 09E7E565 | F5D3C57F | 0AEAEA72 | F8D8CC8A |
| 0BEDEF7F | FBDDD395 | 0CF0F48C | FEE2DAA0 | 0DF3F999 | 01E7E1AB |

```
0EF6FEA6  04ECE8B6  0FFA03B3  07F1EFC1  10FD08C0  0AF6F6CC
12000DCD  0DFBFDD7  130312DA  110104E2  140617E7  14060BED
15091CF4  170B12F8  160C2201  1A101A03  170F270E  1D15210E
18122C1B  201A2819  19153128  231F2F24  1A183635  2624362F
1B1B3B42  29293D3A  1C1E404F  2C2E4445  1D21455C  2F334B50
1E244A69  3238525B  1F274F76  353D5966  202A5483  38426071
212D5990  3B47677C  22305E9D  3E4C6E87  233363AA  41517592
243668B7  44567C9D  25396DC4  475B83A8  263C72D1  4A608AB3
273F77DE  4D6591BE  28427CEB  506A98C9  294581F8  536F9FD4
2A488705  5674A6DF  2B4B8C12  5979ADEA  2C4E911F  5C7EB4F5
2D51962C  5F83BC00  2E549B39  6288C30B  2F57A046  658DCA16
305AA553  6892D121  315DAA60  6B97D82C  3260AF6D  6E9CDF37
3363B47A  71A1E642  3466B987  74A6ED4D  3569BE94  77ABF458
366CC3A1  7AB0FB63  376FC8AE  7DB6026E  3872CDBB  80BB0979
3975D2C8  83C01084  3A78D7D5  86C5178F  3B7BDCE2  89CA1E9A
3C7EE1EF  8CCF25A5  3D81E6FC  8FD42CB0  3E84EC09  92D933BB
3F87F116  95DE3AC6  408AF623  98E341D1  418DFB30  9BE848DC
4291003D  9EED4FE7  4394054A  A1F256F2  44970A57  A4F75DFD
459A0F64  A7FC6508  469D1471  AB016C13  47A0197E  AE06731E
48A31E8B  B10B7A29  49A62398  B4108134  4AA928A5  B715883F
4BAC2DB2  BA1A8F4A  4CAF32BF  BD1F9655  4DB237CC  C0249D60
4EB53CD9  C329A46B  4FB841E6  C62EAB76  50BB46F3  C933B281
51BE4C00  CC38B98C  52C1510D  CF3DC097  53C4561A  D242C7A2
54C75B27  D547CEAD  55CA6034  D84CD5B8  56CD6541  DB51DCC3
57D06A4E  DE56E3CE  58D36F5B  E15BEAD9  59D67468  E460F1E4
5AD97975  E765F8EF  5BDC7E82  EA6AFFFA  5CDF838F  ED700705
5DE2889C  F0750E10  5EE58DA9  F37A151B  5FE892B6  F67F1C26
60EB97C3  F9842331  61EE9CD0  FC892A3C  62F1A1DD  FF8E3147
63F4A6EA  02933852  64F7ABF7  05983F5D  65FAB104  089D4668
66FDB611  0BA24D73  6800BB1E  0EA7547E  6903C02B  11AC5B89
6A06C538  14B16294  6B09CA45  17B6699F  6C0CCF52  1ABB70AA
6D0FD45F  1DC077B5  6E12D96C  20C57EC0  6F15DE79  23CA85CB
7018E386  26CF8CD6  711BE893  29D493E1  721EEDA0  2CD99AEC
7321F2AD  2FDEA1F7  7424F7BA  32E3A902  7527FCC7  35E8B00D
762B01D4  38EDB718  772E06E1  3BF2BE23  78310BEE  3EF7C52E
793410FB  41FCCC39  7A371608  4501D344  7B3A1B15  4806DA4F
7C3D2022  4B0BE15A  7D40252F  4E10E865  7E432A3C  5115EF70
7F462F49  541AF67B  80493456  571FFD86  814C3963  5A250491
824F3E70  5D2A0B9C  8352437D  602F12A7  8455488A  633419B2
85584D97  663920BD  865B52A4  693E27C8  875E57B1  6C432ED3
88615CBE  6F4835DE  896461CB  724D3CE9  8A6766D8  755243F4
8B6A6BE5  78574AFF  8C6D70F2  7B5C520A  8D7075FF  7E615915
8E737B0C  81666020  8F768019  846B672B  90798526  87706E36
917C8A33  8A757541  927F8F40  8D7A7C4C  9382944D  907F8357
9485995A  93848A62  95889E67  9689916D  968BA374  998E9878
978EA881  9C939F83  9891AD8E  9F98A68E  9994B29B  A29DAD99
9A97B7A8  A5A2B4A4  9B9ABCB5  A8A7BBAF  9C9DC1C2  ABACC2BA
9DA0C6CF  AEB1C9C5  9EA3CBDC  B1B6D0D0  9FA6D0E9  B4BBD7DB
A0A9D5F6  B7C0DEE6  A1ACDB03  BAC5E5F1  A2AFE010  BDCAECFC
A3B2E51D  C0CFF407  A4B5EA2A  C3D4FB12  A5B8EF37  C6DA021D
A6BBF444  C9DF0928  A7BEF951  CCE41033  A8C1FE5E  CFE9173E
A9C5036B  D2EE1E49  AAC80878  D5F32554  ABCB0D85  D8F82C5F
```

| | | | | | |
|---|---|---|---|---|---|
| ACCE1292 | DBFD336A | ADD1179F | DF023A75 | AED41CAC | E2074180 |
| AFD721B9 | E50C488B | B0DA26C6 | E8114F96 | B1DD2BD3 | EB1656A1 |
| B2E030E0 | EE1B5DAC | B3E335ED | F12064B7 | B4E63AFA | F4256BC2 |
| B5E94007 | F72A72CD | B6EC4514 | FA2F79D8 | B7EF4A21 | FD3480E3 |
| B8F24F2E | 003987EE | B9F5543B | 033E8EF9 | BAF85948 | 06439604 |
| BBFB5E55 | 09489D0F | BCFE6362 | 0C4DA41A | BE01686F | 0F52AB25 |
| BF046D7C | 1257B230 | C0077289 | 155CB93B | C10A7796 | 1861C046 |
| C20D7CA3 | 1B66C751 | C31081B0 | 1E6BCE5C | C41386BD | 2170D567 |
| C5168BCA | 2475DC72 | C61990D7 | 277AE37D | C71C95E4 | 2A7FEA88 |
| C81F9AF1 | 2D84F193 | C9229FFE | 3089F89E | CA25A50B | 338EFFA9 |
| CB28AA18 | 369406B4 | CC2BAF25 | 39990DBF | CD2EB432 | 3C9E14CA |
| CE31B93F | 3FA31BD5 | CF34BE4C | 42A822E0 | D037C359 | 45AD29EB |
| D13AC866 | 48B230F6 | D23DCD73 | 4BB73801 | D340D280 | 4EBC3F0C |
| D443D78D | 51C14617 | D546DC9A | 54C64D22 | D649E1A7 | 57CB542D |
| D74CE6B4 | 5AD05B38 | D84FEBC1 | 5DD56243 | D952F0CE | 60DA694E |
| DA55F5DB | 63DF7059 | DB58FAE8 | 66E47764 | DC5BFFF5 | 69E97E6F |
| DD5F0502 | 6CEE857A | DE620A0F | 6FF38C85 | DF650F1C | 72F89390 |
| E0681429 | 75FD9A9B | E16B1936 | 7902A1A6 | E26E1E43 | 7C07A8B1 |
| E3712350 | 7F0CAFBC | E474285D | 8211B6C7 | E5772D6A | 8516BDD2 |
| E67A3277 | 881BC4DD | E77D3784 | 8B20CBE8 | E8803C91 | 8E25D2F3 |
| E983419E | 912AD9FE | EA8646AB | 942FE109 | EB894BB8 | 9734E814 |
| EC8C50C5 | 9A39EF1F | ED8F55D2 | 9D3EF62A | EE925ADF | A043FD35 |
| EF955FEC | A3490440 | F09864F9 | A64E0B4B | F19B6A06 | A9531256 |
| F29E6F13 | AC581961 | F3A17420 | AF5D206C | F4A4792D | B2622777 |
| F5A77E3A | B5672E82 | F6AA8347 | B86C358D | F7AD8854 | BB713C98 |
| F8B08D61 | BE7643A3 | F9B3926E | C17B4AAE | FAB6977B | C48051B9 |
| FBB99C88 | C78558C4 | FCBCA195 | CA8A5FCF | FDBFA6A2 | CD8F66DA |
| FEC2ABAF | D0946DE5 | FFC5B0BC | D39974F0 | 00C8B5C9 | D69E7BFB |
| 01CBBAD6 | D9A38306 | 02CEBFE3 | DCA88A11 | 03D1C4F0 | DFAD911C |
| 04D4C9FD | E2B29827 | 05D7CF0A | E5B79F32 | 06DAD417 | E8BCA63D |
| 07DDD924 | EBC1AD48 | 08E0DE31 | EEC6B453 | 09E3E33E | F1CBBB5E |
| 0AE6E84B | F4D0C269 | 0BE9ED58 | F7D5C974 | 0CECF265 | FADAD07F |
| 0DEFF772 | FDDFD78A | 0EF2FC7F | 00E4DE95 | 0FF6018C | 03E9E5A0 |
| 10F90699 | 06EEECAB | 11FC0BA6 | 09F3F3B6 | 12FF10B3 | 0CF8FAC1 |
| 140215C0 | 0FFE01CC | 15051ACD | 130308D7 | 16081FDA | 16080FE2 |
| 170B24E7 | 190D16ED | 180E29F4 | 1C121DF8 | 19112F01 | 1F172503 |

FIG. 15G

Frequency Analysis Table for All Byte Values in the Sample Sequence
Length: 8,184 Bytes
seed=0E00000E, constrained primeM1=0103050D, constrained primeM2=0305070B

|   | \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| 0 |   | 31 | 33 | 33 | 32 | 31 | 33 | 36 | 32 | 31 | 33 | 32 | 36 | 33 | 30 | 29 | 36 |
| 1 |   | 33 | 32 | 35 | 30 | 34 | 36 | 34 | 33 | 31 | 36 | 34 | 34 | 30 | 30 | 36 | 33 |
| 2 |   | 34 | 29 | 30 | 35 | 32 | 34 | 30 | 32 | 32 | 34 | 33 | 30 | 30 | 34 | 32 | 33 |
| 3 |   | 32 | 29 | 33 | 33 | 33 | 32 | 28 | 33 | 35 | 32 | 31 | 28 | 36 | 32 | 31 | 33 |
| 4 |   | 29 | 33 | 32 | 33 | 30 | 30 | 34 | 32 | 33 | 30 | 31 | 33 | 32 | 33 | 31 | 31 |
| 5 |   | 31 | 34 | 34 | 28 | 33 | 32 | 33 | 33 | 30 | 30 | 34 | 34 | 30 | 33 | 29 | 31 |
| 6 |   | 35 | 31 | 32 | 30 | 31 | 32 | 33 | 29 | 30 | 34 | 32 | 33 | 30 | 30 | 32 | 34 |
| 7 |   | 34 | 30 | 31 | 30 | 34 | 34 | 29 | 31 | 32 | 33 | 32 | 32 | 31 | 30 | 35 | 32 |
| 8 |   | 33 | 29 | 30 | 36 | 32 | 33 | 28 | 32 | 34 | 31 | 33 | 30 | 33 | 33 | 32 | 32 |
| 9 |   | 28 | 33 | 33 | 33 | 31 | 31 | 30 | 33 | 34 | 30 | 33 | 30 | 32 | 34 | 32 | 31 |
| A |   | 30 | 35 | 32 | 31 | 31 | 29 | 37 | 30 | 32 | 32 | 29 | 34 | 32 | 33 | 30 | 32 |
| B |   | 32 | 33 | 33 | 28 | 33 | 33 | 32 | 33 | 30 | 29 | 32 | 35 | 31 | 28 | 32 | 32 |
| C |   | 33 | 33 | 30 | 31 | 33 | 32 | 33 | 31 | 29 | 34 | 33 | 33 | 30 | 29 | 34 | 33 |
| D |   | 34 | 28 | 31 | 34 | 33 | 33 | 29 | 32 | 32 | 33 | 33 | 29 | 30 | 31 | 35 | 33 |
| E |   | 30 | 31 | 32 | 34 | 31 | 33 | 30 | 30 | 36 | 33 | 29 | 30 | 34 | 33 | 32 | 32 |
| F |   | 28 | 35 | 33 | 31 | 33 | 28 | 34 | 33 | 33 | 29 | 31 | 32 | 33 | 34 | 29 | 32 |

FIG. 15H

4,080 Bytes of Sample Sequence Data Generated Using Unconstrained primeM
seed=0E00000E, primeM=01000201, Data is compressible

```
0F00020F  10000410  11000611  12000812  13000A13  14000C14
15000E15  16001016  17001217  18001418  19001619  1A00181A
1B001A1B  1C001C1C  1D001E1D  1E00201E  1F00221F  20002420
21002621  22002822  23002A23  24002C24  25002E25  26003026
27003227  28003428  29003629  2A00382A  2B003A2B  2C003C2C
2D003E2D  2E00402E  2F00422F  30004430  31004631  32004832
33004A33  34004C34  35004E35  36005036  37005237  38005438
39005639  3A00583A  3B005A3B  3C005C3C  3D005E3D  3E00603E
3F00623F  40006440  41006641  42006842  43006A43  44006C44
45006E45  46007046  47007247  48007448  49007649  4A00784A
4B007A4B  4C007C4C  4D007E4D  4E00804E  4F00824F  50008450
51008651  52008852  53008A53  54008C54  55008E55  56009056
57009257  58009458  59009659  5A00985A  5B009A5B  5C009C5C
5D009E5D  5E00A05E  5F00A25F  6000A460  6100A661  6200A862
6300AA63  6400AC64  6500AE65  6600B066  6700B267  6800B468
6900B669  6A00B86A  6B00BA6B  6C00BC6C  6D00BE6D  6E00C06E
6F00C26F  7000C470  7100C671  7200C872  7300CA73  7400CC74
7500CE75  7600D076  7700D277  7800D478  7900D679  7A00D87A
7B00DA7B  7C00DC7C  7D00DE7D  7E00E07E  7F00E27F  8000E480
8100E681  8200E882  8300EA83  8400EC84  8500EE85  8600F086
8700F287  8800F488  8900F689  8A00F88A  8B00FA8B  8C00FC8C
8D00FE8D  8E01008E  8F01028F  90010490  91010691  92010892
93010A93  94010C94  95010E95  96011096  97011297  98011498
99011699  9A01189A  9B011A9B  9C011C9C  9D011E9D  9E01209E
9F01229F  A00124A0  A10126A1  A20128A2  A3012AA3  A4012CA4
A5012EA5  A60130A6  A70132A7  A80134A8  A90136A9  AA0138AA
AB013AAB  AC013CAC  AD013EAD  AE0140AE  AF0142AF  B00144B0
B10146B1  B20148B2  B3014AB3  B4014CB4  B5014EB5  B60150B6
B70152B7  B80154B8  B90156B9  BA0158BA  BB015ABB  BC015CBC
BD015EBD  BE0160BE  BF0162BF  C00164C0  C10166C1  C20168C2
C3016AC3  C4016CC4  C5016EC5  C60170C6  C70172C7  C80174C8
C90176C9  CA0178CA  CB017ACB  CC017CCC  CD017ECD  CE0180CE
CF0182CF  D00184D0  D10186D1  D20188D2  D3018AD3  D4018CD4
D5018ED5  D60190D6  D70192D7  D80194D8  D90196D9  DA0198DA
DB019ADB  DC019CDC  DD019EDD  DE01A0DE  DF01A2DF  E001A4E0
E101A6E1  E201A8E2  E301AAE3  E401ACE4  E501AEE5  E601B0E6
E701B2E7  E801B4E8  E901B6E9  EA01B8EA  EB01BAEB  EC01BCEC
ED01BEED  EE01C0EE  EF01C2EF  F001C4F0  F101C6F1  F201C8F2
F301CAF3  F401CCF4  F501CEF5  F601D0F6  F701D2F7  F801D4F8
F901D6F9  FA01D8FA  FB01DAFB  FC01DCFC  FD01DEFD  FE01E0FE
FF01E2FF  0001E500  0101E701  0201E902  0301EB03  0401ED04
0501EF05  0601F106  0701F307  0801F508  0901F709  0A01F90A
0B01FB0B  0C01FD0C  0D01FF0D  0E02010E  0F02030F  10020510
11020711  12020912  13020B13  14020D14  15020F15  16021116
17021317  18021518  19021719  1A02191A  1B021B1B  1C021D1C
1D021F1D  1E02211E  1F02231F  20022520  21022721  22022922
23022B23  24022D24  25022F25  26023126  27023327  28023528
```

```
29023729  2A02392A  2B023B2B  2C023D2C  2D023F2D  2E02412E
2F02432F  30024530  31024731  32024932  33024B33  34024D34
35024F35  36025136  37025337  38025538  39025739  3A02593A
3B025B3B  3C025D3C  3D025F3D  3E02613E  3F02633F  40026540
41026741  42026942  43026B43  44026D44  45026F45  46027146
47027347  48027548  49027749  4A02794A  4B027B4B  4C027D4C
4D027F4D  4E02814E  4F02834F  50028550  51028751  52028952
53028B53  54028D54  55028F55  56029156  57029357  58029558
59029759  5A02995A  5B029B5B  5C029D5C  5D029F5D  5E02A15E
5F02A35F  6002A560  6102A761  6202A962  6302AB63  6402AD64
6502AF65  6602B166  6702B367  6802B568  6902B769  6A02B96A
6B02BB6B  6C02BD6C  6D02BF6D  6E02C16E  6F02C36F  7002C570
7102C771  7202C972  7302CB73  7402CD74  7502CF75  7602D176
7702D377  7802D578  7902D779  7A02D97A  7B02DB7B  7C02DD7C
7D02DF7D  7E02E17E  7F02E37F  8002E580  8102E781  8202E982
8302EB83  8402ED84  8502EF85  8602F186  8702F387  8802F588
8902F789  8A02F98A  8B02FB8B  8C02FD8C  8D02FF8D  8E03018E
8F03038F  90030590  91030791  92030992  93030B93  94030D94
95030F95  96031196  97031397  98031598  99031799  9A03199A
9B031B9B  9C031D9C  9D031F9D  9E03219E  9F03239F  A00325A0
A10327A1  A20329A2  A3032BA3  A4032DA4  A5032FA5  A60331A6
A70333A7  A80335A8  A90337A9  AA0339AA  AB033BAB  AC033DAC
AD033FAD  AE0341AE  AF0343AF  B00345B0  B10347B1  B20349B2
B3034BB3  B4034DB4  B5034FB5  B60351B6  B70353B7  B80355B8
B90357B9  BA0359BA  BB035BBB  BC035DBC  BD035FBD  BE0361BE
BF0363BF  C00365C0  C10367C1  C20369C2  C3036BC3  C4036DC4
C5036FC5  C60371C6  C70373C7  C80375C8  C90377C9  CA0379CA
CB037BCB  CC037DCC  CD037FCD  CE0381CE  CF0383CF  D00385D0
D10387D1  D20389D2  D3038BD3  D4038DD4  D5038FD5  D60391D6
D70393D7  D80395D8  D90397D9  DA0399DA  DB039BDB  DC039DDC
DD039FDD  DE03A1DE  DF03A3DF  E003A5E0  E103A7E1  E203A9E2
E303ABE3  E403ADE4  E503AFE5  E603B1E6  E703B3E7  E803B5E8
E903B7E9  EA03B9EA  EB03BBEB  EC03BDEC  ED03BFED  EE03C1EE
EF03C3EF  F003C5F0  F103C7F1  F203C9F2  F303CBF3  F403CDF4
F503CFF5  F603D1F6  F703D3F7  F803D5F8  F903D7F9  FA03D9FA
FB03DBFB  FC03DDFC  FD03DFFD  FE03E1FE  FF03E3FF  0003E600
0103E801  0203EA02  0303EC03  0403EE04  0503F005  0603F206
0703F407  0803F608  0903F809  0A03FA0A  0B03FC0B  0C03FE0C
0D04000D  0E04020E  0F04040F  10040610  11040811  12040A12
13040C13  14040E14  15041015  16041216  17041417  18041618
19041819  1A041A1A  1B041C1B  1C041E1C  1D04201D  1E04221E
1F04241F  20042620  21042821  22042A22  23042C23  24042E24
25043025  26043226  27043427  28043628  29043829  2A043A2A
2B043C2B  2C043E2C  2D04402D  2E04422E  2F04442F  30044630
31044831  32044A32  33044C33  34044E34  35045035  36045236
37045437  38045638  39045839  3A045A3A  3B045C3B  3C045E3C
3D04603D  3E04623E  3F04643F  40046640  41046841  42046A42
43046C43  44046E44  45047045  46047246  47047447  48047648
49047849  4A047A4A  4B047C4B  4C047E4C  4D04804D  4E04824E
4F04844F  50048650  51048851  52048A52  53048C53  54048E54
55049055  56049256  57049457  58049658  59049859  5A049A5A
```

| | | | | | |
|---|---|---|---|---|---|
| 5B049C5B | 5C049E5C | 5D04A05D | 5E04A25E | 5F04A45F | 6004A660 |
| 6104A861 | 6204AA62 | 6304AC63 | 6404AE64 | 6504B065 | 6604B266 |
| 6704B467 | 6804B668 | 6904B869 | 6A04BA6A | 6B04BC6B | 6C04BE6C |
| 6D04C06D | 6E04C26E | 6F04C46F | 7004C670 | 7104C871 | 7204CA72 |
| 7304CC73 | 7404CE74 | 7504D075 | 7604D276 | 7704D477 | 7804D678 |
| 7904D879 | 7A04DA7A | 7B04DC7B | 7C04DE7C | 7D04E07D | 7E04E27E |
| 7F04E47F | 8004E680 | 8104E881 | 8204EA82 | 8304EC83 | 8404EE84 |
| 8504F085 | 8604F286 | 8704F487 | 8804F688 | 8904F889 | 8A04FA8A |
| 8B04FC8B | 8C04FE8C | 8D05008D | 8E05028E | 8F05048F | 90050690 |
| 91050891 | 92050A92 | 93050C93 | 94050E94 | 95051095 | 96051296 |
| 97051497 | 98051698 | 99051899 | 9A051A9A | 9B051C9B | 9C051E9C |
| 9D05209D | 9E05229E | 9F05249F | A00526A0 | A10528A1 | A2052AA2 |
| A3052CA3 | A4052EA4 | A50530A5 | A60532A6 | A70534A7 | A80536A8 |
| A90538A9 | AA053AAA | AB053CAB | AC053EAC | AD0540AD | AE0542AE |
| AF0544AF | B00546B0 | B10548B1 | B2054AB2 | B3054CB3 | B4054EB4 |
| B50550B5 | B60552B6 | B70554B7 | B80556B8 | B90558B9 | BA055ABA |
| BB055CBB | BC055EBC | BD0560BD | BE0562BE | BF0564BF | C00566C0 |
| C10568C1 | C2056AC2 | C3056CC3 | C4056EC4 | C50570C5 | C60572C6 |
| C70574C7 | C80576C8 | C90578C9 | CA057ACA | CB057CCB | CC057ECC |
| CD0580CD | CE0582CE | CF0584CF | D00586D0 | D10588D1 | D2058AD2 |
| D3058CD3 | D4058ED4 | D50590D5 | D60592D6 | D70594D7 | D80596D8 |
| D90598D9 | DA059ADA | DB059CDB | DC059EDC | DD05A0DD | DE05A2DE |
| DF05A4DF | E005A6E0 | E105A8E1 | E205AAE2 | E305ACE3 | E405AEE4 |
| E505B0E5 | E605B2E6 | E705B4E7 | E805B6E8 | E905B8E9 | EA05BAEA |
| EB05BCEB | EC05BEEC | ED05C0ED | EE05C2EE | EF05C4EF | F005C6F0 |
| F105C8F1 | F205CAF2 | F305CCF3 | F405CEF4 | F505D0F5 | F605D2F6 |
| F705D4F7 | F805D6F8 | F905D8F9 | FA05DAFA | FB05DCFB | FC05DEFC |
| FD05E0FD | FE05E2FE | FF05E4FF | 0005E700 | 0105E901 | 0205EB02 |
| 0305ED03 | 0405EF04 | 0505F105 | 0605F306 | 0705F507 | 0805F708 |
| 0905F909 | 0A05FB0A | 0B05FD0B | 0C05FF0C | 0D06010D | 0E06030E |
| 0F06050F | 10060710 | 11060911 | 12060B12 | 13060D13 | 14060F14 |
| 15061115 | 16061316 | 17061517 | 18061718 | 19061919 | 1A061B1A |
| 1B061D1B | 1C061F1C | 1D06211D | 1E06231E | 1F06251F | 20062720 |
| 21062921 | 22062B22 | 23062D23 | 24062F24 | 25063125 | 26063326 |
| 27063527 | 28063728 | 29063929 | 2A063B2A | 2B063D2B | 2C063F2C |
| 2D06412D | 2E06432E | 2F06452F | 30064730 | 31064931 | 32064B32 |
| 33064D33 | 34064F34 | 35065135 | 36065336 | 37065537 | 38065738 |
| 39065939 | 3A065B3A | 3B065D3B | 3C065F3C | 3D06613D | 3E06633E |
| 3F06653F | 40066740 | 41066941 | 42066B42 | 43066D43 | 44066F44 |
| 45067145 | 46067346 | 47067547 | 48067748 | 49067949 | 4A067B4A |
| 4B067D4B | 4C067F4C | 4D06814D | 4E06834E | 4F06854F | 50068750 |
| 51068951 | 52068B52 | 53068D53 | 54068F54 | 55069155 | 56069356 |
| 57069557 | 58069758 | 59069959 | 5A069B5A | 5B069D5B | 5C069F5C |
| 5D06A15D | 5E06A35E | 5F06A55F | 6006A760 | 6106A961 | 6206AB62 |
| 6306AD63 | 6406AF64 | 6506B165 | 6606B366 | 6706B567 | 6806B768 |
| 6906B969 | 6A06BB6A | 6B06BD6B | 6C06BF6C | 6D06C16D | 6E06C36E |
| 6F06C56F | 7006C770 | 7106C971 | 7206CB72 | 7306CD73 | 7406CF74 |
| 7506D175 | 7606D376 | 7706D577 | 7806D778 | 7906D979 | 7A06DB7A |

| | | | | | |
|---|---|---|---|---|---|
| 7B06DD7B | 7C06DF7C | 7D06E17D | 7E06E37E | 7F06E57F | 8006E780 |
| 8106E981 | 8206EB82 | 8306ED83 | 8406EF84 | 8506F185 | 8606F386 |
| 8706F587 | 8806F788 | 8906F989 | 8A06FB8A | 8B06FD8B | 8C06FF8C |
| 8D07018D | 8E07038E | 8F07058F | 90070790 | 91070991 | 92070B92 |
| 93070D93 | 94070F94 | 95071195 | 96071396 | 97071597 | 98071798 |
| 99071999 | 9A071B9A | 9B071D9B | 9C071F9C | 9D07219D | 9E07239E |
| 9F07259F | A00727A0 | A10729A1 | A2072BA2 | A3072DA3 | A4072FA4 |
| A50731A5 | A60733A6 | A70735A7 | A80737A8 | A90739A9 | AA073BAA |
| AB073DAB | AC073FAC | AD0741AD | AE0743AE | AF0745AF | B00747B0 |
| B10749B1 | B2074BB2 | B3074DB3 | B4074FB4 | B50751B5 | B60753B6 |
| B70755B7 | B80757B8 | B90759B9 | BA075BBA | BB075DBB | BC075FBC |
| BD0761BD | BE0763BE | BF0765BF | C00767C0 | C10769C1 | C2076BC2 |
| C3076DC3 | C4076FC4 | C50771C5 | C60773C6 | C70775C7 | C80777C8 |
| C90779C9 | CA077BCA | CB077DCB | CC077FCC | CD0781CD | CE0783CE |
| CF0785CF | D00787D0 | D10789D1 | D2078BD2 | D3078DD3 | D4078FD4 |
| D50791D5 | D60793D6 | D70795D7 | D80797D8 | D90799D9 | DA079BDA |
| DB079DDB | DC079FDC | DD07A1DD | DE07A3DE | DF07A5DF | E007A7E0 |
| E107A9E1 | E207ABE2 | E307ADE3 | E407AFE4 | E507B1E5 | E607B3E6 |
| E707B5E7 | E807B7E8 | E907B9E9 | EA07BBEA | EB07BDEB | EC07BFEC |
| ED07C1ED | EE07C3EE | EF07C5EF | F007C7F0 | F107C9F1 | F207CBF2 |
| F307CDF3 | F407CFF4 | F507D1F5 | F607D3F6 | F707D5F7 | F807D7F8 |
| F907D9F9 | FA07DBFA | FB07DDFB | FC07DFFC | FD07E1FD | FE07E3FE |
| FF07E5FF | 0007E800 | 0107EA01 | 0207EC02 | 0307EE03 | 0407F004 |
| 0507F205 | 0607F406 | 0707F607 | 0807F808 | 0907FA09 | 0A07FC0A |

FIG. 16D

Frequency Analysis Table for All Byte Values in the Sample Sequence
Length: 4,080 Bytes
seed=0E00000E, unconstrained primeM=01000201

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 138 | 140 | 140 | 139 | 140 | 140 | 140 | 138 | 12 | 12 | 12 | 10 | 10 | 10 | 10 | 12 |
| 1 | 12 | 12 | 12 | 12 | 12 | 12 | 12 | 12 | 12 | 12 | 12 | 12 | 12 | 12 | 12 | 12 |
| 2 | 12 | 12 | 12 | 12 | 12 | 12 | 12 | 12 | 12 | 12 | 12 | 12 | 12 | 12 | 12 | 12 |
| 3 | 12 | 12 | 12 | 12 | 12 | 12 | 12 | 12 | 12 | 12 | 12 | 12 | 12 | 12 | 12 | 12 |
| 4 | 12 | 12 | 12 | 12 | 12 | 12 | 12 | 12 | 12 | 12 | 12 | 12 | 12 | 12 | 12 | 12 |
| 5 | 12 | 12 | 12 | 12 | 12 | 12 | 12 | 12 | 12 | 12 | 12 | 12 | 12 | 12 | 12 | 12 |
| 6 | 12 | 12 | 12 | 12 | 12 | 12 | 12 | 12 | 12 | 12 | 12 | 12 | 12 | 12 | 12 | 12 |
| 7 | 12 | 12 | 12 | 12 | 12 | 12 | 12 | 12 | 12 | 12 | 12 | 12 | 12 | 12 | 12 | 12 |
| 8 | 12 | 12 | 12 | 12 | 12 | 12 | 12 | 12 | 12 | 12 | 12 | 12 | 12 | 12 | 12 | 12 |
| 9 | 12 | 12 | 12 | 12 | 12 | 12 | 12 | 12 | 12 | 12 | 12 | 12 | 12 | 12 | 12 | 12 |
| A | 12 | 12 | 12 | 12 | 12 | 12 | 12 | 12 | 12 | 12 | 12 | 12 | 12 | 12 | 12 | 12 |
| B | 12 | 12 | 12 | 12 | 12 | 12 | 12 | 12 | 12 | 12 | 12 | 12 | 12 | 12 | 12 | 12 |
| C | 12 | 12 | 12 | 12 | 12 | 12 | 12 | 12 | 12 | 12 | 12 | 12 | 12 | 12 | 12 | 12 |
| D | 12 | 12 | 12 | 12 | 12 | 12 | 12 | 12 | 12 | 12 | 12 | 12 | 12 | 12 | 12 | 12 |
| E | 12 | 12 | 12 | 12 | 11 | 12 | 11 | 12 | 12 | 12 | 12 | 12 | 12 | 12 | 12 | 12 |
| F | 12 | 12 | 12 | 12 | 12 | 12 | 12 | 12 | 12 | 12 | 12 | 12 | 12 | 12 | 11 | 12 |

FIG. 16E

4,080 Bytes of Sample Sequence Data Generated Using Unconstrained primeM
seed=0E00000E, primeM=00000017, Data is compressible

```
0E000025  0E00003C  0E000053  0E00006A  0E000081  0E000098
0E0000AF  0E0000C6  0E0000DD  0E0000F4  0E00010B  0E000122
0E000139  0E000150  0E000167  0E00017E  0E000195  0E0001AC
0E0001C3  0E0001DA  0E0001F1  0E000208  0E00021F  0E000236
0E00024D  0E000264  0E00027B  0E000292  0E0002A9  0E0002C0
0E0002D7  0E0002EE  0E000305  0E00031C  0E000333  0E00034A
0E000361  0E000378  0E00038F  0E0003A6  0E0003BD  0E0003D4
0E0003EB  0E000402  0E000419  0E000430  0E000447  0E00045E
0E000475  0E00048C  0E0004A3  0E0004BA  0E0004D1  0E0004E8
0E0004FF  0E000516  0E00052D  0E000544  0E00055B  0E000572
0E000589  0E0005A0  0E0005B7  0E0005CE  0E0005E5  0E0005FC
0E000613  0E00062A  0E000641  0E000658  0E00066F  0E000686
0E00069D  0E0006B4  0E0006CB  0E0006E2  0E0006F9  0E000710
0E000727  0E00073E  0E000755  0E00076C  0E000783  0E00079A
0E0007B1  0E0007C8  0E0007DF  0E0007F6  0E00080D  0E000824
0E00083B  0E000852  0E000869  0E000880  0E000897  0E0008AE
0E0008C5  0E0008DC  0E0008F3  0E00090A  0E000921  0E000938
0E00094F  0E000966  0E00097D  0E000994  0E0009AB  0E0009C2
0E0009D9  0E0009F0  0E000A07  0E000A1E  0E000A35  0E000A4C
0E000A63  0E000A7A  0E000A91  0E000AA8  0E000ABF  0E000AD6
0E000AED  0E000B04  0E000B1B  0E000B32  0E000B49  0E000B60
0E000B77  0E000B8E  0E000BA5  0E000BBC  0E000BD3  0E000BEA
0E000C01  0E000C18  0E000C2F  0E000C46  0E000C5D  0E000C74
0E000C8B  0E000CA2  0E000CB9  0E000CD0  0E000CE7  0E000CFE
0E000D15  0E000D2C  0E000D43  0E000D5A  0E000D71  0E000D88
0E000D9F  0E000DB6  0E000DCD  0E000DE4  0E000DFB  0E000E12
0E000E29  0E000E40  0E000E57  0E000E6E  0E000E85  0E000E9C
0E000EB3  0E000ECA  0E000EE1  0E000EF8  0E000F0F  0E000F26
0E000F3D  0E000F54  0E000F6B  0E000F82  0E000F99  0E000FB0
0E000FC7  0E000FDE  0E000FF5  0E00100C  0E001023  0E00103A
0E001051  0E001068  0E00107F  0E001096  0E0010AD  0E0010C4
0E0010DB  0E0010F2  0E001109  0E001120  0E001137  0E00114E
0E001165  0E00117C  0E001193  0E0011AA  0E0011C1  0E0011D8
0E0011EF  0E001206  0E00121D  0E001234  0E00124B  0E001262
0E001279  0E001290  0E0012A7  0E0012BE  0E0012D5  0E0012EC
0E001303  0E00131A  0E001331  0E001348  0E00135F  0E001376
0E00138D  0E0013A4  0E0013BB  0E0013D2  0E0013E9  0E001400
0E001417  0E00142E  0E001445  0E00145C  0E001473  0E00148A
0E0014A1  0E0014B8  0E0014CF  0E0014E6  0E0014FD  0E001514
0E00152B  0E001542  0E001559  0E001570  0E001587  0E00159E
0E0015B5  0E0015CC  0E0015E3  0E0015FA  0E001611  0E001628
0E00163F  0E001656  0E00166D  0E001684  0E00169B  0E0016B2
0E0016C9  0E0016E0  0E0016F7  0E00170E  0E001725  0E00173C
0E001753  0E00176A  0E001781  0E001798  0E0017AF  0E0017C6
0E0017DD  0E0017F4  0E00180B  0E001822  0E001839  0E001850
0E001867  0E00187E  0E001895  0E0018AC  0E0018C3  0E0018DA
```

```
0E0018F1  0E001908  0E00191F  0E001936  0E00194D  0E001964
0E00197B  0E001992  0E0019A9  0E0019C0  0E0019D7  0E0019EE
0E001A05  0E001A1C  0E001A33  0E001A4A  0E001A61  0E001A78
0E001A8F  0E001AA6  0E001ABD  0E001AD4  0E001AEB  0E001B02
0E001B19  0E001B30  0E001B47  0E001B5E  0E001B75  0E001B8C
0E001BA3  0E001BBA  0E001BD1  0E001BE8  0E001BFF  0E001C16
0E001C2D  0E001C44  0E001C5B  0E001C72  0E001C89  0E001CA0
0E001CB7  0E001CCE  0E001CE5  0E001CFC  0E001D13  0E001D2A
0E001D41  0E001D58  0E001D6F  0E001D86  0E001D9D  0E001DB4
0E001DCB  0E001DE2  0E001DF9  0E001E10  0E001E27  0E001E3E
0E001E55  0E001E6C  0E001E83  0E001E9A  0E001EB1  0E001EC8
0E001EDF  0E001EF6  0E001F0D  0E001F24  0E001F3B  0E001F52
0E001F69  0E001F80  0E001F97  0E001FAE  0E001FC5  0E001FDC
0E001FF3  0E00200A  0E002021  0E002038  0E00204F  0E002066
0E00207D  0E002094  0E0020AB  0E0020C2  0E0020D9  0E0020F0
0E002107  0E00211E  0E002135  0E00214C  0E002163  0E00217A
0E002191  0E0021A8  0E0021BF  0E0021D6  0E0021ED  0E002204
0E00221B  0E002232  0E002249  0E002260  0E002277  0E00228E
0E0022A5  0E0022BC  0E0022D3  0E0022EA  0E002301  0E002318
0E00232F  0E002346  0E00235D  0E002374  0E00238B  0E0023A2
0E0023B9  0E0023D0  0E0023E7  0E0023FE  0E002415  0E00242C
0E002443  0E00245A  0E002471  0E002488  0E00249F  0E0024B6
0E0024CD  0E0024E4  0E0024FB  0E002512  0E002529  0E002540
0E002557  0E00256E  0E002585  0E00259C  0E0025B3  0E0025CA
0E0025E1  0E0025F8  0E00260F  0E002626  0E00263D  0E002654
0E00266B  0E002682  0E002699  0E0026B0  0E0026C7  0E0026DE
0E0026F5  0E00270C  0E002723  0E00273A  0E002751  0E002768
0E00277F  0E002796  0E0027AD  0E0027C4  0E0027DB  0E0027F2
0E002809  0E002820  0E002837  0E00284E  0E002865  0E00287C
0E002893  0E0028AA  0E0028C1  0E0028D8  0E0028EF  0E002906
0E00291D  0E002934  0E00294B  0E002962  0E002979  0E002990
0E0029A7  0E0029BE  0E0029D5  0E0029EC  0E002A03  0E002A1A
0E002A31  0E002A48  0E002A5F  0E002A76  0E002A8D  0E002AA4
0E002ABB  0E002AD2  0E002AE9  0E002B00  0E002B17  0E002B2E
0E002B45  0E002B5C  0E002B73  0E002B8A  0E002BA1  0E002BB8
0E002BCF  0E002BE6  0E002BFD  0E002C14  0E002C2B  0E002C42
0E002C59  0E002C70  0E002C87  0E002C9E  0E002CB5  0E002CCC
0E002CE3  0E002CFA  0E002D11  0E002D28  0E002D3F  0E002D56
0E002D6D  0E002D84  0E002D9B  0E002DB2  0E002DC9  0E002DE0
0E002DF7  0E002E0E  0E002E25  0E002E3C  0E002E53  0E002E6A
0E002E81  0E002E98  0E002EAF  0E002EC6  0E002EDD  0E002EF4
0E002F0B  0E002F22  0E002F39  0E002F50  0E002F67  0E002F7E
0E002F95  0E002FAC  0E002FC3  0E002FDA  0E002FF1  0E003008
0E00301F  0E003036  0E00304D  0E003064  0E00307B  0E003092
0E0030A9  0E0030C0  0E0030D7  0E0030EE  0E003105  0E00311C
0E003133  0E00314A  0E003161  0E003178  0E00318F  0E0031A6
0E0031BD  0E0031D4  0E0031EB  0E003202  0E003219  0E003230
0E003247  0E00325E  0E003275  0E00328C  0E0032A3  0E0032BA
0E0032D1  0E0032E8  0E0032FF  0E003316  0E00332D  0E003344  (Cont. at
0E00335B  0E003372  0E003389  0E0033A0  0E0033B7  0E0033CE  FIG. 17C)
```

FIG. 17B

```
0E0033E5  0E0033FC  0E003413  0E00342A  0E003441  0E003458
0E00346F  0E003486  0E00349D  0E0034B4  0E0034CB  0E0034E2
0E0034F9  0E003510  0E003527  0E00353E  0E003555  0E00356C
0E003583  0E00359A  0E0035B1  0E0035C8  0E0035DF  0E0035F6
0E00360D  0E003624  0E00363B  0E003652  0E003669  0E003680
0E003697  0E0036AE  0E0036C5  0E0036DC  0E0036F3  0E00370A
0E003721  0E003738  0E00374F  0E003766  0E00377D  0E003794
0E0037AB  0E0037C2  0E0037D9  0E0037F0  0E003807  0E00381E
0E003835  0E00384C  0E003863  0E00387A  0E003891  0E0038A8
0E0038BF  0E0038D6  0E0038ED  0E003904  0E00391B  0E003932
0E003949  0E003960  0E003977  0E00398E  0E0039A5  0E0039BC
0E0039D3  0E0039EA  0E003A01  0E003A18  0E003A2F  0E003A46
0E003A5D  0E003A74  0E003A8B  0E003AA2  0E003AB9  0E003AD0
0E003AE7  0E003AFE  0E003B15  0E003B2C  0E003B43  0E003B5A
0E003B71  0E003B88  0E003B9F  0E003BB6  0E003BCD  0E003BE4
0E003BFB  0E003C12  0E003C29  0E003C40  0E003C57  0E003C6E
0E003C85  0E003C9C  0E003CB3  0E003CCA  0E003CE1  0E003CF8
0E003D0F  0E003D26  0E003D3D  0E003D54  0E003D6B  0E003D82
0E003D99  0E003DB0  0E003DC7  0E003DDE  0E003DF5  0E003E0C
0E003E23  0E003E3A  0E003E51  0E003E68  0E003E7F  0E003E96
0E003EAD  0E003EC4  0E003EDB  0E003EF2  0E003F09  0E003F20
0E003F37  0E003F4E  0E003F65  0E003F7C  0E003F93  0E003FAA
0E003FC1  0E003FD8  0E003FEF  0E004006  0E00401D  0E004034
0E00404B  0E004062  0E004079  0E004090  0E0040A7  0E0040BE
0E0040D5  0E0040EC  0E004103  0E00411A  0E004131  0E004148
0E00415F  0E004176  0E00418D  0E0041A4  0E0041BB  0E0041D2
0E0041E9  0E004200  0E004217  0E00422E  0E004245  0E00425C
0E004273  0E00428A  0E0042A1  0E0042B8  0E0042CF  0E0042E6
0E0042FD  0E004314  0E00432B  0E004342  0E004359  0E004370
0E004387  0E00439E  0E0043B5  0E0043CC  0E0043E3  0E0043FA
0E004411  0E004428  0E00443F  0E004456  0E00446D  0E004484
0E00449B  0E0044B2  0E0044C9  0E0044E0  0E0044F7  0E00450E
0E004525  0E00453C  0E004553  0E00456A  0E004581  0E004598
0E0045AF  0E0045C6  0E0045DD  0E0045F4  0E00460B  0E004622
0E004639  0E004650  0E004667  0E00467E  0E004695  0E0046AC
0E0046C3  0E0046DA  0E0046F1  0E004708  0E00471F  0E004736
0E00474D  0E004764  0E00477B  0E004792  0E0047A9  0E0047C0
0E0047D7  0E0047EE  0E004805  0E00481C  0E004833  0E00484A
0E004861  0E004878  0E00488F  0E0048A6  0E0048BD  0E0048D4
0E0048EB  0E004902  0E004919  0E004930  0E004947  0E00495E
0E004975  0E00498C  0E0049A3  0E0049BA  0E0049D1  0E0049E8
0E0049FF  0E004A16  0E004A2D  0E004A44  0E004A5B  0E004A72
0E004A89  0E004AA0  0E004AB7  0E004ACE  0E004AE5  0E004AFC
0E004B13  0E004B2A  0E004B41  0E004B58  0E004B6F  0E004B86
0E004B9D  0E004BB4  0E004BCB  0E004BE2  0E004BF9  0E004C10
0E004C27  0E004C3E  0E004C55  0E004C6C  0E004C83  0E004C9A
0E004CB1  0E004CC8  0E004CDF  0E004CF6  0E004D0D  0E004D24
0E004D3B  0E004D52  0E004D69  0E004D80  0E004D97  0E004DAE
0E004DC5  0E004DDC  0E004DF3  0E004E0A  0E004E21  0E004E38   (Cont. at
0E004E4F  0E004E66  0E004E7D  0E004E94  0E004EAB  0E004EC2   FIG. 17D)
```

FIG. 17C

```
0E004ED9  0E004EF0  0E004F07  0E004F1E  0E004F35  0E004F4C
0E004F63  0E004F7A  0E004F91  0E004FA8  0E004FBF  0E004FD6
0E004FED  0E005004  0E00501B  0E005032  0E005049  0E005060
0E005077  0E00508E  0E0050A5  0E0050BC  0E0050D3  0E0050EA
0E005101  0E005118  0E00512F  0E005146  0E00515D  0E005174
0E00518B  0E0051A2  0E0051B9  0E0051D0  0E0051E7  0E0051FE
0E005215  0E00522C  0E005243  0E00525A  0E005271  0E005288
0E00529F  0E0052B6  0E0052CD  0E0052E4  0E0052FB  0E005312
0E005329  0E005340  0E005357  0E00536E  0E005385  0E00539C
0E0053B3  0E0053CA  0E0053E1  0E0053F8  0E00540F  0E005426
0E00543D  0E005454  0E00546B  0E005482  0E005499  0E0054B0
0E0054C7  0E0054DE  0E0054F5  0E00550C  0E005523  0E00553A
0E005551  0E005568  0E00557F  0E005596  0E0055AD  0E0055C4
0E0055DB  0E0055F2  0E005609  0E005620  0E005637  0E00564E
0E005665  0E00567C  0E005693  0E0056AA  0E0056C1  0E0056D8
0E0056EF  0E005706  0E00571D  0E005734  0E00574B  0E005762
0E005779  0E005790  0E0057A7  0E0057BE  0E0057D5  0E0057EC
0E005803  0E00581A  0E005831  0E005848  0E00585F  0E005876
0E00588D  0E0058A4  0E0058BB  0E0058D2  0E0058E9  0E005900
0E005917  0E00592E  0E005945  0E00595C  0E005973  0E00598A
0E0059A1  0E0059B8  0E0059CF  0E0059E6  0E0059FD  0E005A14
0E005A2B  0E005A42  0E005A59  0E005A70  0E005A87  0E005A9E
0E005AB5  0E005ACC  0E005AE3  0E005AFA  0E005B11  0E005B28
0E005B3F  0E005B56  0E005B6D  0E005B84  0E005B9B  0E005BB2
```

FIG. 17D

Frequency Analysis Table for All Byte Values in the Sample Sequence
Length: 4,080 Bytes
seed=0E00000E, unconstrained primeM=00000017

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 1034 | 15 | 15 | 15 | 16 | 15 | 15 | 15 | 15 | 15 | 15 | 15 | 16 | 15 | 1034 | 15 |
| 1 | 15 | 15 | 15 | 15 | 16 | 15 | 15 | 15 | 15 | 15 | 15 | 16 | 15 | 15 | 15 | 15 |
| 2 | 15 | 15 | 15 | 16 | 15 | 15 | 15 | 15 | 15 | 15 | 15 | 16 | 15 | 15 | 15 | 15 |
| 3 | 15 | 15 | 16 | 15 | 15 | 15 | 15 | 15 | 15 | 15 | 16 | 15 | 15 | 15 | 15 | 15 |
| 4 | 15 | 15 | 16 | 15 | 15 | 15 | 15 | 15 | 15 | 16 | 15 | 15 | 15 | 15 | 15 | 15 |
| 5 | 15 | 16 | 15 | 15 | 15 | 15 | 15 | 15 | 15 | 16 | 15 | 12 | 4 | 4 | 4 | 4 |
| 6 | 4 | 4 | 4 | 4 | 4 | 4 | 4 | 4 | 4 | 4 | 4 | 4 | 4 | 4 | 4 | 4 |
| 7 | 4 | 4 | 4 | 4 | 4 | 4 | 4 | 4 | 4 | 4 | 4 | 4 | 4 | 4 | 4 | 4 |
| 8 | 4 | 4 | 4 | 4 | 4 | 4 | 4 | 4 | 4 | 4 | 4 | 4 | 4 | 4 | 4 | 4 |
| 9 | 4 | 4 | 4 | 4 | 4 | 4 | 4 | 4 | 4 | 4 | 4 | 4 | 4 | 4 | 4 | 4 |
| A | 4 | 4 | 4 | 4 | 4 | 4 | 4 | 4 | 4 | 4 | 4 | 4 | 4 | 4 | 4 | 4 |
| B | 4 | 4 | 4 | 4 | 4 | 4 | 4 | 4 | 4 | 4 | 4 | 4 | 4 | 4 | 4 | 4 |
| C | 4 | 4 | 4 | 4 | 4 | 4 | 4 | 4 | 4 | 3 | 4 | 4 | 4 | 4 | 4 | 4 |
| D | 4 | 4 | 4 | 4 | 4 | 4 | 4 | 4 | 4 | 4 | 4 | 4 | 4 | 4 | 4 | 4 |
| E | 3 | 4 | 4 | 4 | 4 | 4 | 4 | 4 | 4 | 4 | 4 | 4 | 4 | 4 | 4 | 4 |
| F | 4 | 4 | 4 | 4 | 4 | 4 | 4 | 3 | 4 | 4 | 4 | 4 | 4 | 4 | 4 | 4 |

FIG. 17E

8,184 Bytes of Merged (Interleaved) Sample Sequence Data Generated Using
Unconstrained primeM Primes
seed=0E00000E, primeM1=01000201, primeM2=00000017, Data is compressible

```
0F00020F  0E000025  10000410  0E00003C  11000611  0E000053
12000812  0E00006A  13000A13  0E000081  14000C14  0E000098
15000E15  0E0000AF  16001016  0E0000C6  17001217  0E0000DD
18001418  0E0000F4  19001619  0E00010B  1A00181A  0E000122
1B001A1B  0E000139  1C001C1C  0E000150  1D001E1D  0E000167
1E00201E  0E00017E  1F00221F  0E000195  20002420  0E0001AC
21002621  0E0001C3  22002822  0E0001DA  23002A23  0E0001F1
24002C24  0E000208  25002E25  0E00021F  26003026  0E000236
27003227  0E00024D  28003428  0E000264  29003629  0E00027B
2A00382A  0E000292  2B003A2B  0E0002A9  2C003C2C  0E0002C0
2D003E2D  0E0002D7  2E00402E  0E0002EE  2F00422F  0E000305
30004430  0E00031C  31004631  0E000333  32004832  0E00034A
33004A33  0E000361  34004C34  0E000378  35004E35  0E00038F
36005036  0E0003A6  37005237  0E0003BD  38005438  0E0003D4
39005639  0E0003EB  3A00583A  0E000402  3B005A3B  0E000419
3C005C3C  0E000430  3D005E3D  0E000447  3E00603E  0E00045E
3F00623F  0E000475  40006440  0E00048C  41006641  0E0004A3
42006842  0E0004BA  43006A43  0E0004D1  44006C44  0E0004E8
45006E45  0E0004FF  46007046  0E000516  47007247  0E00052D
48007448  0E000544  49007649  0E00055B  4A00784A  0E000572
4B007A4B  0E000589  4C007C4C  0E0005A0  4D007E4D  0E0005B7
4E00804E  0E0005CE  4F00824F  0E0005E5  50008450  0E0005FC
51008651  0E000613  52008852  0E00062A  53008A53  0E000641
54008C54  0E000658  55008E55  0E00066F  56009056  0E000686
57009257  0E00069D  58009458  0E0006B4  59009659  0E0006CB
5A00985A  0E0006E2  5B009A5B  0E0006F9  5C009C5C  0E000710
5D009E5D  0E000727  5E00A05E  0E00073E  5F00A25F  0E000755
6000A460  0E00076C  6100A661  0E000783  6200A862  0E00079A
6300AA63  0E0007B1  6400AC64  0E0007C8  6500AE65  0E0007DF
6600B066  0E0007F6  6700B267  0E00080D  6800B468  0E000824
6900B669  0E00083B  6A00B86A  0E000852  6B00BA6B  0E000869
6C00BC6C  0E000880  6D00BE6D  0E000897  6E00C06E  0E0008AE
6F00C26F  0E0008C5  7000C470  0E0008DC  7100C671  0E0008F3
7200C872  0E00090A  7300CA73  0E000921  7400CC74  0E000938
7500CE75  0E00094F  7600D076  0E000966  7700D277  0E00097D
7800D478  0E000994  7900D679  0E0009AB  7A00D87A  0E0009C2
7B00DA7B  0E0009D9  7C00DC7C  0E0009F0  7D00DE7D  0E000A07
7E00E07E  0E000A1E  7F00E27F  0E000A35  8000E480  0E000A4C
8100E681  0E000A63  8200E882  0E000A7A  8300EA83  0E000A91
8400EC84  0E000AA8  8500EE85  0E000ABF  8600F086  0E000AD6
8700F287  0E000AED  8800F488  0E000B04  8900F689  0E000B1B
8A00F88A  0E000B32  8B00FA8B  0E000B49  8C00FC8C  0E000B60
8D00FE8D  0E000B77  8E01008E  0E000B8E  8F01028F  0E000BA5
90010490  0E000BBC  91010691  0E000BD3  92010892  0E000BEA
93010A93  0E000C01  94010C94  0E000C18  95010E95  0E000C2F
96011096  0E000C46  97011297  0E000C5D  98011498  0E000C74
```
(Cont. at FIG. 18B)

FIG. 18A

```
99011699  0E000C8B  9A01189A  0E000CA2  9B011A9B  0E000CB9
9C011C9C  0E000CD0  9D011E9D  0E000CE7  9E01209E  0E000CFE
9F01229F  0E000D15  A00124A0  0E000D2C  A10126A1  0E000D43
A20128A2  0E000D5A  A3012AA3  0E000D71  A4012CA4  0E000D88
A5012EA5  0E000D9F  A60130A6  0E000DB6  A70132A7  0E000DCD
A80134A8  0E000DE4  A90136A9  0E000DFB  AA0138AA  0E000E12
AB013AAB  0E000E29  AC013CAC  0E000E40  AD013EAD  0E000E57
AE0140AE  0E000E6E  AF0142AF  0E000E85  B00144B0  0E000E9C
B10146B1  0E000EB3  B20148B2  0E000ECA  B3014AB3  0E000EE1
B4014CB4  0E000EF8  B5014EB5  0E000F0F  B60150B6  0E000F26
B70152B7  0E000F3D  B80154B8  0E000F54  B90156B9  0E000F6B
BA0158BA  0E000F82  BB015ABB  0E000F99  BC015CBC  0E000FB0
BD015EBD  0E000FC7  BE0160BE  0E000FDE  BF0162BF  0E000FF5
C00164C0  0E00100C  C10166C1  0E001023  C20168C2  0E00103A
C3016AC3  0E001051  C4016CC4  0E001068  C5016EC5  0E00107F
C60170C6  0E001096  C70172C7  0E0010AD  C80174C8  0E0010C4
C90176C9  0E0010DB  CA0178CA  0E0010F2  CB017ACB  0E001109
CC017CCC  0E001120  CD017ECD  0E001137  CE0180CE  0E00114E
CF0182CF  0E001165  D00184D0  0E00117C  D10186D1  0E001193
D20188D2  0E0011AA  D3018AD3  0E0011C1  D4018CD4  0E0011D8
D5018ED5  0E0011EF  D60190D6  0E001206  D70192D7  0E00121D
D80194D8  0E001234  D90196D9  0E00124B  DA0198DA  0E001262
DB019ADB  0E001279  DC019CDC  0E001290  DD019EDD  0E0012A7
DE01A0DE  0E0012BE  DF01A2DF  0E0012D5  E001A4E0  0E0012EC
E101A6E1  0E001303  E201A8E2  0E00131A  E301AAE3  0E001331
E401ACE4  0E001348  E501AEE5  0E00135F  E601B0E6  0E001376
E701B2E7  0E00138D  E801B4E8  0E0013A4  E901B6E9  0E0013BB
EA01B8EA  0E0013D2  EB01BAEB  0E0013E9  EC01BCEC  0E001400
ED01BEED  0E001417  EE01C0EE  0E00142E  EF01C2EF  0E001445
F001C4F0  0E00145C  F101C6F1  0E001473  F201C8F2  0E00148A
F301CAF3  0E0014A1  F401CCF4  0E0014B8  F501CEF5  0E0014CF
F601D0F6  0E0014E6  F701D2F7  0E0014FD  F801D4F8  0E001514
F901D6F9  0E00152B  FA01D8FA  0E001542  FB01DAFB  0E001559
FC01DCFC  0E001570  FD01DEFD  0E001587  FE01E0FE  0E00159E
FF01E2FF  0E0015B5  0001E500  0E0015CC  0101E701  0E0015E3
0201E902  0E0015FA  0301EB03  0E001611  0401ED04  0E001628
0501EF05  0E00163F  0601F106  0E001656  0701F307  0E00166D
0801F508  0E001684  0901F709  0E00169B  0A01F90A  0E0016B2
0B01FB0B  0E0016C9  0C01FD0C  0E0016E0  0D01FF0D  0E0016F7
0E02010E  0E00170E  0F02030F  0E001725  10020510  0E00173C
11020711  0E001753  12020912  0E00176A  13020B13  0E001781
14020D14  0E001798  15020F15  0E0017AF  16021116  0E0017C6
17021317  0E0017DD  18021518  0E0017F4  19021719  0E00180B
1A02191A  0E001822  1B021B1B  0E001839  1C021D1C  0E001850
1D021F1D  0E001867  1E02211E  0E00187E  1F02231F  0E001895
20022520  0E0018AC  21022721  0E0018C3  22022922  0E0018DA
23022B23  0E0018F1  24022D24  0E001908  25022F25  0E00191F
26023126  0E001936  27023327  0E00194D  28023528  0E001964
29023729  0E00197B  2A02392A  0E001992  2B023B2B  0E0019A9  (Cont. at
2C023D2C  0E0019C0  2D023F2D  0E0019D7  2E02412E  0E0019EE  FIG. 18C)
```

FIG. 18B

| | | | | | |
|---|---|---|---|---|---|
| 2F02432F | 0E001A05 | 30024530 | 0E001A1C | 31024731 | 0E001A33 |
| 32024932 | 0E001A4A | 33024B33 | 0E001A61 | 34024D34 | 0E001A78 |
| 35024F35 | 0E001A8F | 36025136 | 0E001AA6 | 37025337 | 0E001ABD |
| 38025538 | 0E001AD4 | 39025739 | 0E001AEB | 3A02593A | 0E001B02 |
| 3B025B3B | 0E001B19 | 3C025D3C | 0E001B30 | 3D025F3D | 0E001B47 |
| 3E02613E | 0E001B5E | 3F02633F | 0E001B75 | 40026540 | 0E001B8C |
| 41026741 | 0E001BA3 | 42026942 | 0E001BBA | 43026B43 | 0E001BD1 |
| 44026D44 | 0E001BE8 | 45026F45 | 0E001BFF | 46027146 | 0E001C16 |
| 47027347 | 0E001C2D | 48027548 | 0E001C44 | 49027749 | 0E001C5B |
| 4A02794A | 0E001C72 | 4B027B4B | 0E001C89 | 4C027D4C | 0E001CA0 |
| 4D027F4D | 0E001CB7 | 4E02814E | 0E001CCE | 4F02834F | 0E001CE5 |
| 50028550 | 0E001CFC | 51028751 | 0E001D13 | 52028952 | 0E001D2A |
| 53028B53 | 0E001D41 | 54028D54 | 0E001D58 | 55028F55 | 0E001D6F |
| 56029156 | 0E001D86 | 57029357 | 0E001D9D | 58029558 | 0E001DB4 |
| 59029759 | 0E001DCB | 5A02995A | 0E001DE2 | 5B029B5B | 0E001DF9 |
| 5C029D5C | 0E001E10 | 5D029F5D | 0E001E27 | 5E02A15E | 0E001E3E |
| 5F02A35F | 0E001E55 | 6002A560 | 0E001E6C | 6102A761 | 0E001E83 |
| 6202A962 | 0E001E9A | 6302AB63 | 0E001EB1 | 6402AD64 | 0E001EC8 |
| 6502AF65 | 0E001EDF | 6602B166 | 0E001EF6 | 6702B367 | 0E001F0D |
| 6802B568 | 0E001F24 | 6902B769 | 0E001F3B | 6A02B96A | 0E001F52 |
| 6B02BB6B | 0E001F69 | 6C02BD6C | 0E001F80 | 6D02BF6D | 0E001F97 |
| 6E02C16E | 0E001FAE | 6F02C36F | 0E001FC5 | 7002C570 | 0E001FDC |
| 7102C771 | 0E001FF3 | 7202C972 | 0E00200A | 7302CB73 | 0E002021 |
| 7402CD74 | 0E002038 | 7502CF75 | 0E00204F | 7602D176 | 0E002066 |
| 7702D377 | 0E00207D | 7802D578 | 0E002094 | 7902D779 | 0E0020AB |
| 7A02D97A | 0E0020C2 | 7B02DB7B | 0E0020D9 | 7C02DD7C | 0E0020F0 |
| 7D02DF7D | 0E002107 | 7E02E17E | 0E00211E | 7F02E37F | 0E002135 |
| 8002E580 | 0E00214C | 8102E781 | 0E002163 | 8202E982 | 0E00217A |
| 8302EB83 | 0E002191 | 8402ED84 | 0E0021A8 | 8502EF85 | 0E0021BF |
| 8602F186 | 0E0021D6 | 8702F387 | 0E0021ED | 8802F588 | 0E002204 |
| 8902F789 | 0E00221B | 8A02F98A | 0E002232 | 8B02FB8B | 0E002249 |
| 8C02FD8C | 0E002260 | 8D02FF8D | 0E002277 | 8E03018E | 0E00228E |
| 8F03038F | 0E0022A5 | 90030590 | 0E0022BC | 91030791 | 0E0022D3 |
| 92030992 | 0E0022EA | 93030B93 | 0E002301 | 94030D94 | 0E002318 |
| 95030F95 | 0E00232F | 96031196 | 0E002346 | 97031397 | 0E00235D |
| 98031598 | 0E002374 | 99031799 | 0E00238B | 9A03199A | 0E0023A2 |
| 9B031B9B | 0E0023B9 | 9C031D9C | 0E0023D0 | 9D031F9D | 0E0023E7 |
| 9E03219E | 0E0023FE | 9F03239F | 0E002415 | A00325A0 | 0E00242C |
| A10327A1 | 0E002443 | A20329A2 | 0E00245A | A3032BA3 | 0E002471 |
| A4032DA4 | 0E002488 | A5032FA5 | 0E00249F | A60331A6 | 0E0024B6 |
| A70333A7 | 0E0024CD | A80335A8 | 0E0024E4 | A90337A9 | 0E0024FB |
| AA0339AA | 0E002512 | AB033BAB | 0E002529 | AC033DAC | 0E002540 |
| AD033FAD | 0E002557 | AE0341AE | 0E00256E | AF0343AF | 0E002585 |
| B00345B0 | 0E00259C | B10347B1 | 0E0025B3 | B20349B2 | 0E0025CA |
| B3034BB3 | 0E0025E1 | B4034DB4 | 0E0025F8 | B5034FB5 | 0E00260F |
| B60351B6 | 0E002626 | B70353B7 | 0E00263D | B80355B8 | 0E002654 |
| B90357B9 | 0E00266B | BA0359BA | 0E002682 | BB035BBB | 0E002699 |
| BC035DBC | 0E0026B0 | BD035FBD | 0E0026C7 | BE0361BE | 0E0026DE |
| BF0363BF | 0E0026F5 | C00365C0 | 0E00270C | C10367C1 | 0E002723 |
| C20369C2 | 0E00273A | C3036BC3 | 0E002751 | C4036DC4 | 0E002768 |

```
C5036FC5  0E00277F  C60371C6  0E002796  C70373C7  0E0027AD
C80375C8  0E0027C4  C90377C9  0E0027DB  CA0379CA  0E0027F2
CB037BCB  0E002809  CC037DCC  0E002820  CD037FCD  0E002837
CE0381CE  0E00284E  CF0383CF  0E002865  D00385D0  0E00287C
D10387D1  0E002893  D20389D2  0E0028AA  D3038BD3  0E0028C1
D4038DD4  0E0028D8  D5038FD5  0E0028EF  D60391D6  0E002906
D70393D7  0E00291D  D80395D8  0E002934  D90397D9  0E00294B
DA0399DA  0E002962  DB039BDB  0E002979  DC039DDC  0E002990
DD039FDD  0E0029A7  DE03A1DE  0E0029BE  DF03A3DF  0E0029D5
E003A5E0  0E0029EC  E103A7E1  0E002A03  E203A9E2  0E002A1A
E303ABE3  0E002A31  E403ADE4  0E002A48  E503AFE5  0E002A5F
E603B1E6  0E002A76  E703B3E7  0E002A8D  E803B5E8  0E002AA4
E903B7E9  0E002ABB  EA03B9EA  0E002AD2  EB03BBEB  0E002AE9
EC03BDEC  0E002B00  ED03BFED  0E002B17  EE03C1EE  0E002B2E
EF03C3EF  0E002B45  F003C5F0  0E002B5C  F103C7F1  0E002B73
F203C9F2  0E002B8A  F303CBF3  0E002BA1  F403CDF4  0E002BB8
F503CFF5  0E002BCF  F603D1F6  0E002BE6  F703D3F7  0E002BFD
F803D5F8  0E002C14  F903D7F9  0E002C2B  FA03D9FA  0E002C42
FB03DBFB  0E002C59  FC03DDFC  0E002C70  FD03DFFD  0E002C87
FE03E1FE  0E002C9E  FF03E3FF  0E002CB5  0003E600  0E002CCC
0103E801  0E002CE3  0203EA02  0E002CFA  0303EC03  0E002D11
0403EE04  0E002D28  0503F005  0E002D3F  0603F206  0E002D56
0703F407  0E002D6D  0803F608  0E002D84  0903F809  0E002D9B
0A03FA0A  0E002DB2  0B03FC0B  0E002DC9  0C03FE0C  0E002DE0
0D04000D  0E002DF7  0E04020E  0E002E0E  0F04040F  0E002E25
10040610  0E002E3C  11040811  0E002E53  12040A12  0E002E6A
13040C13  0E002E81  14040E14  0E002E98  15041015  0E002EAF
16041216  0E002EC6  17041417  0E002EDD  18041618  0E002EF4
19041819  0E002F0B  1A041A1A  0E002F22  1B041C1B  0E002F39
1C041E1C  0E002F50  1D04201D  0E002F67  1E04221E  0E002F7E
1F04241F  0E002F95  20042620  0E002FAC  21042821  0E002FC3
22042A22  0E002FDA  23042C23  0E002FF1  24042E24  0E003008
25043025  0E00301F  26043226  0E003036  27043427  0E00304D
28043628  0E003064  29043829  0E00307B  2A043A2A  0E003092
2B043C2B  0E0030A9  2C043E2C  0E0030C0  2D04402D  0E0030D7
2E04422E  0E0030EE  2F04442F  0E003105  30044630  0E00311C
31044831  0E003133  32044A32  0E00314A  33044C33  0E003161
34044E34  0E003178  35045035  0E00318F  36045236  0E0031A6
37045437  0E0031BD  38045638  0E0031D4  39045839  0E0031EB
3A045A3A  0E003202  3B045C3B  0E003219  3C045E3C  0E003230
3D04603D  0E003247  3E04623E  0E00325E  3F04643F  0E003275
40046640  0E00328C  41046841  0E0032A3  42046A42  0E0032BA
43046C43  0E0032D1  44046E44  0E0032E8  45047045  0E0032FF
46047246  0E003316  47047447  0E00332D  48047648  0E003344
49047849  0E00335B  4A047A4A  0E003372  4B047C4B  0E003389
4C047E4C  0E0033A0  4D04804D  0E0033B7  4E04824E  0E0033CE
4F04844F  0E0033E5  50048650  0E0033FC  51048851  0E003413
52048A52  0E00342A  53048C53  0E003441  54048E54  0E003458  (Cont. at
55049055  0E00346F  56049256  0E003486  57049457  0E00349D  FIG. 18E)
```

FIG. 18D

```
58049658  0E0034B4  59049859  0E0034CB  5A049A5A  0E0034E2
5B049C5B  0E0034F9  5C049E5C  0E003510  5D04A05D  0E003527
5E04A25E  0E00353E  5F04A45F  0E003555  6004A660  0E00356C
6104A861  0E003583  6204AA62  0E00359A  6304AC63  0E0035B1
6404AE64  0E0035C8  6504B065  0E0035DF  6604B266  0E0035F6
6704B467  0E00360D  6804B668  0E003624  6904B869  0E00363B
6A04BA6A  0E003652  6B04BC6B  0E003669  6C04BE6C  0E003680
6D04C06D  0E003697  6E04C26E  0E0036AE  6F04C46F  0E0036C5
7004C670  0E0036DC  7104C871  0E0036F3  7204CA72  0E00370A
7304CC73  0E003721  7404CE74  0E003738  7504D075  0E00374F
7604D276  0E003766  7704D477  0E00377D  7804D678  0E003794
7904D879  0E0037AB  7A04DA7A  0E0037C2  7B04DC7B  0E0037D9
7C04DE7C  0E0037F0  7D04E07D  0E003807  7E04E27E  0E00381E
7F04E47F  0E003835  8004E680  0E00384C  8104E881  0E003863
8204EA82  0E00387A  8304EC83  0E003891  8404EE84  0E0038A8
8504F085  0E0038BF  8604F286  0E0038D6  8704F487  0E0038ED
8804F688  0E003904  8904F889  0E00391B  8A04FA8A  0E003932
8B04FC8B  0E003949  8C04FE8C  0E003960  8D05008D  0E003977
8E05028E  0E00398E  8F05048F  0E0039A5  90050690  0E0039BC
91050891  0E0039D3  92050A92  0E0039EA  93050C93  0E003A01
94050E94  0E003A18  95051095  0E003A2F  96051296  0E003A46
97051497  0E003A5D  98051698  0E003A74  99051899  0E003A8B
9A051A9A  0E003AA2  9B051C9B  0E003AB9  9C051E9C  0E003AD0
9D05209D  0E003AE7  9E05229E  0E003AFE  9F05249F  0E003B15
A00526A0  0E003B2C  A10528A1  0E003B43  A2052AA2  0E003B5A
A3052CA3  0E003B71  A4052EA4  0E003B88  A50530A5  0E003B9F
A60532A6  0E003BB6  A70534A7  0E003BCD  A80536A8  0E003BE4
A90538A9  0E003BFB  AA053AAA  0E003C12  AB053CAB  0E003C29
AC053EAC  0E003C40  AD0540AD  0E003C57  AE0542AE  0E003C6E
AF0544AF  0E003C85  B00546B0  0E003C9C  B10548B1  0E003CB3
B2054AB2  0E003CCA  B3054CB3  0E003CE1  B4054EB4  0E003CF8
B50550B5  0E003D0F  B60552B6  0E003D26  B70554B7  0E003D3D
B80556B8  0E003D54  B90558B9  0E003D6B  BA055ABA  0E003D82
BB055CBB  0E003D99  BC055EBC  0E003DB0  BD0560BD  0E003DC7
BE0562BE  0E003DDE  BF0564BF  0E003DF5  C00566C0  0E003E0C
C10568C1  0E003E23  C2056AC2  0E003E3A  C3056CC3  0E003E51
C4056EC4  0E003E68  C50570C5  0E003E7F  C60572C6  0E003E96
C70574C7  0E003EAD  C80576C8  0E003EC4  C90578C9  0E003EDB
CA057ACA  0E003EF2  CB057CCB  0E003F09  CC057ECC  0E003F20
CD0580CD  0E003F37  CE0582CE  0E003F4E  CF0584CF  0E003F65
D00586D0  0E003F7C  D10588D1  0E003F93  D2058AD2  0E003FAA
D3058CD3  0E003FC1  D4058ED4  0E003FD8  D50590D5  0E003FEF
D60592D6  0E004006  D70594D7  0E00401D  D80596D8  0E004034
D90598D9  0E00404B  DA059ADA  0E004062  DB059CDB  0E004079
DC059EDC  0E004090  DD05A0DD  0E0040A7  DE05A2DE  0E0040BE
DF05A4DF  0E0040D5  E005A6E0  0E0040EC  E105A8E1  0E004103
E205AAE2  0E00411A  E305ACE3  0E004131  E405AEE4  0E004148
E505B0E5  0E00415F  E605B2E6  0E004176  E705B4E7  0E00418D
E805B6E8  0E0041A4  E905B8E9  0E0041BB  EA05BAEA  0E0041D2
EB05BCEB  0E0041E9  EC05BEEC  0E004200  ED05C0ED  0E004217
```

```
EE05C2EE  0E00422E  EF05C4EF  0E004245  F005C6F0  0E00425C
F105C8F1  0E004273  F205CAF2  0E00428A  F305CCF3  0E0042A1
F405CEF4  0E0042B8  F505D0F5  0E0042CF  F605D2F6  0E0042E6
F705D4F7  0E0042FD  F805D6F8  0E004314  F905D8F9  0E00432B
FA05DAFA  0E004342  FB05DCFB  0E004359  FC05DEFC  0E004370
FD05E0FD  0E004387  FE05E2FE  0E00439E  FF05E4FF  0E0043B5
0005E700  0E0043CC  0105E901  0E0043E3  0205EB02  0E0043FA
0305ED03  0E004411  0405EF04  0E004428  0505F105  0E00443F
0605F306  0E004456  0705F507  0E00446D  0805F708  0E004484
0905F909  0E00449B  0A05FB0A  0E0044B2  0B05FD0B  0E0044C9
0C05FF0C  0E0044E0  0D06010D  0E0044F7  0E06030E  0E00450E
0F06050F  0E004525  10060710  0E00453C  11060911  0E004553
12060B12  0E00456A  13060D13  0E004581  14060F14  0E004598
15061115  0E0045AF  16061316  0E0045C6  17061517  0E0045DD
18061718  0E0045F4  19061919  0E00460B  1A061B1A  0E004622
1B061D1B  0E004639  1C061F1C  0E004650  1D06211D  0E004667
1E06231E  0E00467E  1F06251F  0E004695  20062720  0E0046AC
21062921  0E0046C3  22062B22  0E0046DA  23062D23  0E0046F1
24062F24  0E004708  25063125  0E00471F  26063326  0E004736
27063527  0E00474D  28063728  0E004764  29063929  0E00477B
2A063B2A  0E004792  2B063D2B  0E0047A9  2C063F2C  0E0047C0
2D06412D  0E0047D7  2E06432E  0E0047EE  2F06452F  0E004805
30064730  0E00481C  31064931  0E004833  32064B32  0E00484A
33064D33  0E004861  34064F34  0E004878  35065135  0E00488F
36065336  0E0048A6  37065537  0E0048BD  38065738  0E0048D4
39065939  0E0048EB  3A065B3A  0E004902  3B065D3B  0E004919
3C065F3C  0E004930  3D06613D  0E004947  3E06633E  0E00495E
3F06653F  0E004975  40066740  0E00498C  41066941  0E0049A3
42066B42  0E0049BA  43066D43  0E0049D1  44066F44  0E0049E8
45067145  0E0049FF  46067346  0E004A16  47067547  0E004A2D
48067748  0E004A44  49067949  0E004A5B  4A067B4A  0E004A72
4B067D4B  0E004A89  4C067F4C  0E004AA0  4D06814D  0E004AB7
4E06834E  0E004ACE  4F06854F  0E004AE5  50068750  0E004AFC
51068951  0E004B13  52068B52  0E004B2A  53068D53  0E004B41
54068F54  0E004B58  55069155  0E004B6F  56069356  0E004B86
57069557  0E004B9D  58069758  0E004BB4  59069959  0E004BCB
5A069B5A  0E004BE2  5B069D5B  0E004BF9  5C069F5C  0E004C10
5D06A15D  0E004C27  5E06A35E  0E004C3E  5F06A55F  0E004C55
6006A760  0E004C6C  6106A961  0E004C83  6206AB62  0E004C9A
6306AD63  0E004CB1  6406AF64  0E004CC8  6506B165  0E004CDF
6606B366  0E004CF6  6706B567  0E004D0D  6806B768  0E004D24
6906B969  0E004D3B  6A06BB6A  0E004D52  6B06BD6B  0E004D69
6C06BF6C  0E004D80  6D06C16D  0E004D97  6E06C36E  0E004DAE
6F06C56F  0E004DC5  7006C770  0E004DDC  7106C971  0E004DF3
7206CB72  0E004E0A  7306CD73  0E004E21  7406CF74  0E004E38
7506D175  0E004E4F  7606D376  0E004E66  7706D577  0E004E7D
7806D778  0E004E94  7906D979  0E004EAB  7A06DB7A  0E004EC2
7B06DD7B  0E004ED9  7C06DF7C  0E004EF0  7D06E17D  0E004F07
7E06E37E  0E004F1E  7F06E57F  0E004F35  8006E780  0E004F4C
8106E981  0E004F63  8206EB82  0E004F7A  8306ED83  0E004F91
```
(Cont. at FIG. 18G)

FIG. 18F

```
8406EF84  0E004FA8  8506F185  0E004FBF  8606F386  0E004FD6
8706F587  0E004FED  8806F788  0E005004  8906F989  0E00501B
8A06FB8A  0E005032  8B06FD8B  0E005049  8C06FF8C  0E005060
8D07018D  0E005077  8E07038E  0E00508E  8F07058F  0E0050A5
90070790  0E0050BC  91070991  0E0050D3  92070B92  0E0050EA
93070D93  0E005101  94070F94  0E005118  95071195  0E00512F
96071396  0E005146  97071597  0E00515D  98071798  0E005174
99071999  0E00518B  9A071B9A  0E0051A2  9B071D9B  0E0051B9
9C071F9C  0E0051D0  9D07219D  0E0051E7  9E07239E  0E0051FE
9F07259F  0E005215  A00727A0  0E00522C  A10729A1  0E005243
A2072BA2  0E00525A  A3072DA3  0E005271  A4072FA4  0E005288
A50731A5  0E00529F  A60733A6  0E0052B6  A70735A7  0E0052CD
A80737A8  0E0052E4  A90739A9  0E0052FB  AA073BAA  0E005312
AB073DAB  0E005329  AC073FAC  0E005340  AD0741AD  0E005357
AE0743AE  0E00536E  AF0745AF  0E005385  B00747B0  0E00539C
B10749B1  0E0053B3  B2074BB2  0E0053CA  B3074DB3  0E0053E1
B4074FB4  0E0053F8  B50751B5  0E00540F  B60753B6  0E005426
B70755B7  0E00543D  B80757B8  0E005454  B90759B9  0E00546B
BA075BBA  0E005482  BB075DBB  0E005499  BC075FBC  0E0054B0
BD0761BD  0E0054C7  BE0763BE  0E0054DE  BF0765BF  0E0054F5
C00767C0  0E00550C  C10769C1  0E005523  C2076BC2  0E00553A
C3076DC3  0E005551  C4076FC4  0E005568  C50771C5  0E00557F
C60773C6  0E005596  C70775C7  0E0055AD  C80777C8  0E0055C4
C90779C9  0E0055DB  CA077BCA  0E0055F2  CB077DCB  0E005609
CC077FCC  0E005620  CD0781CD  0E005637  CE0783CE  0E00564E
CF0785CF  0E005665  D00787D0  0E00567C  D10789D1  0E005693
D2078BD2  0E0056AA  D3078DD3  0E0056C1  D4078FD4  0E0056D8
D50791D5  0E0056EF  D60793D6  0E005706  D70795D7  0E00571D
D80797D8  0E005734  D90799D9  0E00574B  DA079BDA  0E005762
DB079DDB  0E005779  DC079FDC  0E005790  DD07A1DD  0E0057A7
DE07A3DE  0E0057BE  DF07A5DF  0E0057D5  E007A7E0  0E0057EC
E107A9E1  0E005803  E207ABE2  0E00581A  E307ADE3  0E005831
E407AFE4  0E005848  E507B1E5  0E00585F  E607B3E6  0E005876
E707B5E7  0E00588D  E807B7E8  0E0058A4  E907B9E9  0E0058BB
EA07BBEA  0E0058D2  EB07BDEB  0E0058E9  EC07BFEC  0E005900
ED07C1ED  0E005917  EE07C3EE  0E00592E  EF07C5EF  0E005945
F007C7F0  0E00595C  F107C9F1  0E005973  F207CBF2  0E00598A
F307CDF3  0E0059A1  F407CFF4  0E0059B8  F507D1F5  0E0059CF
F607D3F6  0E0059E6  F707D5F7  0E0059FD  F807D7F8  0E005A14
F907D9F9  0E005A2B  FA07DBFA  0E005A42  FB07DDFB  0E005A59
FC07DFFC  0E005A70  FD07E1FD  0E005A87  FE07E3FE  0E005A9E
FF07E5FF  0E005AB5  0007E800  0E005ACC  0107EA01  0E005AE3
0207EC02  0E005AFA  0307EE03  0E005B11  0407F004  0E005B28
0507F205  0E005B3F  0607F406  0E005B56  0707F607  0E005B6D
0807F808  0E005B84  0907FA09  0E005B9B  0A07FC0A  0E005BB2
0B07FE0B  0E005BC9  0C08000C  0E005BE0  0D08020D  0E005BF7
```

FIG. 18G

Frequency Analysis Table for All Byte Values in the Sample Sequence
Length: 8,184 Bytes
seed=0E00000E, unconstrained primeM1=01000201,
unconstrained primeM2=00000017

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 1176 | 155 | 156 | 154 | 156 | 155 | 155 | 154 | 29 | 27 | 27 | 27 | 28 | 27 | 1047 | 27 |
| 1 | 27 | 27 | 27 | 27 | 28 | 27 | 27 | 27 | 27 | 27 | 27 | 28 | 27 | 27 | 27 | 27 |
| 2 | 27 | 27 | 27 | 28 | 27 | 27 | 27 | 27 | 27 | 27 | 27 | 28 | 27 | 27 | 27 | 27 |
| 3 | 27 | 27 | 28 | 27 | 27 | 27 | 27 | 27 | 27 | 27 | 28 | 27 | 27 | 27 | 27 | 27 |
| 4 | 27 | 27 | 28 | 27 | 27 | 27 | 27 | 27 | 27 | 28 | 27 | 27 | 27 | 27 | 27 | 27 |
| 5 | 27 | 28 | 27 | 27 | 27 | 27 | 27 | 27 | 27 | 28 | 27 | 27 | 16 | 16 | 16 | 16 |
| 6 | 16 | 16 | 16 | 16 | 16 | 16 | 16 | 16 | 16 | 16 | 16 | 16 | 16 | 16 | 16 | 16 |
| 7 | 16 | 16 | 16 | 16 | 16 | 16 | 16 | 16 | 16 | 16 | 16 | 16 | 16 | 16 | 16 | 16 |
| 8 | 16 | 16 | 16 | 16 | 16 | 16 | 16 | 16 | 16 | 16 | 16 | 16 | 16 | 16 | 16 | 16 |
| 9 | 16 | 16 | 16 | 16 | 16 | 16 | 16 | 16 | 16 | 16 | 16 | 16 | 16 | 16 | 16 | 16 |
| A | 16 | 16 | 16 | 16 | 16 | 16 | 16 | 16 | 16 | 16 | 16 | 16 | 16 | 16 | 16 | 16 |
| B | 16 | 16 | 16 | 16 | 16 | 16 | 16 | 16 | 16 | 16 | 16 | 16 | 16 | 16 | 16 | 16 |
| C | 16 | 16 | 16 | 16 | 16 | 16 | 16 | 16 | 16 | 16 | 16 | 16 | 16 | 16 | 16 | 16 |
| D | 16 | 16 | 16 | 16 | 16 | 16 | 16 | 16 | 16 | 16 | 16 | 16 | 16 | 16 | 16 | 16 |
| E | 16 | 16 | 16 | 16 | 15 | 16 | 15 | 16 | 16 | 16 | 16 | 16 | 16 | 16 | 16 | 16 |
| F | 16 | 16 | 16 | 16 | 16 | 16 | 16 | 16 | 16 | 16 | 16 | 16 | 16 | 16 | 16 | 16 |

FIG. 18H

GENERATING A DATA STREAM WITH A PREDICTABLE CHANGE RATE

BACKGROUND OF THE INVENTION

Certain applications require various sets of data for testing purposes. While real user data can be used for testing, such data changes slowly and infrequently. As such, non-user data can be generated and used for testing. Conventionally, testing data is generated by hashing and/or cryptography techniques. However, generating testing data by hashing and/or cryptography techniques may be slow and inefficient. Moreover, generating testing data with a predictable amount of change using conventional techniques may be inefficient or difficult.

Furthermore, in conventional systems, a master copy of a data stream is needed to verify another copy of the data stream. The master copy of the data stream can be compared to the other copy of the data stream to determine whether the values of the data stream to be verified match those of the master copy. However, it may not be feasible and/or too costly to maintain a master copy of each data stream that is to be verified.

In some conventional systems, data is automatically compressed before it is sent across a network to potentially reduce the amount of data to be sent over the network. However, it may not be desirable to compress data in certain testing environments in which it is desired to maintain the original size of the data.

BRIEF DESCRIPTION OF THE DRAWINGS

Various embodiments of the invention are disclosed in the following detailed description and the accompanying drawings.

FIG. 6 is a diagram showing a table that includes sample constrained and unconstrained 32-bit primeM values to help explain how a primeM value is determined to be constrained or unconstrained.

FIG. 9A is a diagram showing a table that includes 32-bit values of a compressible sequence generated using an initialization parameter and an unconstrained prime number.

FIG. 9B is a diagram showing a frequency analysis table for all component byte values of a sampling of 1,032 bytes of the sequence of FIG. 9A FIG. 10A is a diagram showing a table that includes 32-bit values of a non-compressible sequence generated using an initialization parameter and a constrained prime number.

FIG. 10B is a diagram showing a frequency analysis table for all component byte values of a sampling of 1,032 bytes of the sequence of FIG. 10A.

FIG. 10C is a diagram showing a frequency analysis table for all component byte values of a sampling of 12,288 bytes of the sequence of FIG. 10A.

FIG. 11 is a diagram showing a table of accumulator (generated data) internal byte value rotations.

FIGS. 13A to 13D are diagrams showing a table that includes 32-bit values of a non-compressible sequence generated using an initialization parameter and a constrained prime number.

FIG. 13E is a diagram showing a frequency analysis table for all component byte values of 4,080 bytes of the sequence of FIGS. 13A to 13D.

FIGS. 14A to 14D are diagrams showing a table that includes 32-bit values of a non-compressible sequence generated using an initialization parameter and a constrained prime number.

FIG. 14E is a diagram showing a frequency analysis table for all component byte values of 4,080 bytes of the sequence of FIGS. 14A to 14D.

FIGS. 15A to 15G are diagrams showing a table that includes 32-bit values of a non-compressible data stream generated from merging two non-compressible sequences.

FIG. 15H is a diagram showing a frequency analysis table for all component byte values of 8,124 bytes of the non-compressible data stream of FIGS. 15A to 15G.

FIGS. 16A to 16D are diagrams showing a table that includes 32-bit values of a compressible sequence generated using an initialization parameter and an unconstrained prime number.

FIG. 16E is a diagram showing a frequency analysis table for all component byte values of 4,080 bytes of the sequence of FIGS. 16A to 16D.

FIGS. 17A to 17D are diagrams showing a table that includes 32-bit values of a compressible sequence generated using an initialization parameter and an unconstrained prime number.

FIG. 17E is a diagram showing a frequency analysis table for all component byte values of 4,080 bytes of the sequence of FIGS. 17A to 17D.

FIGS. 18A to 18G are diagrams showing a table that includes 32-bit values of a compressible data stream generated from merging two compressible sequences.

FIG. 18H is a diagram showing a frequency analysis table for all component byte values of 8,184 bytes of the compressible data stream of FIGS. 18A to 18G.

DETAILED DESCRIPTION

Figure 1:
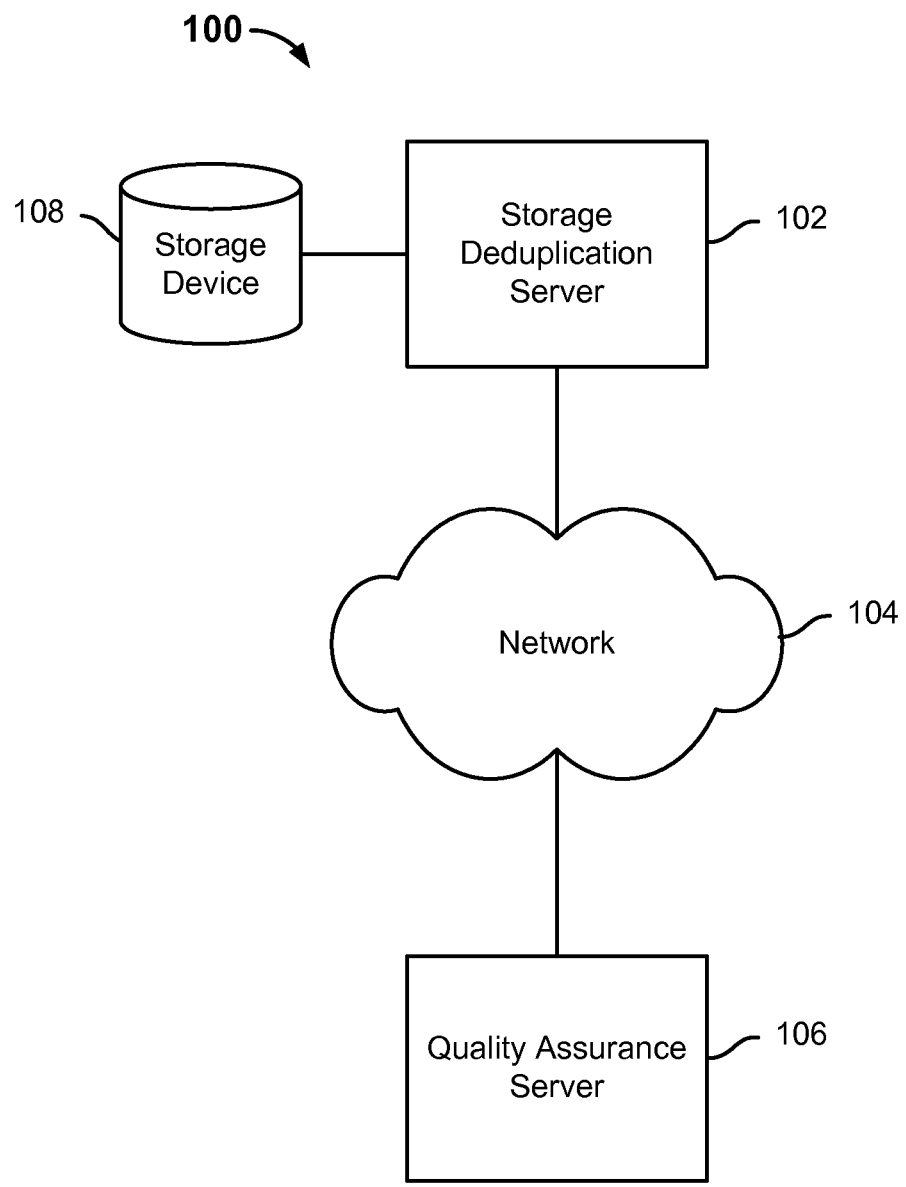
FIG. 1 is a diagram showing an embodiment of a system for performing quality assurance on a storage duplication server.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of data stream generation using prime numbers are described herein. An initialization parameter is received. In some embodiments, the initialization parameter is any value selected from a constrained address space. In various embodiments, a "sequence" refers to a sequence of values that is generated using an initialization parameter and a prime number. In some embodiments, a first sequence is generated using a first prime number and the initialization parameter. In some embodiments, a second sequence is generated using a second prime number and the initialization parameter. In some embodiments, the first prime number and the second prime number are selected based on a revision parameter that is received. In some embodiments, each of the first prime number and the second prime number is selected from a constrained modified set of prime numbers. A data stream is generated by merging (e.g., interleaving) the first sequence and the second sequence. In various embodiments, a "data stream" refers to a sequence of values that is determined by the merging (e.g., interleaving) of at least two sequences. In some embodiments, a data stream can be referred to as a "merged sequence." In some embodiments, a data stream is not deduplicatable. In various embodiments, a non-deduplicatable data stream comprises a data stream that does not include duplicate blocks of data (e.g., than can be identified by a deduplication system for a block size recognized by the deduplication system). Given a technique to generate a data stream that is not deduplicatable, other techniques can then be used to generate a data stream with a specific level of deduplication. In certain testing scenarios the specification of a specific deduplication level is very desirable.

In some embodiments, a data stream is generated at a high speed of approximately 2.3+GB per second on 64-bit machines with a single CPU. In some embodiments, a data stream is 100% reproducible on any computer. In some embodiments, a data stream does not repeat any block for 20 PB or more. In some embodiments, four billion or more unique data streams can be generated. In some embodiments, a data stream is unique from any other data stream generated from a different initialization parameter and/or a different pair of prime numbers. Furthermore, any block of a data stream is different from any block of any other data stream generated from a different initialization parameter and/or a different pair of prime numbers.

Embodiments of verifying a data stream without a master copy of the data stream or the parameters used to generate the data stream are described herein. In various embodiments, the parameters used to generate the data stream include at least the initialization parameter, the first prime number, and the second prime number. Whereas conventionally, a master copy (e.g., an original copy of the data stream that is used as a reference copy) of a data stream is required to perform verification of the data stream (e.g., as restored from a storage), as will be described in further detail below, a data stream as generated by embodiments described herein can be verified without a master copy of the data stream and/or even the parameters used to generate the data stream.

Embodiments of generating data that is not compressible are described herein. In various embodiments, "non-compressible" data refers to data that cannot be compressed (e.g., using common compression techniques). Data that cannot be compressed refers to data whose size remains unchanged or even increases (e.g., by an amount of overhead data generated by a compression technique) after the data is subjected to a compression technique. As will be described in further detail below, data can be non-compressible due to certain characteristics of the values in the data. For example, because compression techniques exploit redundancy in data, non-compressible data is generated in a manner that minimizes the redundancy among its values. In various embodiments, a "non-compressible sequence" refers to a sequence of values generated using an initialization parameter and a constrained prime number. In various embodiments, a "non-compressible data stream" refers to a sequence of values generated by merging two non-compressible sequences, each of which is generated using the same initialization parameter and a respective constrained prime number. As will be described in further detail below, a "constrained" prime number refers to a prime number that meets a predetermined set of criteria and therefore can be used to generate non-compressible data. In various embodiments, an "unconstrained" prime number refers to a prime number that does not meet a predetermined set of criteria and therefore may not be used to generate non-compressible data. In some embodiments, a set of constrained prime numbers is first identified. In some embodiments, a non-compressible first sequence associated with a first constrained prime number and the initialization parameter is obtained. In some embodiments, a non-compressible second sequence associated with a second constrained prime number and the initialization parameter is obtained. In some embodiments, the first constrained prime number and the second constrained prime number are selected based on a revision parameter that is received. A non-compressible data stream is generated by merging (e.g., interleaving) the first non-compressible sequence and the second non-compressible sequence associated with the respective first and second constrained prime numbers. In some embodiments, a non-compressible data stream is not deduplicatable.

Embodiments of modifying a data stream with a predictable change rate are described herein. In various embodiments, a change rate parameter comprising a specified change rate value is received. For example, the change rate comprises a desired percentage by which to modify a data stream. In various embodiments, the data stream to be modified by an amount determined based on a received change rate can be either a compressible or non-compressible data stream. For example, if the change rate value were R percent, then the modified data stream would have data that is R percent different from the original data stream and also have data that is (100–R) percent in common with the original data stream. For example, the data stream and the modified data stream can be used together in a quality assurance and/or storage deduplication testing system to test a deduplication technique in which the modified data stream is compared to the original data stream to determine whether the deduplication technique can determine the correct amount of data by which the modified data stream differs from the original data stream.

FIG. 1 is a diagram showing an embodiment of a system for performing quality assurance on a storage duplication server. In the example, system 100 includes storage deduplication server 102, storage device 108, network 104, and quality assurance server 106. Network 104 includes high-speed data networks and/or telecommunication networks. Storage device 108 comprises a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

System 100 includes a quality assurance environment in which quality assurance server 106 generates data streams that are sent over network 104 to storage deduplication server 102. Storage deduplication server 102 is configured to deduplicate data that it receives from quality assurance server 106 with respect to data that is already stored at storage device 108. Storage device 108 is attached to or otherwise accessible by storage deduplication server 102. For example, storage deduplication server 102 comprises a backup server that is configured to store at storage device 108 backup data received from a source location (e.g., quality assurance server 106). In some embodiments, storage deduplication server 102 is configured to segment each received data stream into data blocks (e.g., of a fixed size or of variable sizes) and perform deduplication with respect to each data block. For example, a data stream comprises a sequence of values and each data block comprises one or more values. In various embodiments, "deduplicating a data block" refers to determining whether the data block to be stored has already been stored at a target location (e.g., storage deduplication server 102 and/or storage device 108). In the event that the data block has not already been stored at the target location, the data block is stored at the target location (e.g., by storage deduplication server 102). Otherwise, in the event that the data block has already been stored at the target location, a reference, pointer, link, and/or other associating data to the previously stored data block is stored at the target location (e.g., by storage deduplication server 102) instead of another instance of the data block. In various embodiments, a reference, pointer, link, and/or other associating data to the stored data block comprises a relatively smaller amount of data relative to the amount of data associated with the data block. When a data stream stored at storage device 108 is to be restored (e.g., at the source location), the stored data blocks and/or references to stored data blocks associated with the data stream can be used to reconstruct the data stream. Deduplication can be used to reduce the amount of data that is stored at the target location by only storing new data that has not yet been stored at the target location and by storing references to data that has been previously stored at the target location.

For example, the parameters used in the generation of data streams and/or other attributes associated with the data streams are at least known to if not also controlled by quality assurance server 106. How storage deduplication server 102 performs deduplication with respect to storing at least two data streams that it receives from quality assurance server 106 given known data such as, for example, the percentage of difference in data between the two data streams, may indicate a deduplication result (e.g., a quality and/or effectiveness) of the storage deduplication techniques used by storage deduplication server 102. The deduplication result can be used to determine whether the deduplication techniques used by storage deduplication server 102 should be reconfigured, for example.

In some embodiments, quality assurance server 106 is configured to generate a data stream based on parameters such as an initialization parameter (sometimes referred to as a "seed value") and two prime numbers selected from a constrained modified set of prime numbers. In some embodiments, each pair of two prime numbers to be used with the initialization parameter (seed value) is selected based on a received revision parameter (sometimes referred to as a "revision value" and where two different revision values with respect to the same initialization parameter each maps to a different pair of prime numbers). A sequence is determined for the initialization parameter and each of the two prime numbers. In various embodiments, a data stream is determined by merging (e.g., interleaving) the two sequences. For example, merging the two sequences comprises creating a new (merged) sequence that includes each value from the first sequence followed by a corresponding value from the second sequence. For example, a first value from the first sequence that corresponds to a second value from the second sequence is associated with the same position within the first sequence as the second value is within the second sequence (e.g., a first value in position 1 of the first sequence corresponds to a second value in position 1 of the second sequence).

In some embodiments, if the two selected prime numbers each meets a predetermined set of criteria (as will be described in further detail below), then the two prime numbers comprise constrained prime numbers. A non-compressible sequence is generated with the same initialization parameter and each of the two constrained prime numbers and the two non-compressible sequences can be merged (e.g., interleaved) to generate a non-compressible data stream. Otherwise, if the two selected prime numbers each do not meet a predetermined set of criteria, then the two prime numbers comprise unconstrained prime numbers. A compressible sequence is generated with the same initialization parameter and each of the two unconstrained prime numbers and the two compressible sequences can be merged (e.g., interleaved) to generate a compressible data stream.

In some embodiments, this generated data stream is sent by quality assurance server 106 over network 104 to storage deduplication server 102 (e.g., as part of a test backup operation) for storage. Storage deduplication server 102 is configured to segment the data stream into data blocks (e.g., of fixed or variable sizes) and store only the new data blocks (e.g., data blocks that have not already been stored at storage device 108). If, for example, in a test backup operation, none of the data blocks of the data stream have already been stored at storage device 108, storage deduplication server 102 will store all the data blocks of the data stream. If, for example, in a test backup operation, some of the data blocks of the data stream have already been stored at storage device 108, storage deduplication server 102 will store references in place of the data blocks that have already been stored and store all the remaining data blocks of the data stream. Because the data stream is not deduplicatable, storage deduplication server 102 will not identify any duplicate data blocks within the data stream.

After the data stream is stored by storage deduplication server 102, the stored data stream may be restored. For example, restoring a stored data stream includes reconstructing the data stream using the stored data blocks and/or references to stored data blocks associated with the data stream. To test the accuracy or reliability of the storage deduplication techniques and/or the restoration techniques used by storage deduplication server 102, in some embodiments, quality assurance server 106 is configured to verify the data stream that was stored by and thereafter restored by the storage deduplication server 102. In some embodiments, quality assurance server 106 is configured to verify the correctness of the restored data stream by comparing the restored data stream to the original data stream that quality assurance server 106 had generated and then sent to storage deduplication server 102. As will be described in further detail below, in various embodiments, the restored data stream itself can be used to verify its correctness without requiring a master copy of the original data stream and/or the parameters used to generate the original data stream, thereby eliminating the need to maintain a master copy of the data stream for verification purposes. In various embodiments, a data stream can be verified in the same manner regardless if the data stream is compressible or non-compressible.

To test the quality and/or effectiveness of the storage deduplication techniques used by storage deduplication server 102, quality assurance server 106 is configured to generate a modified version of the previously generated data stream that was sent to storage deduplication server 102 over network 104. In some embodiments, quality assurance server 106 is configured to generate a modified data stream based on the parameters associated with the original data stream (e.g., the seed value, the revision value, and/or the two prime numbers) and an additional parameter such as a change rate parameter. For example, a change rate value of a change rate parameter comprises a percentage by which to modify the original data stream to generate the modified data stream. Put another way, a modified data stream differs from the original data stream by the percentage specified by the change rate. In some embodiments, this modified data stream is sent by quality assurance server 106 over network 104 to storage deduplication server 102 (e.g., as part of the same or a different test backup operation) for storage. Storage deduplication server 102 is configured to segment the modified data stream into data blocks (e.g., of variable sizes) and store only the new data blocks (e.g., data blocks that have not already been stored at storage device 108). Given the data blocks stored at storage device 108 for the original data stream, storage deduplication server 102 should store only those new data blocks from the modified data stream that differ from the original data stream.

Storage deduplication server 102 can deduplicate the modified data stream relative to the previously stored data blocks of the original data stream to determine an amount of non-duplicate (new) data to store and also a new set of references to previously stored duplicate data blocks to store. For example, the size of the new amount of data to store that is determined by storage deduplication server 102 can be sent to quality assurance server 106 such that quality assurance server 106 can determine the size of the new amount of data to store as a percentage of the total size of the modified data stream and determine whether the percentage matches or is substantially similar to the change rate parameter used to generate the modified stream data stream. Whether the determined percentage matches or is substantially similar to the percentage specified by the change rate can be used as an indication of the quality and/or effectiveness of the deduplication techniques used by storage deduplication server 102. For example, if the change rate is 5% and the amount of new data to store by storage deduplication server 102 is 5% of the size of the original data stream, then the deduplication techniques used by storage deduplication server 102 can be inferred to be effective. However, for example, if the change rate is 5% and the amount of new data to store by storage deduplication server 102 is 8% of the size of the original data stream, then the deduplication techniques used by storage deduplication server 102 can be inferred to be not very effective.

System 100 shows one example in which embodiments of data stream generation as described herein can be applied. Data stream generation may be applied in various other applications, as appropriate.

Figure 2:
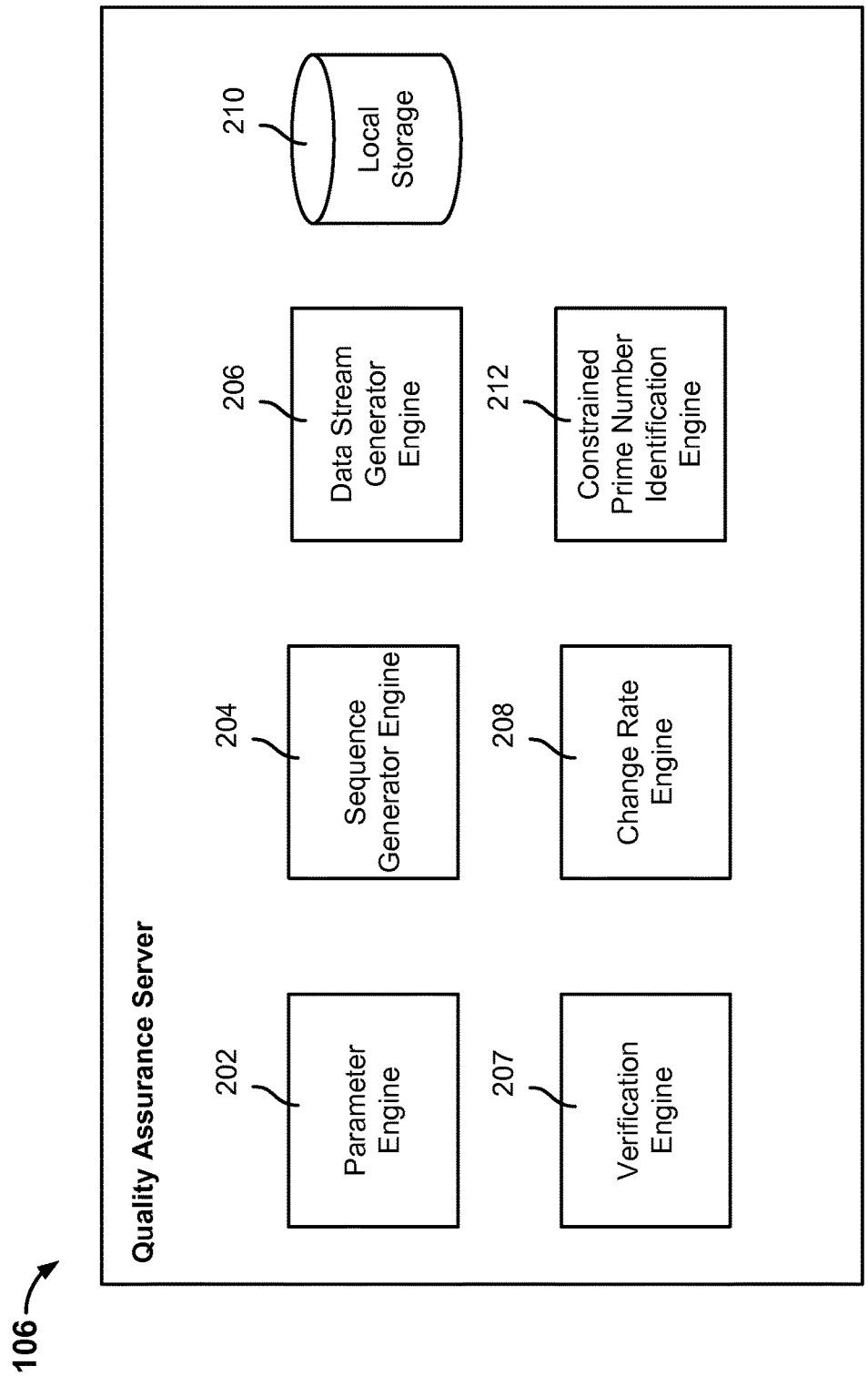
FIG. 2 is a diagram showing an embodiment of a quality assurance server.

FIG. 2 is a diagram showing an embodiment of a quality assurance server. In some embodiments, quality assurance server 106 of system 100 of FIG. 1 can be implemented using the example of FIG. 2. The quality assurance server of FIG. 2 includes parameter engine 202, sequence generator engine 204, data stream generator engine 206, constrained prime number identification engine 212, verification engine 207, change rate engine 208, and local storage 210. Each of parameter engine 202, sequence generator engine 204, data stream generator engine 206, constrained prime number identification engine 212, verification engine 207, and change rate engine 208 can be implemented using one or both of software and hardware. Local storage 210 comprises a local storage or a networked file system storage.

Parameter engine 202 is configured to provide parameters to use to generate a data stream. In various embodiments, parameters to use to generate a data stream include at least an initialization parameter and a revision parameter. In some embodiments, an initialization parameter is a seed value. In some embodiments, the seed value is any value selected from an address space that is represented by N bits (e.g., the address space comprising $(0, \ldots, 2^N-1)$). N can be selected to be any positive integer. For example, if N=5, then $2^{N-5}=32$ so the address space is $(0, \ldots, 31)$ and the initialization parameter can be selected to be any value from $(0, \ldots, 31)$. In some embodiments, a revision parameter is a revision value associated with a given "seed value" that uniquely maps to at least two prime numbers. In some embodiments, each of the at least two prime numbers is selected using the revision parameter from a set of prime numbers that is modified to exclude "2" and include "1" and is also constrained/bounded by $2^N-1$. In some embodiments, each of the at least two prime numbers is selected using the revision parameter from a set of constrained prime numbers (e.g., that is identified by constrained prime number identification engine 212, as described below). In some embodiments, another parameter provided by parameter engine 202 includes a change rate parameter. In some embodiments, the change rate parameter comprises a change rate value that is a specified percentage, proportion, or value in between 0 and 1. In some embodiments, a change rate is configured to be used (e.g., by change rate engine 208, as described below) to modify a data stream (e.g., generated based on the initialization parameter and the revision parameter) to generate a modified version of the data stream.

In some embodiments, one or more of the initialization parameter (the seed value), the revision parameter (the revision value), which maps to two or more prime numbers, and the change rate parameter are input by a user (e.g., associated with performing quality assurance). In some embodiments, one or more of the initialization parameter, the revision parameter, which maps to two or more prime numbers, and the change rate parameter are generated by a computer program.

In various embodiments, parameter engine 202 is configured to provide the initialization parameter and the revision parameter to sequence generator engine 204. In some embodiments, parameter engine 202 is configured to provide the change rate parameter and/or the initialization parameter and the revision parameter to change rate engine 208.

Constrained prime number identification engine 212 is configured to identify constrained prime numbers that are to be used to generate non-compressible sequences and data streams. In various embodiments, a "constrained" prime number refers to a prime number that meets a predetermined set of criteria and is therefore usable with the initialization parameter to generate a non-compressible sequence (e.g., by sequence generator engine 204). Two or more non-compressible sequences, each generated using the same initialization parameter and a corresponding constrained prime number, can be merged (e.g., interleaved) to generate a non-compressible data stream. Whereas prime numbers that do not meet the predetermined set of criteria ("unconstrained" prime numbers) can be used to generate sequences and such sequences can be merged together to form data streams, neither such sequences nor such data streams are associated with the property of being non-compressible. In other words, sequences and/or data streams generated with prime numbers that do not meet the predetermined set of criteria ("unconstrained" prime numbers) may be compressible.

In some embodiments, constrained prime number identification engine 212 is configured to iterate through a set of numbers and determine whether each number meets the predetermined set of criteria. Those numbers of the set that meet the predetermined set of criteria are included in an identified set of constrained prime numbers. In some embodiments, the set of numbers through which constrained prime number identification engine 212 iterates comprises an address space represented by N bits (e.g., the address space comprising $(0, \ldots, 2^N-1)$). N can be selected to be any positive integer.

As will be described in further detail below, the predetermined set of criteria that is used to identify constrained prime numbers requires that a constrained prime number 1) comprises a prime number from the set of prime numbers that is modified to exclude "2" and include "1," 2) includes component values that are each individually prime numbers from the set of prime numbers that is modified to exclude "2" and include "1," and 3) includes no duplicate component values. As such, the set of constrained prime numbers comprises a subset of all the prime numbers in the set of prime numbers that is modified to exclude "2" and include "1." In various embodiments, a "component value" of a number represents a subset of bits included in the number. For example, where a number is represented by N=32 bits, the 32-bit number p can be represented by a sequence of four bytes (each byte includes 8 bits), p3p2p1p0. In the example of a 32-bit number p that includes four bytes, each byte is referred to as a "component value."

Sequence generator engine 204 is configured to receive the initialization parameter and the revision parameter from parameter engine 202 to use to generate at least two sequences. In some embodiments, sequence generator engine 204 is configured to generate a sequence using each pair of the initialization parameter and a prime number selected using the revision parameter received from parameter engine 202. An example technique by which to generate each such sequence is described in more detail below. For example, if the revision parameter that was received from parameter engine 202 maps to two prime numbers, then sequence generator engine 204 will generate two corresponding sequences. Similarly, if the revision parameter that was received from parameter engine 202 maps to three prime numbers, then sequence generator engine 204 will generate three corresponding sequences. In some embodiments, if sequence generator engine 204 uses a constrained prime number to generate a sequence, then the sequence will be non-compressible. In some embodiments, if sequence generator engine 204 uses an unconstrained prime number (a prime number that is not from the set of constrained prime numbers) to generate a sequence, then the sequence may be compressible. In some embodiments, sequence generator engine 204 is configured to send the generated sequences and/or the corresponding given set of the initialization parameter and the revision parameter received from parameter engine 202 to be stored at local storage 210. In some embodiments, sequence generator engine 204 is configured to send the generated sequences and/or the corresponding given set of the initialization parameter and the revision parameter to data stream generator engine 206 for data stream generator engine 206 to use to generate a data stream.

Data stream generator engine 206 is configured to receive the at least two sequences and/or the corresponding given set of the initialization parameter and the revision parameter from sequence generator engine 204. In some embodiments, data stream generator engine 206 is configured to merge the at least two sequences into one new (merged) sequence that serves as the generated data stream. In some embodiments, if data stream generator engine 206 merges two sequences that were each generated using a constrained prime number, then the generated data stream will be non-compressible. In some embodiments, if data stream generator engine 206 merges two sequences that were each generated using an unconstrained prime number (a prime number that is not from the identified set of constrained prime numbers), then the generated data stream may be compressible. In some embodiments, the at least two sequences are merged into one sequence by creating a new merged sequence in which each value from the first sequence is followed by a corresponding value from each other sequence (i.e., the two sequences are interleaved). For example, of the two sequences that are to be merged to become the data stream, the first sequence comprises {S11, S12, S13, . . . } and the second sequence comprises {S21, S22, S23, . . . }. In this example, merging the first and second sequences will yield the following data stream {S11, S21, S12, S22, S13, S23, . . . }. In some embodiments, data stream generator engine 206 is configured to send the generated data stream and/or the corresponding given set of the initialization parameter and the revision parameter to store at local storage 210. In some embodiments, data stream generator engine 206 is configured to send the generated data stream and/or the corresponding given set of the initialization parameter and the revision parameter to change rate engine 208 for change rate engine 208 to generate a modified version of the data stream. In some embodiments, data stream generator engine 206 is configured to send the generated data stream to an external destination (e.g., storage deduplication server 102 of system 100 of FIG. 1).

Verification engine 207 is configured to receive a data stream and verify the data stream without another (e.g., a master) copy of the data stream or the parameters (e.g., the initialization parameter, the first prime number, and the second prime number) that were used to generate the data stream. For example, the data stream to be verified is data restored from a storage device (e.g., by storage deduplication server 102 of system 100 of FIG. 1). It may be desirable to verify the received data stream to determine that the values of the data stream correctly match the pattern of values associated with a merging (e.g., interleaving) of two (or more) sequences generated by an initialization parameter and (at least) two prime numbers even if none of the initialization parameter and two prime numbers are known/retrieved prior to the start of the verification process. In some embodiments, verification engine 207 is configured to use a portion of the data stream to deduce the values of the first prime number and the second prime number and then use the first prime number and the second prime number to verify at least a portion of the data stream. In various embodiments, a data stream can be verified in the same manner regardless if the data stream is compressible or non-compressible. For example, verifying the data stream includes determining whether the difference between every other value of the data stream alternately equals the first prime number and the second prime number. For example, if the data stream can be successfully verified, then the techniques used to restore the data stream from the storage device can be determined to be effective. Otherwise, if the data stream cannot be successfully verified, then the techniques used to restore the data stream from the storage device can be determined to be ineffective and reconfiguration is needed.

Change rate engine 208 is configured to receive the change rate parameter and/or the initialization parameter and the revision parameter from parameter engine 202 and the data stream from data stream generator engine 206. In some embodiments, change rate engine 208 is configured to generate a modified version of the data stream received from data stream generator engine 206. For example, change rate engine 208 can generate the modified version of the data stream based on modifying the received data stream in accordance with the change rate. In some embodiments, change rate engine 208 determines a block size based at least in part on data segmenting attributes associated with an external destination (e.g., storage deduplication server 102 of system 100 of FIG. 1). For example, the block size is determined as an average size of a data block in which the data stream is to be segmented at the external destination (e.g., storage deduplication server 102 of system 100 of FIG. 1). Then, change rate engine 208 determines data blocks of the determined block size within the data stream (e.g., by delineating which values of the series of values of the data stream comprise the first and last value of each data block). A portion of the data blocks within the data stream is modified such that the modified portion of the data blocks relative to the size of the entire data stream corresponds to the percentage specified by the change rate. For example, a data block is modified if at least one value included in the block is changed. In some embodiments, change rate engine 208 is configured to send the modified data stream and/or the corresponding given set of the initialization parameter, the revision parameter, and the change rate parameter to store at local storage 210. In some embodiments, change rate engine 208 is configured to send the modified data stream to an external destination (e.g., storage deduplication server 102 of system 100 of FIG. 1).

In some embodiments, change rate engine 208 is configured to receive different change rates from parameter engine 202 corresponding to the same original data stream (e.g., generated using a particular set of initialization and revision parameters). Change rate engine 208 can generate a modified version of the data stream corresponding to each change rate to generate various modified data streams, each differing from the original data stream by a percentage specified by a corresponding change rate.

Figure 3:
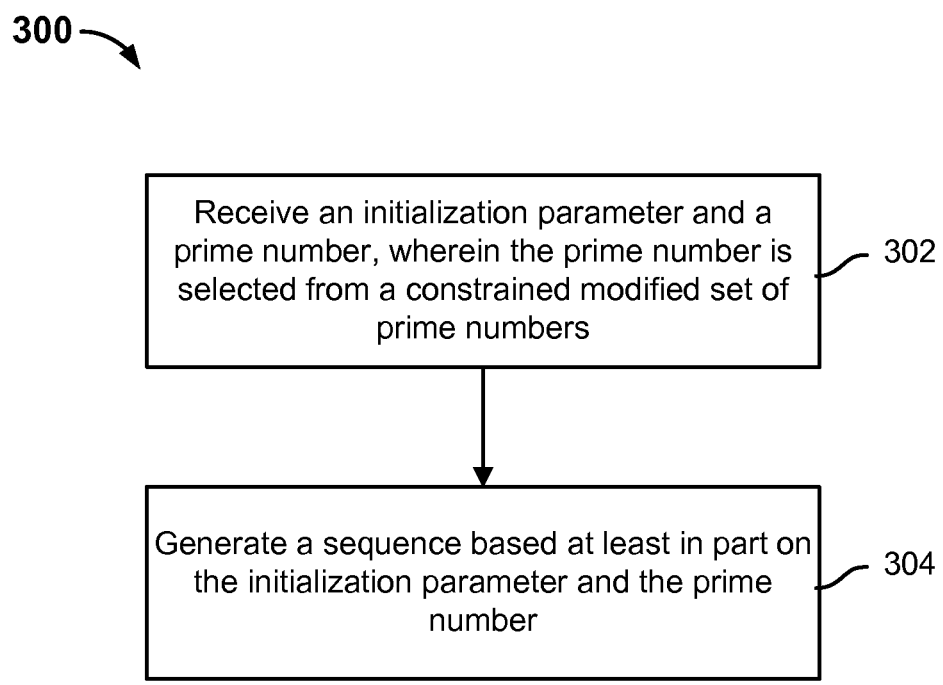
FIG. 3 is a flow diagram showing an embodiment of a process of generating a sequence using an initialization parameter and a prime number.

FIG. 3 is a flow diagram showing an embodiment of a process of generating a sequence using an initialization parameter and a prime number. In some embodiments, process 300 is implemented at system 100 of FIG. 1. Specifically, in some embodiments, process 300 is implemented at quality assurance server 106 of system 100 of FIG. 1.

Parameters may be provided to use to generate a data stream. Such parameters include an initialization parameter (e.g., a starting value or seed value) and a revision parameter (e.g., a revision value). The revision value maps to or is used to select at least two prime numbers from a constrained modified set of prime numbers. Process 300 can be performed to generate a sequence for each pair of the initialization parameter and a prime number (selected using the revision parameter). For example, if an initialization parameter (seed) and a revision parameter that maps to two prime numbers (prime1 and prime2) were received, then process 300 can be performed twice: once to generate a first sequence using the seed and prime1 and a second time to generate a second sequence using the seed and prime2. For example, the first and second sequences can be used to generate a data stream using another process (e.g., process 400 of FIG. 4, below).

At 302, an initialization parameter and a prime number are received, wherein the prime number is selected from a constrained modified set of prime numbers. For example, the initialization parameter can be received from a user input or from a computer program. In some embodiments, the initialization parameter comprises a seed value that is selected from an address space $(0, \ldots, 2^N-1)$, where N is selected to be any positive integer (e.g., 32). In some embodiments, the prime number is selected by/mapped to by a received revision parameter (e.g., a revision value associated with the seed value). The prime number is selected from a modified set of prime numbers that excludes "2" but includes "1" and that is bounded/constrained by $2^N-1$.

At 304, a sequence is generated based at least in part on the initialization parameter and the prime number. In some embodiments, the sequence is of length $2^N$. In various embodiments, the first value of the sequence is the initialization parameter (starting value or seed value). Each subsequent value of the sequence is determined as a function of the prior value in the sequence, the prime number, and $2^N$. For example, each subsequent value of the sequence is determined as the sum of the prior value in the sequence and the prime number and then the sum modulo $2^N$. In some embodiments, sequences generated using the same initialization parameter but different prime numbers will not have any blocks of values (e.g., 8 KiB in size in size) in common with each other.

An example of generating a sequence using an initialization parameter (seed value) and a prime number is described below:

Below are some definitions that will be used by the following examples:
 prime: Any natural prime number
 Prime: Set of natural prime numbers (2, 3, 5, 7, . . . )
 PrimeM: A set of prime numbers that excludes 2 (even though "2" is considered a prime number) from the set Prime and includes 1 (even though "1" is not considered a prime number)
 primeM: A member of the set PrimeM
 PrimeN: Set of prime numbers that are less than $2^N-1$
 PrimeMN: Set of primeM numbers that are less than $2^N-1$
 Example sets of prime numbers:
 Prime5=[2, 3, 5, 7, 11, 13, 17, 19, 23, 29, 31]
 PrimeM5=[1, 3, 5, 7, 11, 13, 17, 19, 23, 29, 31]
 Prime6=[2, 3, 5, 7, 11, 13, 17, 19, 23, 29, 31, 37, 41, 43, 47, 53, 59, 61]
 PrimeM6=[1, 3, 5, 7, 11, 13, 17, 19, 23, 29, 31, 37, 41, 43, 47, 53, 59, 61]
 Regarding the set PrimeMN
 For a given address space $(0, \ldots, 2^N-1)$ and a given a number s (seed value) in the chosen address space, if any specific number from the PrimeMN set is added to seed value s (with modulo-$2^N$), then the resulting sequence will repeat only after all numbers in the address space have been visited. This is not true for the set PrimeN as this property will not hold for the prime number 2. However, this property also holds for the number 1. That is the reason for excluding 2 and including 1 to the set PrimeMN. In some embodiments, set PrimeMN is sometimes referred to as a "constrained modified set of prime numbers."
 Below is an example of generating a sequence:
 Address space is N=5 bits (so the address space includes (0, . . . , 31)),
 PrimeM5 is set [1, 3, 5, 7, 11, 13, 17, 19, 23, 29, 31],
 The selected seed value (e.g., the initialization parameter) (which is any number between 0 . . . 31 inclusive) is 14,
 The selected primeM5 is 3.
 The resulting sequence S(N, seed, prime) will be as follows:
 S(5, 14, 3)=
 14, 17, 20, 23, 26, 29, 0, 3, 6, 9, 12, 15, 18, 21, 24, 27, 30, 1, 4, 7, 10, 13, 16, 19, 22, 25, 28, 31, 2, 5, 8, 11
 The following table, Table 1, illustrates that the values of sequence S(5, 14, 3) are obtained by using the seed value (14) as the first value of the sequence and obtaining each subsequent value in the sequence by incrementing the previous value in the sequence by the prime number (3) with modulo $2^{N-5}=32$:

TABLE 1

|    | Start | +3 | +3 | +3 | +3 | +3 | +3 | +3 |      |
|----|-------|----|----|----|----|----|----|----|------|
| +3 | 14    | 17 | 20 | 23 | 26 | 29 | 0  | 3  | Next |
| +3 | 6     | 9  | 12 | 15 | 18 | 21 | 24 | 27 | Next |
| +3 | 30    | 1  | 4  | 7  | 10 | 13 | 16 | 19 | Next |
| +3 | 22    | 25 | 28 | 31 | 2  | 5  | 8  | 11 | End  |

This holds true for any selected member from the set PrimeM5.
 In the above example, if the seed value was changed to 10 then the resulting sequence will be as follows:
 S(5, 10, 3)=
 10, 13, 16, 19, 22, 25, 28, 31, 2, 5, 8, 11, 14, 17, 20, 23, 26, 29, 0, 3, 6, 9, 12, 15, 18, 21, 24, 27, 30, 1, 4, 7
 The following table, Table 2, illustrates that the values of sequence S(5, 10, 3) are obtained by using the seed value (10) as the first value of the sequence and obtaining each subsequent value in the sequence by incrementing the previous value in the sequence by the prime number (3) with modulo $2^{N-5}=32$:

TABLE 2

|    | Start | +3 | +3 | +3 | +3 | +3 | +3 | +3 |      |
|----|-------|----|----|----|----|----|----|----|------|
| +3 | 10    | 13 | 16 | 19 | 22 | 25 | 28 | 31 | Next |
| +3 | 2     | 5  | 8  | 11 | 14 | 17 | 20 | 23 | Next |
| +3 | 26    | 29 | 0  | 3  | 6  | 9  | 12 | 15 | Next |
| +3 | 18    | 21 | 24 | 27 | 30 | 1  | 4  | 7  | End  |

The sequences S(5, 14, 3) and S(5, 10, 3) are basically the same except for the rotation in the positions of their respective values. The values of sequence S(5, 14, 3) can be found starting from value 14 of sequence S(5, 10, 3), which is underlined in Table 2, above.
 However, for example, if each value were represented by 32 bits, then if a different prime number is selected, then the resulting sequence will not have any blocks (e.g., blocks that are 8 KiB in size) of values in common with any other sequence.
 In another example where the seed value is 14 and the selected primeM5 is 5:
 S(5, 14, 5)=
 14, 19, 24, 29, 2, 7, 12, 17, 22, 27, 0, 5, 10, 15, 20, 25, 30, 3, 8, 13, 18, 23, 28, 1, 6, 11, 16, 21, 26, 31, 4, 9
 The following table, Table 3, illustrates that the values of sequence S(5, 14, 5) are obtained by setting the first value to the seed value (14) and obtaining each subsequent value in the sequence by incrementing the previous value in the sequence by the prime number (5) with modulo $2^{N-5}=32$:

TABLE 3

|    | Start | +5 | +5 | +5 | +5 | +5 | +5 | +5 |      |
|----|-------|----|----|----|----|----|----|----|------|
| +5 | 14    | 19 | 24 | 29 | 2  | 7  | 12 | 17 | Next |
| +5 | 22    | 27 | 0  | 5  | 10 | 15 | 20 | 25 | Next |
| +5 | 30    | 3  | 8  | 13 | 18 | 23 | 28 | 1  | Next |
| +5 | 6     | 11 | 16 | 21 | 26 | 31 | 4  | 9  | End  |

In the above example, if the seed value was changed to 10 then the resulting sequence will be as follows:
 S(5, 10, 5)=
 10, 15, 20, 25, 30, 3, 8, 13, 18, 23, 28, 1, 6, 11, 16, 21, 26, 31, 4, 9, 14, 19, 24, 29, 2, 7, 12, 17, 22, 27, 0, 5
 The following table, Table 4, illustrates that the values of sequence S(5, 10, 5) are obtained by setting the first value to the seed value (10) and obtaining each subsequent value in the sequence by incrementing the previous value in the sequence by the prime number (5) with modulo $2^{N-5}=32$:

TABLE 4

|    | Start | +5 | +5 | +5 | +5 | +5 | +5 | +5 |      |
|----|-------|----|----|----|----|----|----|----|------|
| +5 | 10    | 15 | 20 | 25 | 30 | 3  | 8  | 13 | Next |
| +5 | 18    | 23 | 28 | 1  | 6  | 11 | 16 | 21 | Next |
| +5 | 26    | 31 | 4  | 9  | 14 | 19 | 24 | 29 | Next |
| +5 | 2     | 7  | 12 | 17 | 22 | 27 | 0  | 5  | End  |

The sequences S(5, 14, 5) and S(5, 10, 5) are basically the same except for the rotation in the positions of their respective values. The values of sequence S(5, 14, 5) can be found starting from value 14 of sequence S(5, 10, 5), which is underlined in Table 4.
 However, sequence S(5, 14, 5) does not have any (e.g., 8 KiB) blocks of (e.g., 32-bit) values in common with the sequence S(5, 14, 3) or any other sequence S(5, seed, prime) when the prime is any number other than 5.

The technique described above to generate a sequence is an example and other techniques may be used to generate a sequence using a seed value and a prime number from a constrained modified set of prime numbers.

Figure 4:
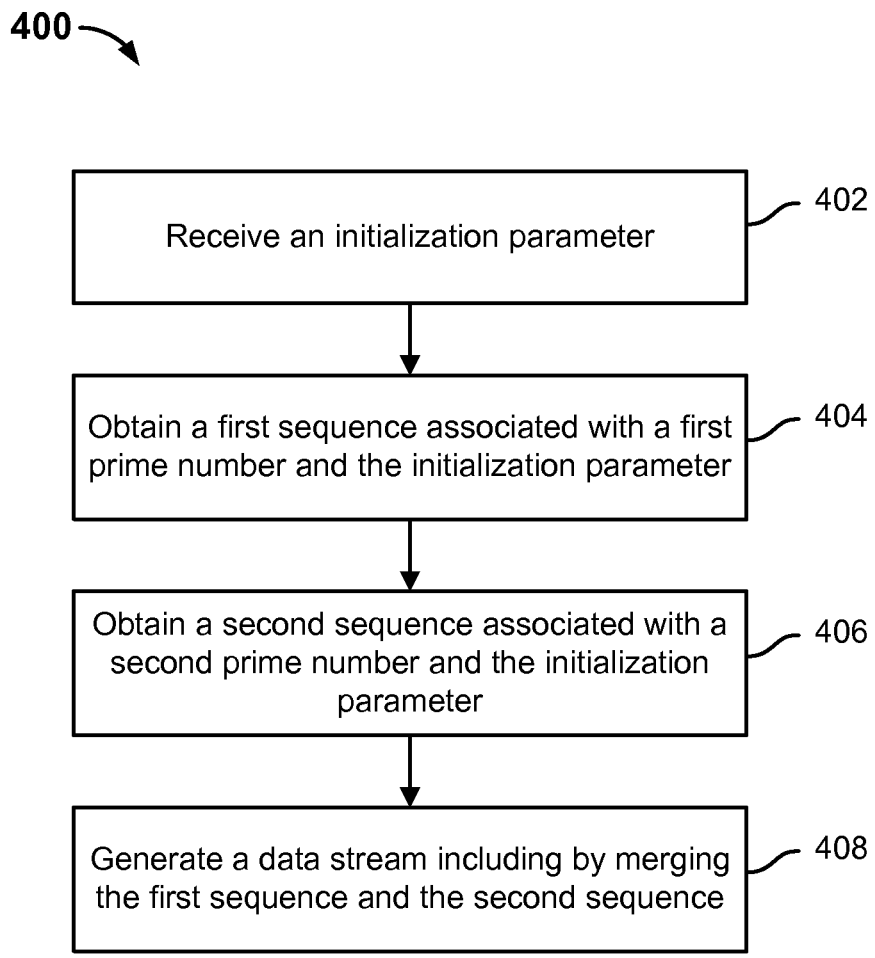
FIG. 4 is a flow diagram showing an embodiment of a process of generating a data stream using prime numbers.

FIG. 4 is a flow diagram showing an embodiment of a process of generating a data stream using prime numbers. In some embodiments, process 400 is implemented at system 100 of FIG. 1. Specifically, in some embodiments, process 400 is implemented at quality assurance server 106 of system 100 of FIG. 1.

At 402, an initialization parameter is received. For example, the initialization parameter can be received from a user input or from a computer program. In some embodiments, the initialization parameter comprises a seed value that is selected from an address space $(0, \ldots, 2^N-1)$, where N is selected to be any positive integer (e.g., 32).

At 404, a first sequence associated with a first prime number and the initialization parameter is obtained. In some embodiments, each of two prime numbers is selected from a modified set of prime numbers that excludes "2" but includes "1" and that is bounded/constrained by $2^N-1$. The two prime numbers may comprise the same prime number or different prime numbers. In some embodiments, the two prime numbers are selected based on a received revision parameter comprising a revision value. In some embodiments, a first sequence is generated using the initialization parameter and one of the two prime numbers using a process such as process 300 of FIG. 3. In some embodiments, the first sequence is received from another entity.

At 406, a second sequence associated with a second prime number and the initialization parameter is obtained. In some embodiments, a second sequence is generated using the initialization parameter and the prime number of the two prime numbers that was not used to generate the first sequence of step 404. In some embodiments, the second sequence is generated using the initialization parameter and the prime number of the two prime numbers that was not used to generate the first sequence using a process such as process 300 of FIG. 3. In some embodiments, the second sequence is received from another entity.

At 408, a data stream is generated including by merging the first sequence and the second sequence. In some embodiments, merging the first sequence and the second sequence includes interleaving the first and second sequences into a new sequence that is referred to as the data stream. In some embodiments, the data stream includes a sequence of alternating values from the first and second sequences. For example, if two sequences are to be merged to become the data stream, and the first sequence comprises {S11, S12, S13, . . . } and the second sequence comprises {S21, S22, S23, . . . }, then merging the first and second sequences will yield the following data stream {S11, S21, S12, S22, S13, S23, . . . }. In some embodiments, the data stream is not deduplicatable.

In some embodiments, more than two prime numbers from the constrained modified set of prime numbers can be selected based on the revision value and the data stream can be generated by merging more than two sequences, each of which is generated using the initialization parameter and a respective prime number.

An example of generating a data stream using an initialization parameter (seed value) and at least two prime numbers is described below:

Two or more S sequences, as described above, can be used to build a new merged sequence (data stream).

For example:

MS2 is a merged sequence (data stream) of two S sequences, and has the following four parameters:

N Address space $(0, \ldots, 2^N-1)$, seed The seed value (e.g., the initialization parameter) (the first value) of each of sequence #1 and sequence #2, prime1 A first prime number selected from set PrimeMN for sequence S(N, seed, prime1), prime2 A second prime number selected from set PrimeMN for sequence S(N, seed, prime2).

$$MS2(N, seed, prime1, prime2) = S(N, seed, prime1) + S(N, seed, prime2)$$

Similarly, MS3 is a merged sequence (data stream) of three S sequences, sequence #1, sequence #2, and sequence #3, that has five parameters:

N Address space $(0, \ldots, 2^N-1)$, seed The seed value (e.g., the initialization parameter) (the first value) of each of sequence #1 and sequence #2, prime1 A first prime number selected from set PrimeMN for sequence S(N, seed, prime1), prime2 A second prime number selected from set PrimeMN for sequence S(N, seed, prime2), prime3 A third prime number selected from set PrimeMN for sequence S(N, seed, prime3).

MS3 (N, seed, prime1, prime2, prime3)=

$$S(N, seed, prime1) + S(N, seed, prime2) + S(N, seed, prime3)$$

For example, given N=5, seed=14, prime1=3 and prime2=5, the sequence MS2 (5, 14, 3, 5) (data stream) is produced by alternately inserting one value from each individual sequence S(5, 14, 3) and S(5, 14, 5) into a merged sequence.

MS2(5, 14, 3, 5)=

14, 14, 17, 19, 20, 24, 23, 29, 26, 2, 29, 7, 0, 12, 3, 17, 6, 22, 9, 27, 12, 0, 15, 5, 18, 10, 21, 15, 24, 20, 27, 25, 30, 30, 1, 3, 4, 8, 7, 13, 10, 18, 13, 23, 16, 28, 19, 1, 22, 6, 25, 11, 28, 16, 31, 21, 2, 26, 5, 31, 8, 4, 11, 9

The following table, Table 5, illustrates that the values of data stream MS2(5, 14, 3, 5) are obtained by alternately inserting a value from sequence S(5, 14, 3) and a value from sequence S(5, 14, 5) (the values of each sequence are individually displayed with Table 1 and Table 3, above) into a merged sequence:

TABLE 5

| Start | Start | +3 | | +3 | | +3 | |
|---|---|---|---|---|---|---|---|
| | | | +5 | | +5 | | +5 |
| 14 | 14 | 17 | 19 | 20 | 24 | 23 | 29 |
| 26 | 2 | 29 | 7 | 0 | 12 | 3 | 17 |
| 6 | 22 | 9 | 27 | 12 | 0 | 15 | 5 |
| 18 | 10 | 21 | 15 | 24 | 20 | 27 | 25 |
| 30 | 30 | 1 | 3 | 4 | 8 | 7 | 13 |
| 10 | 18 | 13 | 23 | 16 | 28 | 19 | 1 |
| 22 | 6 | 25 | 11 | 28 | 16 | 31 | 21 |
| 2 | 26 | 5 | 31 | 8 | 4 | 11 | 9 |

Note in Table 5 above, the values from sequence S(5, 14, 5) are shown in italics while the values from sequence S(5, 14, 3) are not shown in italics.

In another example, given N=5, seed=10, prime1=3 and prime2=5, the sequence MS2(5, 10, 3, 5) is produced by alternately inserting one value from each of individual sequences S(5, 10, 3) and S(5, 10, 5) into a merged sequence.

MS2(5, 10, 3, 5)=

10, 10, 13, 15, 16, 20, 19, 25, 22, 30, 25, 3, 28, 8, 31, 13, 2, 18, 5, 23, 8, 28, 11, 1, 14, 6, 17, 11, 20, 16, 23, 21, 26, 26, 29, 31, 0, 4, 3, 9, 6, 14, 9, 19, 12, 24, 15, 29, 18, 2, 21, 7, 24, 12, 27, 17, 30, 22, 1, 27, 4, 0, 7, 5

The following table, Table 6, illustrates that the values of data stream MS2(5, 10, 3, 5) are obtained by alternately inserting a value from sequence S(5, 10, 3) and a value from sequence S(5, 10, 5) (the values of each sequence are individually displayed with Table 2 and Table 4, above) into a merged sequence:

TABLE 6

| Start | Start | +3 +5 | +3 | +3 +5 | | +3 +5 |
|---|---|---|---|---|---|---|
| 10 | 10 | 13 | 15 | 16 | 20 | 19 | 25 |
| 22 | 30 | 25 | 3 | 28 | 8 | 31 | 13 |
| 2 | 18 | 5 | 23 | 8 | 28 | 11 | 1 |
| 14 | 6 | 17 | 11 | 20 | 16 | 23 | 21 |
| 26 | 26 | 29 | 31 | 0 | 4 | 3 | 9 |
| 6 | 14 | 9 | 19 | 12 | 24 | 15 | 29 |
| 18 | 2 | 21 | 7 | 24 | 12 | 27 | 17 |
| 30 | 22 | 1 | 27 | 4 | 0 | 7 | 5 |

Note in Table 6 above, the values from sequence S(5, 10, 5) are shown in italics while the values from sequence S(5, 10, 3) are not shown in italics.

It was shown above that sequences S(N, seed1, prime) and S(N, seed2, prime) included the same values except for the rotation in the positions of their respective values. This does not hold true for the data stream, MS2. As shown with the two examples of data stream MS2, each seed value produces an entirely new data stream. Note that the pattern/consecutive values of 14 and 14 appear only in data stream MS2(5, 14, 3, 5) and not in merged sequence data stream MS2(5, 10, 3, 5).

Using the merging of two sequences as described above, $2^N$ data streams (one for each seed value in the address space) can be generated for any given pair of prime numbers (prime1, prime2). Each data stream determined from merging two sequences has $2*2^N$ values.

Assume that N=32 (the most often used size in bits of an unsigned integer) then the length of the data stream MS2(32, seed, prime1, prime2) will be as follows:

$2*(2^{32})$ unsigned integers of 32 bit size or $4*2*(2^{32})$ bytes≈32 gigabytes (GiB).

As such, a data stream MS2(32, seed, prime1, prime2) will repeat after exactly 32 GiB. Put another way, each seed value will provide a new data stream and if N=32, then $2^{32}$ seed values are available to use to build approximately 4 billion data streams where each data stream will be exactly 32 GiB long.

In some embodiments, each revision value (e.g., the revision parameter) with respect to a given seed value uniquely maps to a first prime number of a fixed value and a second prime number that is associated with a position within the constrained modified set of prime numbers that matches the revision value. For example, each pair of prime numbers can be represented by (prime1, prime2). For example, given seed=10; revision 0 can map to the pair of prime1=3 and prime2=1, revision 1 can map to the pair of prime1=3 and prime2=3, revision 2 can map to the pair of prime1=3 and prime2=5, revision 4 can map to the pair of prime1=3 and prime2=7, and so forth.

In some embodiments, each revision value (which maps to a different pair of prime numbers (prime1, prime2)) for a given seed value can be used to generate a data stream that is distinct from any data stream that is generated from the same seed value and any other revision value. In some embodiments, each revision value (which maps to a different pair of prime numbers (prime1, prime2)) for a given seed value can be used to generate a data stream that is distinct from any data stream that is generated from any other seed value and revision value.

Because for a given seed value, merged sequence data stream MS2(32, seed, prime1, prime2) will repeat after approximately 32 GiB, if the desired application of the data stream requires a data stream to be longer than 32 GiB, then one or more enhancements can be performed to increase the length of the data stream.

Below are some example enhancements that can be performed to increase the length of a data stream:

Enhancement #1:

MS2 comprises two simple sequences S(N, seed, prime1) and S(N, seed, prime2).

This enhancement automatically alters the prime used for the first sequence (prime1) to a new value when the repetition is about to occur.

This enhancement allows for a very large sequence to be built as long as we have a prime number available.

Enhancement #2:

Let each value of a sequence be represented by 64 bits. Therefore, let N=64 (instead of N=32). Where N=64, a generated data stream will not repeat for approximately $2*(2^{N=64})$ unsigned integers of 64 bit size or $8*2*(2^{64})$ bytes≈256 exabytes.

Enhancement #3:

More than two sequences are merged together to generate a data stream.

For example:

A merged sequence data stream that includes three sequences can be represented as MS3(N, seed, prime1, prime2, prime3).

Depending on the merging mode utilized, this can produce extremely long sequences.

The technique described above to generate a data stream is an example and other techniques may be used to generate a data stream using a seed value and at least two prime numbers selected from a constrained modified set of prime numbers.

In some embodiments, as described above, each seed value can be used to generate data streams that are distinct from data streams generated with any other seed values and a given seed value with a revision value can be used to generate a data stream that is distinct from a data stream generated with the given seed value and any other revision value. Therefore, in certain applications, different seed values and/or revision values can be assigned to different users involved in performing quality assurance such that each group of users and/each user in a group can perform testing on their respective data stream (generated with a given seed value and revision value) without impacting the testing performed by any other user. For example, each group of users (e.g., in a quality assurance team) can be assigned a seed value and each user within a group can be assigned a revision value with respect to that group's assigned seed value so each user within the group can use their respectively assigned seed value and revision value to generate a data stream distinct from each other's.

In some embodiments, a data stream comprising the merging (e.g., interleaving) of two (or more) sequences can be generated in memory using a small memory footprint. Below is pseudocode that describes one example implementation of a data stream generation engine as described in some embodiments:

The following four variables can be created and stored in memory:
prime1
prime2
accumulator1
accumulator2

The inputs to the data stream generation engine are seed (e.g., the initialization parameter), prime1 (e.g., a first prime number), and prime2 (e.g., a second prime number). The variables are initialized using the input parameters:

Set accumulator1=seed

Set accumulator2=seed

Set accumulator1=accumulator1+prime1

Set accumulator2=accumulator2+prime2

As will be shown in further detail below, accumulator1 represents the values from a first sequence generated using seed and prime1 and accumulator2 represents the values from a second sequence generated using seed and prime2.

The values of the data stream are generated by alternately outputting a value from each of the two sequences. As such, in the pseudocode below, the data stream is generated by alternately outputting a value from each of accumulator1 and accumulator2 and modifying both accumulator1 and accumulator2 after outputting from accumulator1 and accumulator2. The below pseudocode for outputting the values of the data stream can be repeated until a stop condition is met (e.g., the stop condition can be that either of the output of accumulator1 or accumulator2 is the same as a value previously output by accumulator1 or accumulator2, respectively, which indicates that the values of the data stream are starting to repeat).
Output accumulator1
Output accumulator2

Set accumulator1=accumulator1+prime1

Set accumulator2=accumulator2+prime2

The data stream generation as described in the above example implementation is extremely fast because only two ADD operations are used.

Embodiments of verifying a data stream are described herein. In various embodiments, a data stream generated in accordance with the embodiments described above can be verified without another copy (e.g., a master copy) of the data stream and without the parameters that were used to generate the data stream (e.g., the initialization parameter, a first prime number, a second prime number). A verification capability that does not require another copy (e.g., a master copy) of the data stream for comparison purposes is invaluable for proving the correctness of a storage system. For example, a verification capability that does not require another copy of the data stream for comparison purposes (or even the parameters that were used to generate the data stream) can free up storage space that would have otherwise been used to store the other copy of the data stream and/or the parameters. In various embodiments, verification can be performed on any part of a data stream. A self-verification capability is valuable for proving the store and restore capabilities of a storage system.

A data stream may be verified for correctness in various different applications. For example, to verify a data stream for correctness is to confirm that the data stream is actually the merging (e.g., interleaving) of two sequences (e.g., each of which is generated using a process such as process 300 of FIG. 3, above). In a first example application, data stored at a storage device associated with a data stream is restored and the restored version of the data stream can be verified to test the effectiveness of storing and/or restoring techniques. In a second example application, a newly generated data stream can be verified to confirm that the data stream had been correctly generated.

Figure 5:
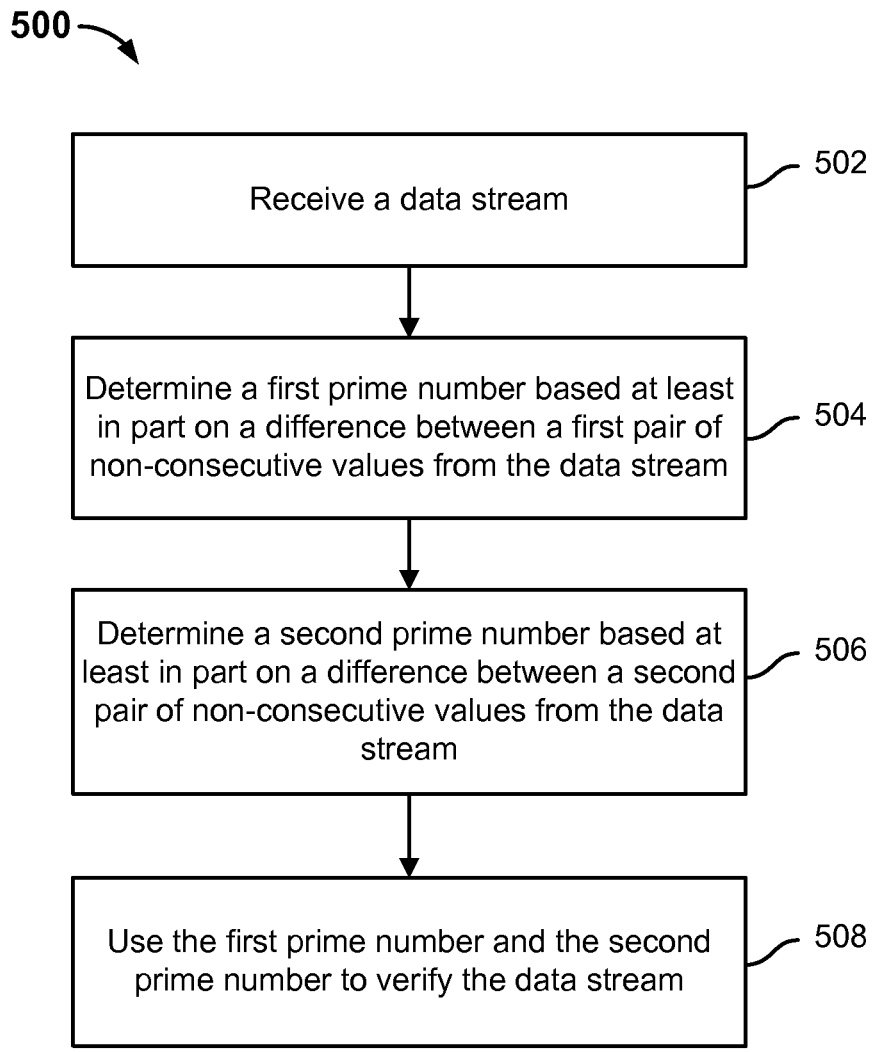
FIG. 5 is a flow diagram showing an embodiment of a process of verifying a data stream.

FIG. 5 is a flow diagram showing an embodiment of a process of verifying a data stream. In some embodiments, process 500 is implemented at system 100 of FIG. 1. Specifically, in some embodiments, process 500 is implemented at quality assurance server 106 of system 100 of FIG. 1.

In some embodiments, process 500 describes an example of performing verification on a data stream that was generated by merging (e.g., interleaving) two sequences (e.g., using a process such as process 400 of FIG. 4). In some embodiments, process 500 describes an example of performing verification on a non-compressible data stream that was generated by merging (e.g., interleaving) two non-compressible sequences (e.g., using a process such as process 1200 of FIG. 12, below). As will be described in further detail below, process 500 deduces the two (e.g., unconstrained or constrained) prime numbers associated with the respective two sequences and uses these two prime numbers to verify the (e.g., compressible or non-compressible) data stream.

At 502, a data stream is received. For example, the data stream is restored from data stored at a storage device (e.g., by a quality assurance server such as quality assurance server 106 of system 100 of FIG. 1). In another example, the data stream is recently generated (e.g., by a quality assurance server such as quality assurance server 106 of system 100 of FIG. 1).

At 504, a first prime number is determined based at least in part on a difference between a first pair of non-consecutive values from the data stream. Each of the two sequences that were interleaved to generate the data stream is based on a prime number and the initialization parameter (e.g., seed value). Each of the two sequences initially starts with the seed value plus the prime number associated with that sequence and each subsequent value is generated by a prior value plus the prime number associated with that sequence. As such, the difference between every other value of the data stream should equal one of the two prime numbers associated with the sequences that were interleaved to form the data stream. For example, a first prime number can be deduced as the difference between a pair of values of the data stream that are separated by a value (e.g., the Xth and (X+2)th values of the data stream).

At 506, a second prime number is determined based at least in part on a difference between a second pair of non-consecutive values from the data stream. Similarly, a second prime number can be deduced as the difference between another pair of values of the data streams that are separated by a value (e.g., the (X+1)th and (X+3)th values of the data stream).

At 508, the first prime number and the second prime number are used to verify the data stream. Once the first and second prime numbers have been deduced, the data stream (or any portion thereof) can be verified based on determining whether the difference between pairs of values separated by a value of the data stream matches one of the first and second prime numbers. In some embodiments, while the initialization parameter comprising a seed value was used to generate the data stream, the seed value is not used in verifying the data stream and therefore does not need to be determined.

In some embodiments, a data stream consists of two interleaved sequences each based upon their own prime number resulting in a data stream that is not deduplicatable. For example, each sequence starts with the seed value (seed) plus their individual prime (prime1 or prime2) and subsequent values are generated by the prior value plus their individual prime. Therefore, the values in a data stream in some embodiments are (where value[X] represents the value in position X in the data stream):

seed (in hexadecimal)=0E00000E, prime1 (in hexadecimal)=0103050D, prime2 (in hexadecimal)=0305070B value1=seed+prime1 0F03051B=0E00000E+0103050D value2=seed+prime2 11050719=0E00000E+0305070B value3=value1+prime1 10060A28=0F03051B+0103050D value4=value2+prime2 140A0E24=11050719+0305070B value5=value3+prime1 11090F35=10060A28+0103050D value6=value4+prime2 170F152F=140A0E24+0305070B value7=value5+prime1 120C1442=11090F35+0103050D value8=value6+prime2 1A141C3A=170F152F+0305070B In this data stream, the first value and every other value are from the sequence generated with prime1 (the values above written in bold) and the second value and every other value are from the sequence with prime2 (the values written not in bold).

The difference of the Xth and (X+2)th values is either prime1 if the Xth value was from the first sequence or prime2 if the Xth value was from the second sequence.

seed (in hexadecimal)=0E00000E, prime1 (in hexadecimal)=0103050D, prime2 (in hexadecimal)=0305070B value3−value1=prime1 10060A28−0F03051B=0103050D value4−value2=prime2 140A0E24−11050719=0305070B value5−value3=prime1 11090F35−10060A28=0103050D value6−value4=prime2 170F152F−140A0E24=0305070B value7−value5=prime1 120C1442−11090F35=0103050D value8−value6=prime2 1A141C3A−170F152F=0305070B As shown above, four consecutive values of the data stream are enough to determine the two prime numbers (prime1 and prime2). Once the values of prime1 and prime2 are deduced, the correctness of the entire data stream can be established as all subsequent values must be equal to the prior value plus an alternating prime1 and prime2 value.

For verification, the input can be at least a portion from the start or middle of the data stream. In various embodiments, values for prime1 and prime2 can be deduced and the entire data stream verified as long as a minimum of four values of the data stream are made available.

The following is pseudocode that shows the example steps that will cause the portion of the data stream comprising value3, value4, value5, value6, value7 and value8 to be verified. Note: The data stream started with value1 but the data stream verification is being attempted from value3.

Input: value3
save value3 in accumulator1
Input: value4
save value4 in accumulator2
Input: value5
save difference of value5 and accumulator1 in prime)
save value5 in accumulator1
Input: value6
save difference of value6 and accumulator2 in prime2
save value6 in accumulator2
At this point, the prime1 and prime2 values are deduced.
Input: value?
ensure that the difference of value7 and accumulator1 equals prime1
save value7 in accumulator1
Input: value8
ensure that the difference of value8 and accumulator2 equals prime2
save value8 in accumulator2

As shown above, in some embodiments, prime1 and prime2 associated with a data stream to be verified can be derived just from four (e.g., initial) values of the data stream. In some embodiments, the seed value can also be derived using the (e.g., initial) four values and the values for the prime1 and prime2. In various embodiments, the seed value is not required for verification but can be deduced and reported (e.g., to enable the regeneration of the exact same data stream if desired).

If prime1 is repeatedly added to the first value of the data stream and prime2 is repeatedly added to the second value of the data stream and when both the accumulators are equal, the seed is found.

Since the initial value of each interleaved sequence is value=seed+prime and all succeeding values are value=value+prime, given enough additions of prime to value, value will at some point be equal to seed due to modulo arithmetic wrap around.

Therefore, the seed can be deduced by repeatedly performing the following additions, described in pseudocode, as required:

value_from_prime1_sequence=value_from_prime1_sequence+prime1
value_from_prime2_sequence=value_from_prime2_sequence+prime2

Until value_from_prime1_sequence=value_from_prime2_sequence. The two values will be equal only when they are both equal to the seed value, seed.

In some embodiments, a data stream comprising the merging (e.g., interleaving) of two (or more) sequences can be verified in memory using a small memory footprint. Below is pseudocode that describes one example implementation of a data stream verification engine as described in some embodiments:

The following six variables can be created and stored in memory:
prime1
prime2
accumulator1
accumulator2
next_step=Initialization#1
result=true In step Initialization#1, accumulator1 is initialized by inputting a first value of the data stream to be used in the verification process:
  Set accumulator1=value
  Set next_step=Initialization#2
In step Initialization#2, accumulator2 is initialized by inputting a next value of the data stream:
  Set accumulator2=value
  Set next_step=Initialization#3
In step Initialization#3, the difference between a next value of the data stream and accumulator1 is set as prime1:

Set prime1=value−accumulator1

Set accumulator1=value
  Set next_step=Initialization#4
In step Initialization#4, the difference between a next value of the data stream and accumulator2 is set as prime2:

Set prime2=value−accumulator2

Set accumulator2=value
  Set next step=Verify#1
In step Verify#1, it is checked whether the difference between the next value of the data stream and accumulator1 equals prime1:
  if (value−accumulator1) does not equal prime1 then set result to false
  Set accumulator1=value
  Set next step as Verify#2
In step Verify#2, it is checked whether the difference between the next value of the data stream and accumulator2 equals prime2:
  if (value−accumulator2) does not equal prime2 then set result to false
  Set accumulator2=value
  Set next step as Verify#1
Verify#1 and Verify#2 are alternately performed until a stop condition is met (e.g., the end of the data stream has been reached). If result is ever set to false, then the data stream cannot be verified to be correct. However, if result remains set to true after the stop condition is met, then the data stream is verified to be correct.

The data stream verification as described in the above example implementation is extremely fast because only a few subtraction operations are used.

Embodiments of generating data that is not compressible are described herein. A data stream used for testing may be first compressed. If the data stream is compressible, then the size of the compressed data set (plus the overhead data associated with compression) will most likely be smaller than the size of the original data stream. However, in certain testing scenarios, it may be desirable to preserve the (approximate) size of the data stream even if the data stream undergoes a compression process so as to better observe the effectiveness of a separate process that is applied to the data stream. Given a method to generate a data stream that is not compressible, other methods can then be used to generate a data stream with a specific level of compression. In certain testing scenarios the specification of a specific compression level is very desirable.

For example, a 2 GiB data stream may be compressed into a 1.5 GiB data stream prior to a test deduplication process. In the test deduplication process, the test data stream is to be compared against previously stored data of which 0.5 GiB is known to be common to the uncompressed 2 GiB data stream. However, if the compressed 1.5 GiB data stream is compared to the previously stored data in the deduplication process and 0.4 GiB of the compressed 1.5 GiB data stream is determined by the deduplication process to be common to the previously stored data, then because of the effect of compression on the tested data stream, it is unclear whether the 0.1 GiB discrepancy in the deduplication is a result of a fault in the deduplication process or the compression technique. As such, in some embodiments, a data stream is generated to be non-compressible so that a particular testing technique (e.g., of deduplication) with the data stream can be isolated from any compression techniques that may be applied to the data stream.

In some embodiments, deduplication systems deal with data in "blocks." A deduplication system can use either fixed or variable sized blocks. An example of variable block sizes is block sizes ranging from 4 KiB to 12 KiB with an average size of 8 KiB. The data streams can be segmented at certain natural boundaries and variable sized blocks are created. The blocks that are duplicates (of previously stored data) are detected and only the unique blocks are stored in the deduplication storage. Instead of storing a duplicate block multiple times, a reference to the previously stored block is stored. The reference requires significantly less storage space than the duplicate data blocks would have required. In the event that the deduplication process occurs at a client that is remote from the server associated with the deduplication storage, detection of duplicate blocks results in significantly less network bandwidth than sending the actual block data from the client to the server. Requiring less storage space and less network bandwidth is traded for requiring more CPU cycles for duplicate block detection, duplicate block reference storage, and lookup and duplicate block retrieval.

Many compression techniques deal with data at the bit and byte level. Compression techniques typically replace occurrences of often repeated series of bytes in the data with a reference or code value that is smaller than the often repeated sequence of bits or bytes. For example, replacing frequent multiple occurrences of a repeated series of three byte values with a one byte code throughout a data set reduces the size of a data set, which then requires less storage to store the data set. A compressor builds a dictionary of smaller sequences on-the-fly that are used to replace larger sequences. A compressed data set also requires less network bandwidth to transfer. Requiring less storage space to store a data set and less network bandwidth to transfer a data set is traded for requiring CPU cycles for compression and decompression.

In some embodiments, deduplication systems perform both duplicate data set block detection and data set compression. Data blocks can be compressed before or after duplicate block detection.

In some embodiments, each value in a sequence or in a data stream, which comprises merging two or more sequences, can be represented in hexadecimal. Examples of using hexadecimal to represent values are described below:

Note that all commas and underscores used below are merely for easier reading of the digits of a number.

Computers store all values in binary (base 2). Each additional bit represents another power factor of 2. One bit ($2^1$=2 values) can store the values 0, 1 in decimal and 0, 1 in binary. Two bits ($2^2$=4 values) can store the values 0, 1, 2, 3 in decimal or 00, 01, 10, 11 in binary. Four bits ($2^4$=16 values) can store the values 0, 1, 2, 3, 4, 5, 6, 7, 8, 9, 10, 11, 12, 13, 14, 15 in decimal or 0000, 0001, 0010, 0011, 0100, 0101, 0110, 0111, 1000, 1001, 1010, 1011, 1100, 1101, 1110, 1111 in binary. We now have four bits described. Four bits is called a "nibble." Using the same math, eight bits ($2^8$=256 values) can store the values 0 to 255 in decimal or 0000_0000 to 1111_1111 in binary. Eight bits is called a "byte" and consists of two nibbles. If a number were represented by N bits, the highest value storable is $2^N-1$ bits.

Referring back to the four-bit ($2^4=16$ values) example, the four bits can be perceived as a single digit or a two digit decimal number from 0 to 15, or a single four digit binary number from 0000 to 1111. For convenience, base 16 is also used to represent the sixteen values of a four bit nibble using the single hexadecimal digits 0 to 9 and A to F. The A to F hexadecimal digits can also be in lower case. The sixteen four bit values in hexadecimal are 0, 1, 2, 3, 4, 5, 6, 7, 8, 9, A, B, C, D, E, F. In order to distinguish a hexadecimal number from a decimal number, it is generally written with a prefix of "0x" or a suffix of "hexadecimal" or "hex."

Similarly, for convenience, an eight bit number can also be perceived as two four bit nibbles. Since a single hexadecimal digit represents each four bit nibble value, two hexadecimal digits represent two four bit nibbles. Together, two four bit nibbles represent a full eight bit byte value. In other words, an eight bit byte can be represented by two hexadecimal digits, where each digit can be one of 0 to 9 or A to F.

Example eight bit (byte) values in decimal, binary, and hexadecimal representations:
  0 decimal, 0000_0000 binary, 00 hex (or 0x00)
  10 decimal, 0000_1010 binary, 0A hex (or 0x0A)
  50 decimal, 0011_0010 binary, 32 hex (or 0x32)
  203 decimal, 1100_1011 binary, CB hex (or 0xCB)
  255 decimal, 1111_1111 binary, FF hex (or 0xFF)

If 32 bits were used to represent a value, the largest decimal value that can be represented is $2^{32}-1=4,294,967,295$. As such, 32 bits can be used to represent just over 4,000,000,000 decimal or 4 billion values, $2^{32}=4,294,967,296$, ranging from 0 to 4,294,967,295. For convenience, a 32-bit number is frequently perceived as four sets of eight bits or four bytes. Each byte's value is written using two base 16 digits. There is one hexadecimal digit for each nibble in a byte. This is more convenient because with practice, one can "see" the individual bits by looking at the four bit base 16 nibbles and their digits. It is also easier to remember and write A028FC1D instead of 2687040541.

An example 32-bit value in binary, decimal and hexadecimal representations:
  1010_0000_0010_1000_1111_1100_0001_1101 binary (very hard to remember, all bits visible)
  A0_28_FC_1D hex (easier to remember and the underlying four bit sets can be seen)
  2,687,040,541 decimal (around 2.687 billion) (harder to remember, bit sets obscured)

In some embodiments, a data stream is generated as described in some embodiments with 32-bit values, at least some of which may include component eight bit or byte values that can repeat and therefore be replaced by a shorter sequence of bits or bytes. As such, such data streams are compressible. A compressor can locate and replace larger sequences of byte values that repeat within the data stream with a smaller sequence of bits or bytes, thereby reducing the storage required to store the data stream.

Below are some examples of 32-bit values in decimal representation and their byte values in hexadecimal:
  17 decimal—00_00_00_11 hex
  3,439,329,280 decimal—CD_00_00_00 hex
  2,818,572,318 decimal—A8_00_00_1E hex
  31,247 decimal—00_00_7A_0F hex
  287,456,068 decimal—11_22_3B_44 hex
  4,179,770,180 decimal—F9_22_3B_44 hex A compressor may locate the repeated multiple byte sequences 00_00 or 00_00_00 or 22_3B_44 across the different 32-bit values in the data stream.

In various embodiments, a prime number, primeM (a member of set of prime numbers PrimeM that includes "1" and excludes "2" and from an address space defined by $(0, \ldots, 2^N-1)$) that meets a predetermined set of criteria is specially identified as a "constrained" prime number, which can be used to generate non-compressible sequences and non-compressible data streams, which comprise a merging of multiple such sequences. In some embodiments, the predetermined set of criteria for a "constrained" N-bit prime number comprises 1) that a constrained prime number comprises a prime number from a set of prime numbers that is modified to exclude "2" and include "1" and is also constrained/bounded by $2^N-1$ 2) that each component value of the constrained prime number comprises a prime number from the set of prime numbers that is modified to exclude "2" and include "1" and 3) that none of the component values of the constrained prime number are duplicates. In some embodiments, a constrained prime number is represented by N bits and each component value of the constrained prime number comprises a subset of the values (e.g., a byte) of the constrained prime number.

In actual implementation, the number of bits to use to represent a value, N, can be selected to be of various values. For purposes of illustration, in various examples below, N is selected to be 32 bits. A constrained 32-bit prime number comprises four component eight bit byte values that are each a prime number in the range 0 to $2^8-1$ (=255) (including "1" and excluding "2") and that no byte prime number is a duplicate within the same 32-bit prime number. Put another way, the component byte values of a prime number p of N=32 bits can be represented as p3p2p1p0 and p would be identified as a constrained prime number if each of p0, p1, p2, and p3 is a prime number in the range 0 to 255 (including "1" and excluding "2") and none of p0, p1, p2, and p3 were duplicates. This avoids the case where bytes in a data stream were not uniformly distributed, which most of the time is for lower values of primes. Therefore, a compressor can no longer locate any repeated multiple byte sequences in the sequence or data stream.

The following table shows all primes that are members of PrimeM8 (PrimeM8 is a modified set of prime numbers that excludes "2" but includes "1" and that is bounded/constrained by $2^8-1=255$) set:
  PrimeM8=[1, 3, 5, 7, 11, 13, 17, 19, 23, 29, 31, 37, 41, 43, 47, 53, 59, 61,
  67, 71, 73, 79, 83, 89, 97, 101, 103, 107, 109, 113, 127, 131, 137, 139, 149, 151,
  157, 163, 167, 173, 179, 181, 191, 193, 197, 199, 211, 223, 227, 229, 233, 239, 241, 251]
  In hexadecimal representation, PrimeM8=[01, 03, 05, 07, 0B, 0D, 11, 13, 17,
  1D, 1F, 25, 29, 2B, 2F, 35, 3B, 3D, 43, 47, 49, 4F, 53, 59, 61, 65, 67, 6B, 6D, 71, 7F, 83, 89, 8B, 95, 97, 9D, A3, A7, AD, B3, B5, BF, C1, C5, C7, D3, DF, E3, E5, E9, EF, F1, FB]

Where N=32 bits, any member of the set PrimeM32 (PrimeM32 is a modified set of prime numbers that excludes "2" but includes "1" and that is bounded/constrained by $2^{32}-1=4,294,967,295$) that has individual component byte values outside of the PrimeM8 members are not constrained prime numbers and therefore not considered for non-compressible data generation.

Any member of the set PrimeM32 that has duplicate individual component byte values (PrimeM8 members) are also not constrained prime numbers and therefore not considered for non-compressible data generation.

The component byte values in an unconstrained primeM number can be any value from 0 to 255 dec or 00 to FF hex. One or more of the four component byte values (PrimeM8 members) within an unconstrained 32-bit value can be the same (duplicate). This results in generated data that is compressible. Below are three example 32-bit values (with four component byte values) represented as decimal and hexadecimal that do not meet the three predetermined criteria for constrained prime numbers and are therefore unconstrained prime numbers:

A) 11 decimal, 00_00_00_0B hex
B) 16,777,729 decimal, 01_00_02_01 hex
C) 16,777,751 decimal, 01_00_02_17 hex In the example above, the hexadecimal representation of value A includes duplicate "00" byte values and also non-prime value "00," the hexadecimal representation of value B includes duplicate "01" byte values and also non-prime value "00," and the hexadecimal representation of value C includes non-prime value "00." Therefore, each of values A, B, and C are compressible.

Below are two example 32-bit values (with four component byte values) represented as decimal and hexadecimal that do meet the three predetermined criteria for constrained prime numbers:

D) 16,975,117 decimal, 01_03_05_0D hex
E) 50,661,131 decimal, 03_05_07_0B hex

In the example above, the hexadecimal representations of values D and E are each a prime number, the four component byte values of each are prime numbers, and none of the four component byte values of each of values D and E are duplicates. Therefore, each of values D and E are not compressible.

Generally, the component byte values in a constrained primeM number must each be a primeM number in the range 0 to 255 decimal or 00 to FF hex, and all four component byte values must have a different value.

FIG. 6 is a diagram showing a table that includes sample constrained and unconstrained 32-bit primeM values to help explain how a primeM value is determined to be constrained or unconstrained. In FIG. 6, a primeM value that is "good" is a constrained prime number that will result in generated data that cannot be compressed and a primeM value that is "bad" is an unconstrained prime number that may result in generated data that may be compressed.

Figure 7:
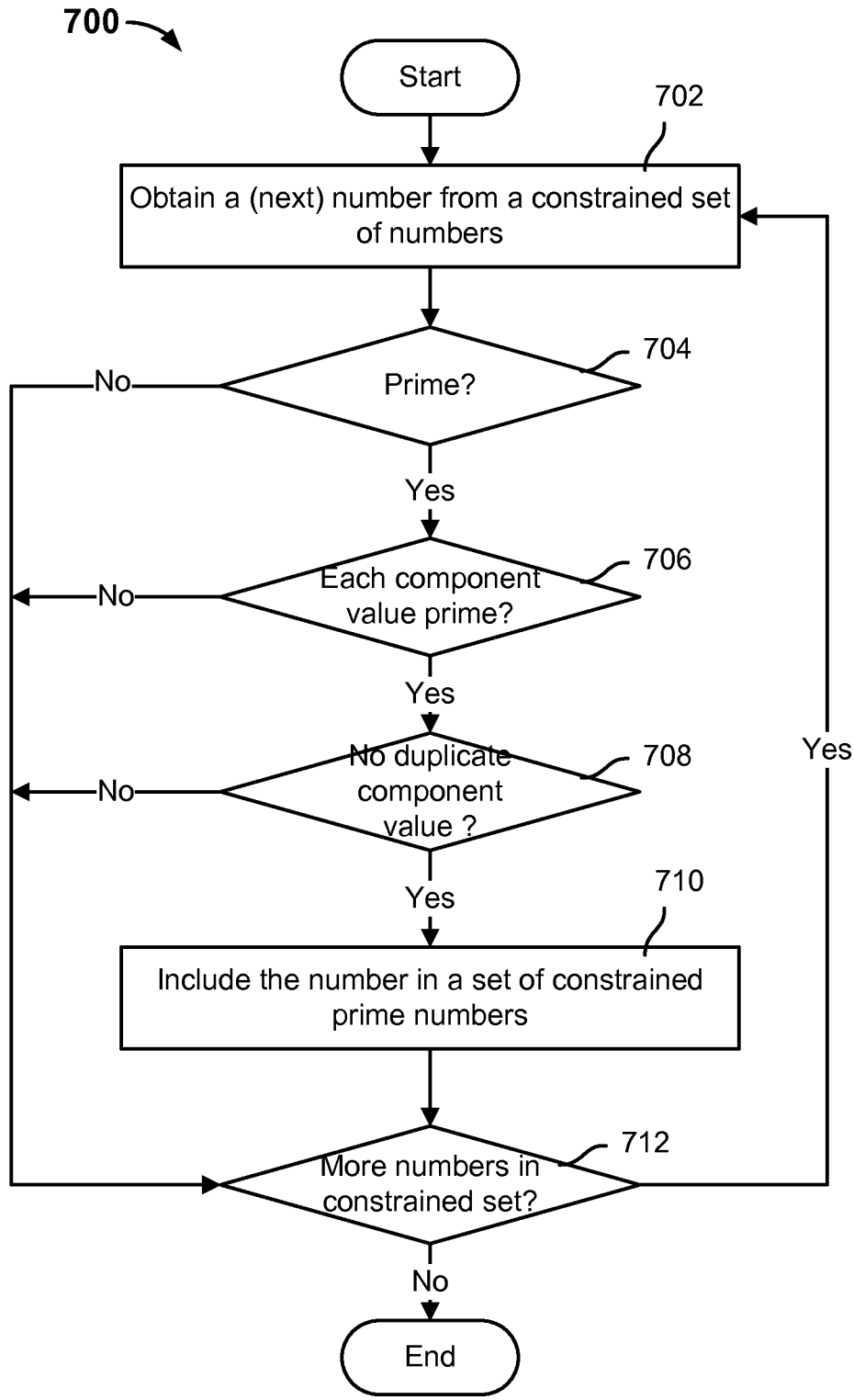
FIG. 7 is a flow diagram showing an embodiment of a process for identifying a set of constrained prime numbers.

FIG. 7 is a flow diagram showing an embodiment of a process for identifying a set of constrained prime numbers. In some embodiments, process 700 is implemented at system 100 of FIG. 1. Specifically, in some embodiments, process 700 is implemented at quality assurance server 106 of system 100 of FIG. 1.

Process 700 is an example process of identifying a set of constrained prime numbers from a set of numbers constrained by N bits by iterating through each number of the set and determining whether the number meets a predetermined set of criteria associated with steps 704, 706, and 708 required for a constrained prime number. As described herein, a constrained prime number can be used with an initialization parameter to generate a non-compressible sequence.

At 702, a (next) number from a constrained set of numbers is obtained. For example, if N=32 bits, then the constrained set of numbers includes $(0, \ldots, 2^{32}-1)$.

At 704, it is determined whether the number is a prime number. In various embodiments, the prime number is from a set of prime numbers that is modified to exclude "2" and include "1" and is also constrained/bounded by $2^N-1$. In the event that the number is a prime number, control is transferred to 706. Otherwise, in the event that the number is not a prime number, control is transferred to 712.

At 706, it is determined whether each component value of the number is itself a prime number. In some embodiments, the size of each component value of the number is a byte (eight bits). For example, if N=32 bits and the size of each component value is a byte, then each number p of the constrained set would have four component byte values p3p2p1p0. For example, each component byte value of p3p2p1p0 should be a prime number from a set of prime numbers that is modified to exclude "2" and include "1" and within range 0 to 255 (set Prime8). In some embodiments, the size of each component value of the number is dependent on the size with which a particular compression technique determines compression. In the event that the each component value of the number is a prime number, control is transferred to 708. Otherwise, in the event that not every component value of the number is a prime number, control is transferred to 712.

At 708, it is determined whether there is a duplicate component value in the number. There should not be any duplicates among the component values of a constrained prime number. Put another way, each component value of a constrained prime number must be different from each other. Returning to the former example, if N=32 bits and the size of each component value is a byte, then there should be no duplicate component values among the four component byte values p3p2p1p0 of number p. In the event that there are no duplicate component values in the number, control is transferred to 710. Otherwise, in the event that there are duplicate component values in the number, control is transferred to 712.

At 710, the number is included in a set of constrained prime numbers. If the number meets the three criteria of steps 704, 706, and 708, then the number is determined to be a constrained prime number and included in a set of constrained prime numbers.

At 712, it is determined whether there is at least one more number in the constrained set of numbers. In the event that there is at least one more number in the constrained set of numbers, control is returned 702. Otherwise, in the event that there are no more numbers in the constrained set of numbers, process 700 ends.

Figure 8:
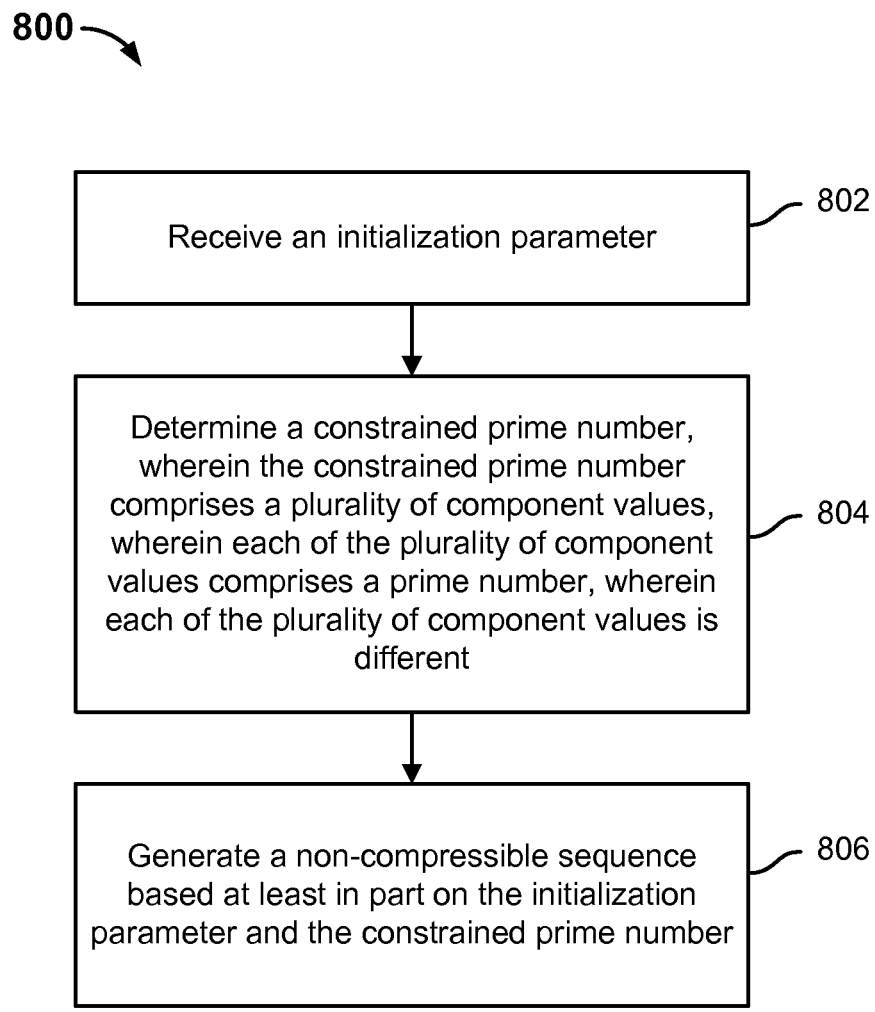
FIG. 8 is a flow diagram showing an embodiment of a process for generating a non-compressible sequence using an initialized parameter and a constrained prime number.

FIG. 8 is a flow diagram showing an embodiment of a process for generating a non-compressible sequence using an initialized parameter and a constrained prime number. In some embodiments, process 800 is implemented at system 100 of FIG. 1. Specifically, in some embodiments, process 800 is implemented at quality assurance server 106 of system 100 of FIG. 1.

At 802, an initialization parameter is received. For example, the initialization parameter can be received from a user input or from a computer program. In some embodiments, the initialization parameter comprises a seed value that is selected from an address space $(0, \ldots, 2^N-1)$, where N is selected to be any positive integer (e.g., 32).

At 804, a constrained prime number is determined, wherein the constrained prime number comprises a plurality of component values, wherein each of the plurality of component values comprises a prime number, wherein each of the plurality of component values is different. In some embodiments, a constrained prime number is selected from the identified set of constrained prime numbers based on a received revision parameter (e.g., associated with the initialization parameter). In some embodiments, a constrained prime number is selected from the identified set of constrained prime numbers based on any appropriate technique. In some embodiments, a set of constrained prime numbers can be identified using a process such as process 700 of FIG. 7.

At 806, a non-compressible sequence is generated based at least in part on the initialization parameter and the constrained prime number. In some embodiments, the initial value of the non-compressible sequence comprises the sum of the seed value and the selected constrained prime number and each subsequent value comprises the sum of the prior value and the constrained prime number.

For example, the sequence generator engine generates the initial 32-bit value of the sequence by computing:

$$\text{Accumulator}=\text{seed}+\text{prime}M$$

where seed represents the initialization parameter and primeM represents the selected constrained prime number. The sequence generator engine always generates the next 32-bit value of the sequence by computing:

$$\text{Accumulator}=\text{Accumulator}+\text{prime}M$$

Please note that the numbers in hexadecimal are written with underscores merely to help visualize the value of the four individual bytes (eight bits each) that are each a component value of a 32-bit (four byte) primeM number.

FIG. 9A is a diagram showing a table that includes 32-bit values of a compressible sequence generated using an initialization parameter and an unconstrained prime number. In FIG. 9A, the initialization parameter ("seed") and the unconstrained prime number ("primeM") used to generate the sequence are represented in hexadecimal as "0E00000E" and "01000201," respectively. The values of the sequence of FIG. 9A are ordered from left-to-right in each row from the top to the bottom. In FIG. 9A, the initial value of the sequence ("0F00020F") is a sum of the seed and the unconstrained prime number and each subsequent value is the sum of the prior value and the unconstrained prime number. Prime number "01000201" is not a constrained prime number because it includes duplicate component byte values of "00" and also a non-prime component byte value of "00." Because an unconstrained prime number was used to generate the sequence, the sequence includes values that can be compressed. Therefore, the sequence generated with an unconstrained prime number is compressible.

As shown in the table of FIG. 9A, within each 32-bit value of the sequence, there can be component byte values that are the same. Some byte values occur much more frequently than other byte values.

Figure 9B:
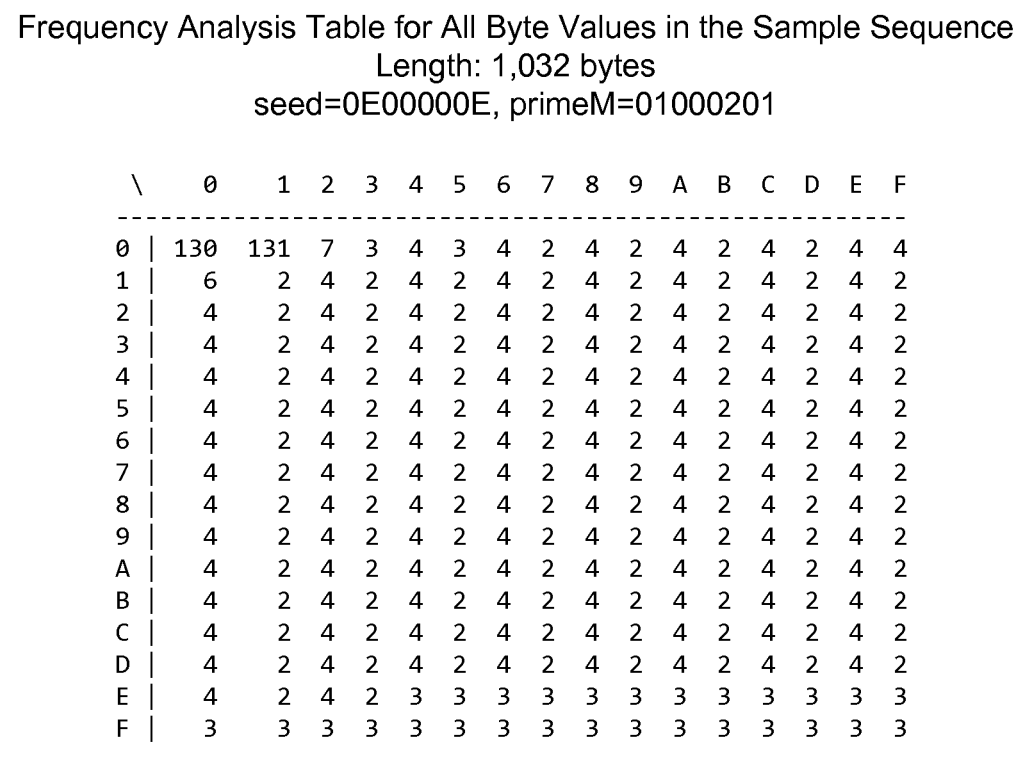

FIG. 9B is a diagram showing a frequency analysis table for all component byte values of a sampling of 1,032 bytes of the sequence of FIG. 9A. The frequency values of FIG. 9B are in decimal representation. The most significant hexadecimal nibble values are located down the left of the table. The least significant hexadecimal nibble values are located across the top of the table. The generated data sequence that was shown in FIG. 9A is compressible since the frequency distribution of all 256 possible byte values is not uniformly distributed.

FIG. 10A is a diagram showing a table that includes 32-bit values of a non-compressible sequence generated using an initialization parameter and a constrained prime number. In FIG. 10A, the initialization parameter ("seed") and the constrained prime number ("primeM") used to generate the sequence are represented in hexadecimal as "0E00000E" and "0103050D," respectively. The values of the sequence of FIG. 10A are ordered from left-to-right in each row from the top to the bottom. In FIG. 10A, the initial value of the sequence ("0F03051B") is a sum of the seed and the constrained prime number and each subsequent value is the sum of the prior value and the constrained prime number. Prime number "0103050D" is a constrained prime number because each component byte value is a prime number and there are no duplicate component byte values. Because a constrained prime number was used to generate the sequence, the sequence includes values that cannot be compressed. Therefore, the sequence generated with a constrained prime number is non-compressible.

As shown in the table of FIG. 10A, within each 32-bit value of the sequence, there are rarely component values that are the same. There are no repeated 32-bit values. All the component byte values of the non-compressible sequence of FIG. 10A occur with basically the same frequency. The thirty-six data values in lines #11 through #16 marked by vertical bars are extracted and used in the table of FIG. 11, below.

FIG. 10B is a diagram showing a frequency analysis table for all component byte values of a sampling of 1,032 bytes of the sequence of FIG. 10A. The frequency values of FIG. 10B are in decimal representation. The most significant hexadecimal nibble values are located down the left of the table. The least significant hexadecimal nibble values are located across the top of the table. The generated data is not compressible since the frequency distribution of all 256 possible byte values in this sampling of 1032 bytes is near uniformly distributed. Even when the sample size is decreased to 516 bytes or increased to 2064 bytes or higher, the distribution stays near uniform.

FIG. 10C is a diagram showing a frequency analysis table for all component byte values of a sampling of 12,288 bytes of the sequence of FIG. 10A. The frequency values of FIG. 10C are in decimal representation. The frequency values of FIG. 10B are in decimal representation. The most significant hexadecimal nibble values are located down the left of the table. The least significant hexadecimal nibble values are located across the top of the table. Even though FIG. 10C shows a frequency table with a greater sampling size of the sequence of FIG. 10A than that used in the frequency table of FIG. 10B, the table of FIG. 10C shows that the generated data is not compressible since the frequency distribution of all 256 possible byte values in this sampling of 12,288 bytes is still near uniformly distributed.

FIG. 11 is a diagram showing a table of accumulator (generated data) internal byte value rotations. The thirty-six 32-bit data values used for the table of FIG. 11 are taken from the six marked data lines #11 through #16 in the table of FIG. 10A. The initialization parameter ("seed") used was "0E00000E." The constrained prime number ("primeM") used was "0103050D." Its four component byte values are p3 p2 p1 p0 in bytes b3, b2, b1, b0. All initial component byte values are themselves a prime number (in decimal): 1, 3, 5 and 13. Each time the "accumulator=accumulator+primeM" step is performed, the accumulator bytes increment and rotate plus any applicable carries on each addition. The component byte values in each column visit the 256 values in the eight bit address space as the accumulator value visits the four billion values in the 32-bit address space.

Figure 12:
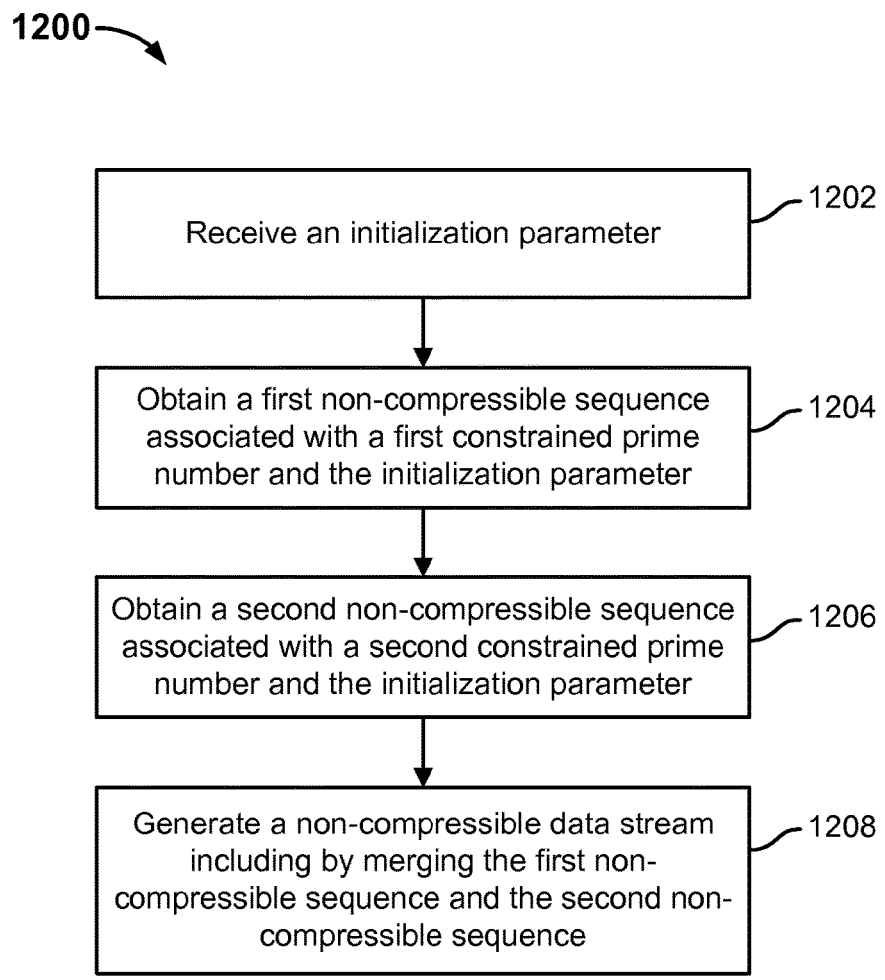
FIG. 12 is a flow diagram showing an embodiment of a process for generating a non-compressible data stream using two constrained prime numbers.

FIG. 12 is a flow diagram showing an embodiment of a process for generating a non-compressible data stream using two constrained prime numbers. In some embodiments, process 1200 is implemented at system 100 of FIG. 1. Specifically, in some embodiments, process 1200 is implemented at quality assurance server 106 of system 100 of FIG. 1.

Process 1200 shows an example process of generating a non-compressible data stream by merging (e.g., interleaving) two sequences, each generated using the same initialization parameter (e.g., a seed value) and a respective unconstrained prime number.

At 1202, an initialization parameter is received. For example, the initialization parameter can be received from a user input or from a computer program. In some embodiments, the initialization parameter comprises a seed value that is selected from an address space $(0, \ldots, 2^N-1)$, where N is selected to be any positive integer (e.g., 32).

At 1204, a first non-compressible sequence associated with a first constrained prime number and the initialization parameter is obtained. In some embodiments, each of two constrained prime numbers is selected from an identified set of constrained prime numbers. In some embodiments, the set of constrained prime numbers is identified using a process such as process 700 of FIG. 7. The two constrained prime numbers may comprise the same constrained prime number or different constrained prime numbers. In some embodiments, the two constrained prime numbers are selected based on a received revision parameter comprising a revision value. In some embodiments, a first non-compressible sequence is generated using the initialization parameter and one of the two constrained prime numbers using a process such as process 800 of FIG. 8. In some embodiments, the first non-compressible sequence is received from another entity.

At 1206, a second non-compressible sequence associated with a second constrained prime number and the initialization parameter is obtained. In some embodiments, a second non-compressible sequence is generated using the initialization parameter and the constrained prime number of the two constrained prime numbers that was not used to generate the first non-compressible sequence of step 1204. In some embodiments, the second non-compressible sequence is generated using the initialization parameter and the constrained prime number of the two prime numbers that was not used to generate the first non-compressible sequence using a process such as process 800 of FIG. 8. In some embodiments, the second non-compressible sequence is received from another entity.

At 1208, a non-compressible data stream is generated including by merging the first non-compressible sequence and the second non-compressible sequence. In some embodiments, a data stream having the property of being non-compressible is generated including by merging the first non-compressible sequence and the second non-compressible sequence. In some embodiments, merging the first non-compressible sequence and the second non-compressible sequence includes interleaving the first and second non-compressible sequences into a new sequence that is referred to as the non-compressible data stream. In some embodiments, the data stream includes a sequence of alternating values from the first and second non-compressible sequences. For example, of two sequences that are to be merged to become the data stream, the first sequence comprises {S11, S12, S13, . . . } and the second sequence comprises {S21, S22, S23, . . . }, then merging the first and second sequences will yield the following data stream {S11, S21, S12, S22, S13 S23, . . . }. In some embodiments, the non-compressible data stream is also not deduplicatable.

In some embodiments, more than two constrained prime numbers from the constrained modified set of prime numbers can be selected based on the revision value and the non-compressible data stream can be generated by merging more than two non-compressible sequences, each of which is generated using the initialization parameter and a respective constrained prime number.

In some embodiments, a non-compressible data stream generated using a process such as process 1200 can be verified using a process such as process 500 of FIG. 5.

FIGS. 13A to 15H illustrate examples of two non-compressible sequences that can be merged to generate a non-compressible data stream. FIGS. 13A to 13E are diagrams that illustrate the values and properties of a first non-compressible sequence that is generated with an initialization parameter (e.g., a seed value) and a first constrained prime number. FIGS. 14A to 14E are diagrams that illustrate the values and properties of a second non-compressible sequence that is generated with the initialization parameter (e.g., a seed value) and a second constrained prime number. FIGS. 15A to 15H are diagrams that illustrate the values and properties of a non-compressible data stream that is generated by merging the two non-compressible sequences respectively associated with FIGS. 13A to 13E and FIGS. 14A to 14E.

FIGS. 13A to 13D are diagrams showing a table that includes 32-bit values of a non-compressible sequence generated using an initialization parameter and a constrained prime number. In FIGS. 13A to 13D, the initialization parameter ("seed") and the constrained prime number ("primeM") used to generate the sequence are represented in hexadecimal as "0E00000E" and "0103050D," respectively. The values of the sequence span FIGS. 13A to 13D and are ordered from left-to-right in each row from the top to the bottom of each figure.

FIG. 13E is a diagram showing a frequency analysis table for all component byte values of 4,080 bytes of the sequence of FIGS. 13A to 13D. The frequency values of FIG. 13E are in decimal representation. The most significant hexadecimal nibble values are located down the left of the table. The highest frequency count is 19. The lowest frequency count is 13. The delta is 6 between the highest and lowest frequency counts. The generated data is not compressible since the frequency distribution of all 256 possible byte values is roughly uniformly distributed.

The uncompressed sequence of FIGS. 13A to 13D has a file size of 4,080 bytes. After compressing the sequence of FIGS. 13A to 13D (e.g., using a known ZIP compression technique), the compressed file size is 4,133 bytes. The data generated using constrained primes is not compressible so therefore the compressed file size is larger than the uncompressed file size due to the compression metadata overhead bytes.

FIGS. 14A to 14D are diagrams showing a table that includes 32-bit values of a non-compressible sequence generated using an initialization parameter and a constrained prime number. In FIGS. 14A to 14D, the initialization parameter ("seed") and the constrained prime number ("primeM") used to generate the sequence are represented in hexadecimal as "0E00000E" and "0305070B," respectively. The values of the sequence span FIGS. 14A to 14D and are ordered from left-to-right in each row from the top to the bottom of each figure.

Figure 14E:
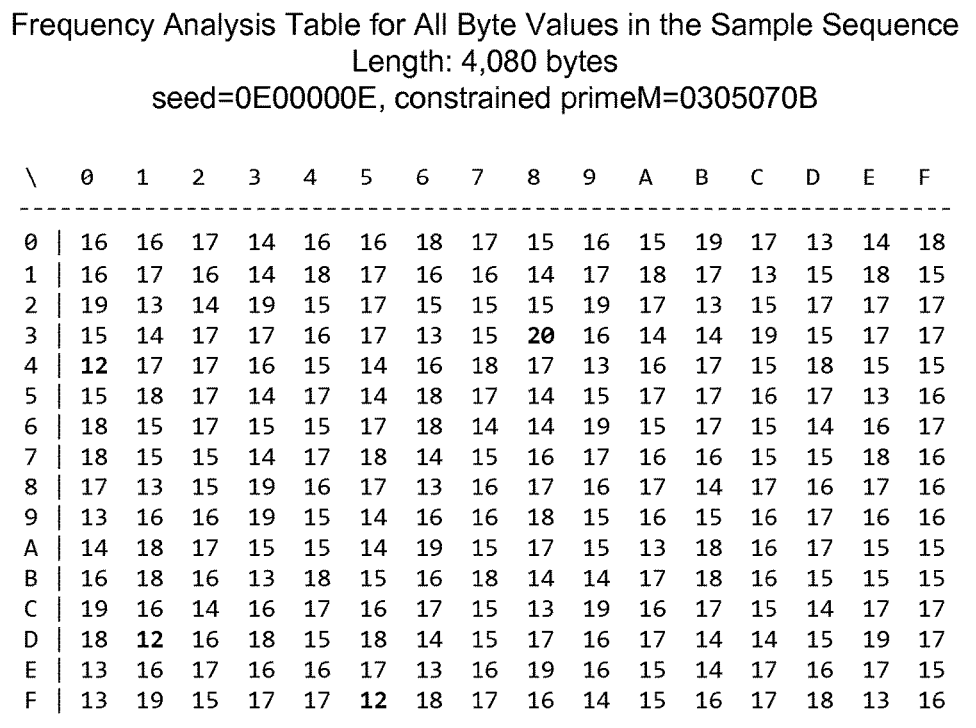

FIG. 14E is a diagram showing a frequency analysis table for all component byte values of 4,080 bytes of the sequence of FIGS. 14A to 14D. The frequency values of FIG. 14E are in decimal representation. The most significant hexadecimal nibble values are located down the left of the table. The highest frequency count is 20. The lowest frequency count is 12. The delta is 8 between the highest and lowest frequency counts. The generated data is not compressible since the frequency distribution of all 256 possible byte values is roughly uniformly distributed.

The uncompressed sequence of FIGS. 14A to 14D has a file size of 4,080 bytes. After compressing the sequence of FIGS. 14A to 14D (e.g., using a known ZIP compression technique), the compressed file size is 4,133 bytes. The data generated using constrained primes is not compressible so therefore the compressed file size is larger than the uncompressed file size due to the compression metadata overhead bytes.

FIGS. 15A to 15G are diagrams showing a table that includes 32-bit values of a non-compressible data stream generated from merging two non-compressible sequences. In FIGS. 15A to 15G, the initialization parameter ("seed"), the first constrained prime number ("primeM1") used to generate the first sequence (described with FIGS. 13A to 13D, above), and the second constrained prime number ("primeM2") used to generate the second sequence (described with FIGS. 14A to 14D, above) are represented in hexadecimal as "0E00000E," "0103050D," and "0305070B," respectively. The values of the data stream span FIGS. 15A to 15G and are ordered from left-to-right in each row from the top to the bottom of each figure.

FIG. 15H is a diagram showing a frequency analysis table for all component byte values of 8,124 bytes of the non-compressible data stream of FIGS. 15A to 15G. The frequency values of FIG. 15H are in decimal representation. The most significant hexadecimal nibble values are located down the left of the table. The highest frequency count is 37. The lowest frequency count is 28. The delta is 9 between the highest and lowest frequency counts. The generated data is not compressible since the frequency distribution of all 256 possible byte values is roughly uniformly distributed.

The uncompressed data stream of FIGS. 15A to 15G has a file size of 8,184 bytes. After compressing the sequence of FIGS. 15A to 15G (e.g., using a known ZIP compression technique), the compressed file size is 8,241 bytes. The data generated using constrained primes is not compressible so therefore the compressed file size is larger than the uncompressed file size due to the compression metadata overhead bytes.

In contrast to the examples of FIGS. 13A to 15H, FIGS. 16A to 18H illustrate examples of two compressible sequences that can be merged to generate a compressible data stream. FIGS. 16A to 16E are diagrams that illustrate the values and properties of a first compressible sequence that is generated with an initialization parameter (e.g., a seed value) and a first unconstrained prime number. FIGS. 17A to 17E are diagrams that illustrate the values and properties of a second compressible sequence that is generated with the initialization parameter (e.g., a seed value) and a second unconstrained prime number. FIGS. 18A to 18H are diagrams that illustrate the values and properties of a compressible data stream that is generated by merging the two compressible sequences respectively associated with FIGS. 16A to 16E and FIGS. 17A to 17E, respectively.

FIGS. 16A to 16D are diagrams showing a table that includes 32-bit values of a compressible sequence generated using an initialization parameter and an unconstrained prime number. In FIGS. 16A to 16D, the initialization parameter ("seed") and the unconstrained prime number ("primeM") used to generate the sequence are represented in hexadecimal as "0E00000E" and "01000201," respectively. The values of the sequence span FIGS. 16A to 16D and are ordered from left-to-right in each row from the top to the bottom of each figure.

FIG. 16E is a diagram showing a frequency analysis table for all component byte values of 4,080 bytes of the sequence of FIGS. 16A to 16D. The frequency values of FIG. 16E are in decimal representation. The most significant hexadecimal nibble values are located down the left of the table. The highest frequency count is 140. The lowest frequency count is 10. The delta is 130 between the highest and lowest frequency counts. The generated data is compressible since the frequency distribution of all 256 possible byte values is not uniformly distributed.

The uncompressed sequence of FIGS. 16A to 16D has a file size of 4,080 bytes. After compressing the sequence of FIGS. 16A to 16D (e.g., using a known ZIP compression technique), the compressed file size is 3,934 bytes. The data generated using unconstrained primes is compressible so therefore the uncompressed file size is larger than the compressed file size and the number of bytes removed due to compression exceeds the compression metadata overhead bytes.

FIGS. 17A to 17D are diagrams showing a table that includes 32-bit values of a compressible sequence generated using an initialization parameter and an unconstrained prime number. In FIGS. 17A to 17D, the initialization parameter ("seed") and the unconstrained prime number ("primeM") used to generate the sequence are represented in hexadecimal as "0E00000E" and "00000017," respectively. The values of the sequence span FIGS. 17A to 17D and are ordered from left-to-right in each row from the top to the bottom of each figure.

FIG. 17E is a diagram showing a frequency analysis table for all component byte values of 4,080 bytes of the sequence of FIGS. 17A to 17D. The frequency values of FIG. 17E are in decimal representation. The most significant hexadecimal nibble values are located down the left of the table. The highest frequency count is 1,034. The lowest frequency count is 3. The delta is 1,031 between the highest and lowest frequency counts. The generated data is compressible since the frequency distribution of all 256 possible byte values is not uniformly distributed.

The uncompressed sequence of FIGS. 17A to 17D has a file size of 4,080 bytes. After compressing the sequence of FIGS. 17A to 17D (e.g., using a known ZIP compression technique), the compressed file size is 1,621 bytes. The data generated using unconstrained primes is compressible so therefore the uncompressed file size is larger than the compressed file size and the number of bytes removed due to compression exceeds the compression metadata overhead bytes.

FIGS. 18A to 18G are diagrams showing a table that includes 32-bit values of a compressible data stream generated from merging two compressible sequences. In FIGS. 18A to 18G, the initialization parameter ("seed"), the first unconstrained prime number ("primeM1") used to generate the first sequence (described with FIGS. 16A to 16D, above), and the second unconstrained prime number ("primeM2") used to generate the second sequence (described with FIGS. 17A to 17D, above) are represented in hexadecimal as "0E00000E," "01000201," and "00000017," respectively. The values of the data stream span FIGS. 18A to 18G and are ordered from left-to-right in each row from the top to the bottom of each figure.

FIG. 18H is a diagram showing a frequency analysis table for all component byte values of 8,184 bytes of the compressible data stream of FIGS. 18A to 18G. The frequency values of FIG. 18H are in decimal representation. The most significant hexadecimal nibble values are located down the left of the table. The highest frequency count is 1,176. The lowest frequency count is 15. The delta is 1,161 between the highest and lowest frequency counts. The generated data is compressible since the frequency distribution of all 256 possible byte values is not uniformly distributed.

The uncompressed data stream of FIGS. 18A to 18G has a file size of 8,184 bytes. After compressing the sequence of FIGS. 18A to 18G (e.g., using a known ZIP compression technique), the compressed file size is 6,852 bytes. The data generated using unconstrained primes is compressible so therefore the uncompressed file size is larger than the compressed file size and the number of bytes removed due to compression exceeds the compression metadata overhead bytes.

Figure 19:
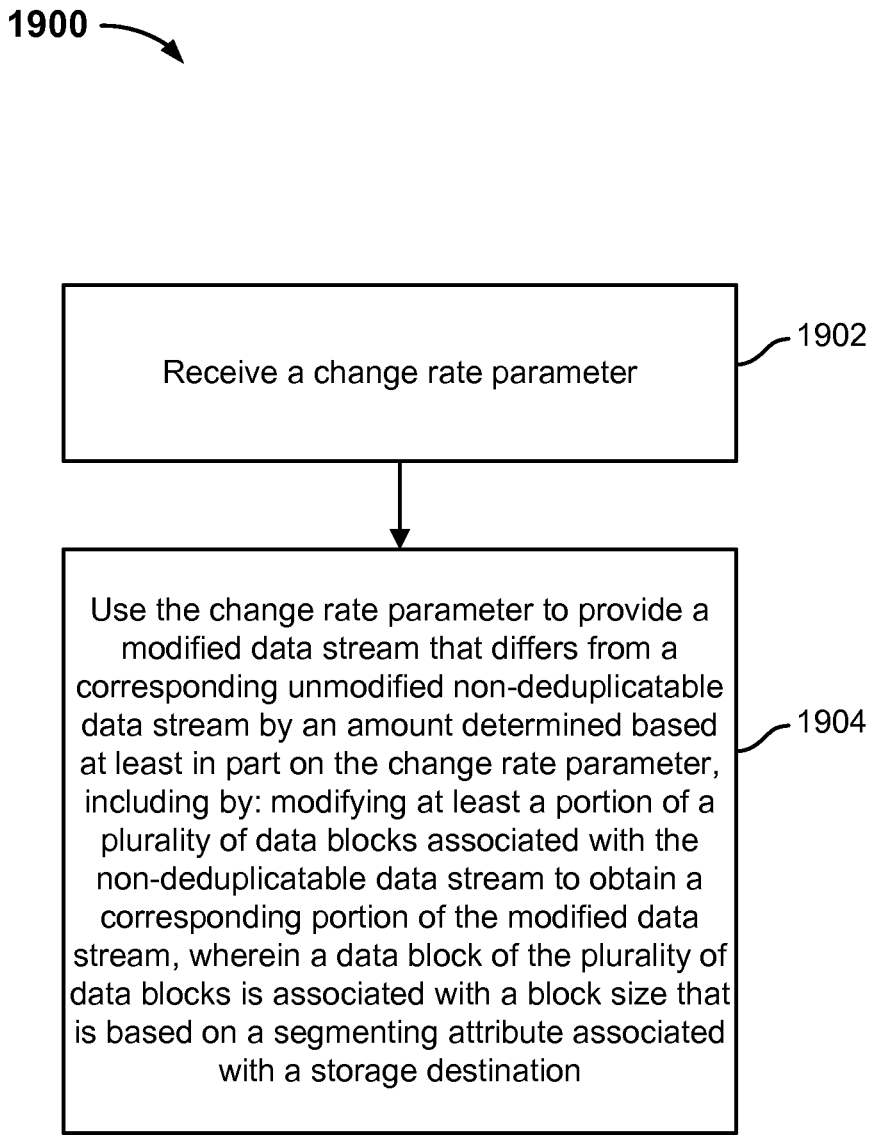
FIG. 19 is a flow diagram showing an embodiment of a process for modifying a data stream based on a change rate parameter.

FIG. 19 is a flow diagram showing an embodiment of a process for modifying a data stream based on a change rate parameter. In some embodiments, process 1900 is implemented at system 100 of FIG. 1. Specifically, in some embodiments, process 1900 is implemented at quality assurance server 106 of system 100 of FIG. 1.

At 1902, a change rate parameter is received. For example, the change rate parameter can be received from a user input or from a computer program. For example, the change rate parameter is a percentage, a proportion, and/or a value in between 0 and 1 (e.g., 0 representing 0% and 1 representing 100%).

At 1904, the change rate parameter is used to provide a modified data stream that differs from a corresponding unmodified non-deduplicatable data stream by an amount determined based at least in part on the change rate parameter, including by: modifying at least a portion of a plurality of data blocks associated with the non-deduplicatable data stream to obtain a corresponding portion of the modified data stream, wherein a data block of the plurality of data blocks is associated with a block size that is based on a segmenting attribute associated with a storage destination.

In some embodiments, the unmodified non-deduplicatable data stream is generated using process 400 of FIG. 4. In some embodiments, the unmodified non-deduplicatable data stream comprises a non-compressible data stream that is generated using process 1200 of FIG. 12. In some embodiments, a block size is determined based on the segmenting attribute of the range of block sizes used by a storage deduplication destination to which the data stream and/or the modified data stream are to be sent. For example, a storage deduplication server is configured to identify data blocks at certain natural boundaries within a received data stream, parse/segment each data block from the data stream to create variable sized blocks, and perform deduplication with respect to storing each block of data. For example, the storage deduplication server may identify variable block sizes from the range of 4 KiB to 12 KiB. As such, in some embodiments, the average block size of the block sizes recognized by the storage deduplication server is used as the determined block size. For example, if the storage deduplication server is known to identify block sizes of the range 4 KiB to 12 KiB, then the average block size is 8 KiB, which can be used as the determined block size.

Once the block size is determined, each data block of the determined block size within the unmodified original data stream to be modified is identified. For example, each data block may include one or more values. In various embodiments, a number of data blocks of the original data stream are modified such that the percentage of data blocks of the data stream that are modified corresponds to the change rate percentage. Put another way, given change rate of R percent, R percent of data blocks of the original data stream are changed while the remaining (100-R) data blocks of the original data stream are unchanged to yield the modified data stream.

In some embodiments, a data block of the original data stream is modified by changing at least one value associated with one location within the block. For example, a marker value is introduced in each data block of the data stream that is desired to be modified. Each marker value is different and the location of the marker within a block is also different. By selecting specific values for the markers, different modified data streams may be generated from a data stream according to the same change rate.

In some embodiments, which data blocks of the data stream are modified can be selected based on a preset rule. For example, a preset rule can indicate that for every 1,000 data blocks of the data stream, a number of (deterministic) data blocks corresponding to change rate R percent can be modified such that the modified data stream will include R percent of different blocks relative to the original data stream.

In some embodiments, multiple modified data streams can be generated using the same data stream and corresponding change rates. Regardless of how many modified data streams are generated, each modified data stream is modified by a corresponding change rate relative to the original data stream (e.g., as opposed to another modified data stream). For example, two modified data streams generated based on a 5% change rate for any two original data streams are each 5% different from the respective original data stream. Similarly, a modified data stream generated based on a 4% change rate for an original data stream is still 4% different from the original data stream even though a modified data stream may have already been generated based on a 5% change rate for the same original data stream.

Figure 20:
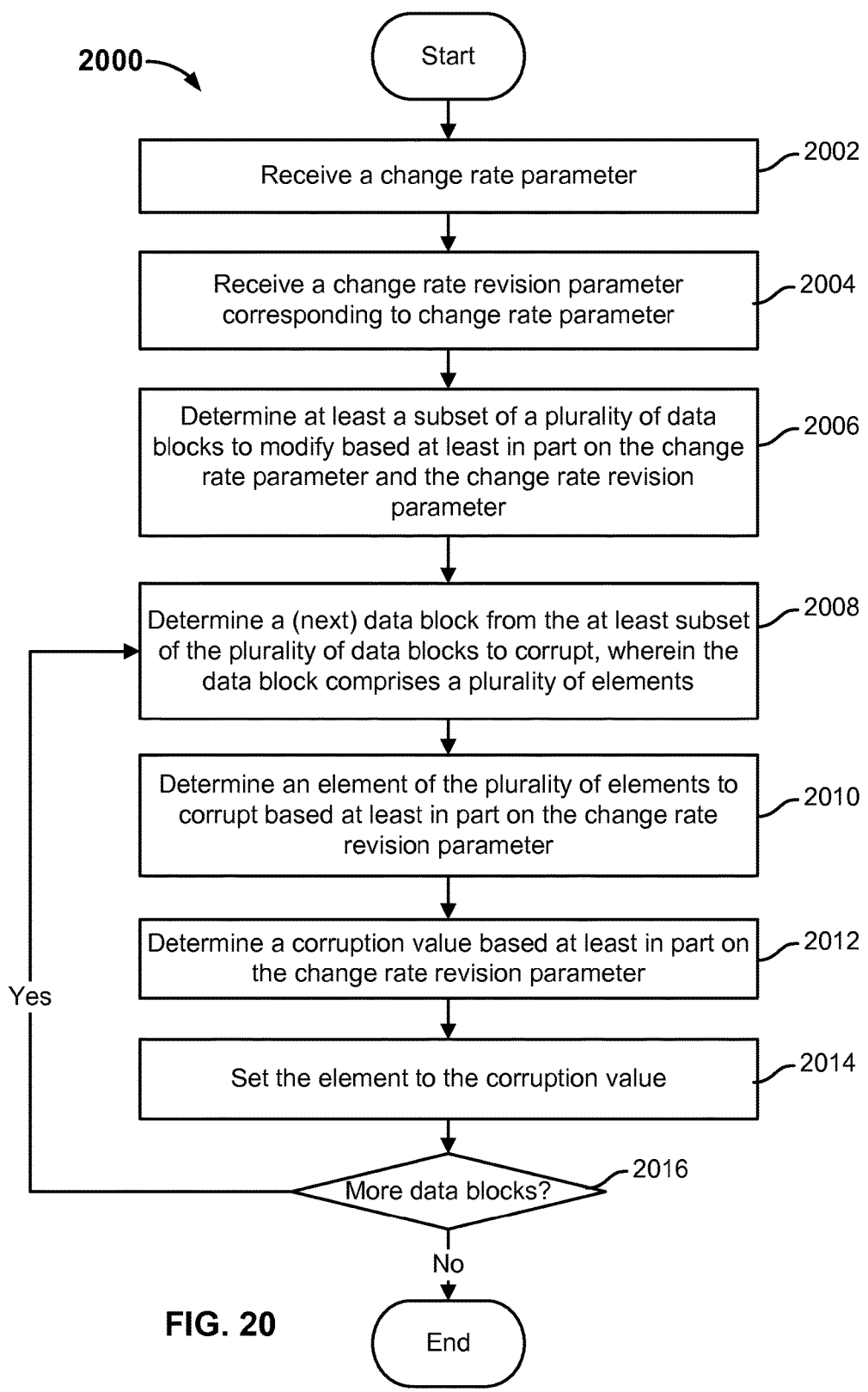
FIG. 20 is a flow diagram showing an example of a process for generating an instance of a modified data stream that differs from an original data stream by a percentage specified by the change rate.

FIG. 20 is a flow diagram showing an example of a process for generating an instance of a modified data stream that differs from an original data stream by a percentage specified by the change rate. In some embodiments, process 2000 is implemented at system 100 of FIG. 1. Specifically, in some embodiments, process 2000 is implemented at storage deduplication server 102 or quality assurance server 106 of system 100 of FIG. 1. In some embodiments, process 1900 of FIG. 19 is implemented at least in part by process 2000.

Process 2000 is an example process that describes generating one instance of a modified data stream that differs from an original data stream by a percentage specified by the change rate. In some embodiments, different instances of a modified data stream that each differs from the original data stream by the percentage specified by the same change rate can be generated. Each instance of such a modified data stream associated with a particular change rate parameter is generated using an additional parameter that is referred to as a "change rate revision parameter," in some embodiments. Note that the "change rate revision parameter" used with a change rate parameter, as will be described below, is different from the "revision parameter" corresponding to a seed value that was used to select at least two prime numbers to use to generate a merged data stream, as described above.

As shown earlier, a data stream can be seen as a sequence of blocks. Any minute change (a "corruption") within a block of the data stream can result in a modified block. Even if one bit is changed, the modified block is determined to be a new block to a deduplicating storage server. A block can be modified in various ways. In the examples described below, the block size of each data block of a data stream is 8 KiB (e.g., because the average block size is 8 KiB (8,192 bytes) in a deduplicating storage server) and the data stream comprises of alternating 32-bit (4 byte) values each from one of two different sequences. As such, each block, "B," consists of 1,024 sixty-four bit (8 byte) elements. Each element of a data block can be represented as 8 bytes: b1, b2, b3, b4, b5, b6, b7, and b8. In this example a single block "B" can be viewed as follows:

| Element Locations | Bytes of Each Element | | | | | | | |
|---|---|---|---|---|---|---|---|---|
| 0 | b1 | b2 | b3 | b4 | b5 | b6 | b7 | b8 |
| 1 | b1 | b2 | b3 | b4 | b5 | b6 | b7 | b8 |
| 2 | b1 | b2 | b3 | b4 | b5 | b6 | b7 | b8 |
| ... | b1 | b2 | b3 | b4 | b5 | b6 | b7 | b8 |
| $N^{th}$ | b1 | b2 | b3 | b4 | b5 | b6 | b7 | b8 |
| ... | b1 | b2 | b3 | b4 | b5 | b6 | b7 | b8 |
| 1021 | b1 | b2 | b3 | b4 | b5 | b6 | b7 | b8 |
| 1022 | b1 | b2 | b3 | b4 | b5 | b6 | b7 | b8 |
| 1023 | b1 | b2 | b3 | b4 | b5 | b6 | b7 | b8 |

Each block consists of 1,024 sixty-four bit (8 byte) elements. Bytes b1, b2, b3 and b4 of each element of the block came from the first merged sequence. Bytes b5, b6, b7 and b8 of each element of the block came from the second merged sequence.

The following table, Table 7, illustrates a merged data stream MS2(N=32, seed, prime1, prime2) consisting of 400 blocks. MS2 is a data stream generated by merging two S(N=32, seed, prime) sequences together. It is a base sequence. Each upper case B represents an 8 KiB block. Each 8 KiB block consists of 1,024 (~1 KiB) elements. Each element consists of a 4 byte value from sequence S(N, seed, prime1) and a 4 byte value from S(N, seed, prime2). So 2*4 bytes*1 KiB=8 KiB block size.

TABLE 7

| | | | | | | | | | | | | | | | | | | | |
|---|---|---|---|---|---|---|---|---|---|---|---|---|---|---|---|---|---|---|---|
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |

At 2002, a change rate parameter is received. Step 2002 can be implemented in a manner similar to 1902 of process 1900 of FIG. 19. It is desired to regenerate the same sequence but with modifications (corruptions) in enough blocks so that the new sequence has a specific change rate present.

At 2004, a change rate revision parameter corresponding to the change rate parameter is received. In some embodiments, an additional parameter of a "change rate revision" associated with a given change rate parameter is also received. Given the same change rate parameter, different change rate revision values can be used to generate different modified data streams that each differs from the original data stream by the same percentage specified by the change rate parameter.

At 2006, at least a subset of a plurality of data blocks associated with a data stream to modify is determined based at least in part on the change rate parameter and the change rate revision parameter. For example, an entire stream can be treated as a sequence of blocks (400 is an example) which repeat for the entire length of the stream. Within each sequence of blocks that make up the entire stream, a change rate is achieved and a corruption sequence and value are determined. Blocks sequences can be of any size: 1,000 blocks, 5,000 blocks, 4,000,000 blocks etc. However, the larger the block sequences are, the larger the data stream must be to maintain accuracy in the change rate achieved. A number of data blocks of the total number of data blocks of the original data stream to modify to correspond to the change rate parameter is determined. For example, if the desired change rate is 4% and each sequence of the original data stream includes 400 blocks, then 16 of the each 400 number of blocks must be corrupted to achieve a change rate of around 4% throughout the entire data stream.

In some embodiments, which data blocks (e.g., data blocks at which locations) of the data stream to modify may be determined by the change rate parameter and the change rate revision parameter. The change rate parameter and/or the change rate revision parameter can be mapped to one of multiple possible techniques of finding sets of data blocks to modify (or also referred to as "corrupt") in the data stream. The following tables, Tables 8a, 8b, 8c, and 8d illustrate the MS2 sequence with a change rate of 4% applied using a change rate revision value of zero ("R0") called MS2(CR4, R0). In the example, the data stream includes 400 blocks and so a total of 16 blocks in the merged data stream must be modified to achieve a change rate of 4%. A modified block is referred to as a "corrupted" block. The set of corrupted blocks is referred to as a corruption sequence. There are many possible techniques for determining which blocks in the data stream to corrupt. Four example techniques for determining which blocks in the data stream to corrupt are given below. Blocks containing a corruption are marked with an upper case "C". Each table illustrates example results of applying a different technique of determining which 16 blocks of 400 blocks are corrupted to achieve a 4% change rate.

Example 1: Uniform Distribution

Corruption sequence includes blocks at locations:
1, 26, 51, 76, 101, 126, 151, 176, 201, 226, 251, 276, 301, 326, 351, and 376.

TABLE 8a

| MS2(CR4, R0) | | | | | | | | | | | | | | | | | | | |
|---|---|---|---|---|---|---|---|---|---|---|---|---|---|---|---|---|---|---|---|
| C | B | B | B | B | B | B | B | B | B | B | B | B | B | B | B | B | B | B | B |
| B | B | B | B | B | C | B | B | B | B | B | B | B | B | B | B | B | B | B | B |
| B | B | B | B | B | B | B | B | B | B | C | B | B | B | B | B | B | B | B | B |
| B | B | B | B | B | B | B | B | B | B | B | B | B | B | B | C | B | B | B | B |
| B | B | B | B | B | B | B | B | B | B | B | B | B | B | B | B | B | B | B | B |
| C | B | B | B | B | B | B | B | B | B | B | B | B | B | B | B | B | B | B | B |
| B | B | B | B | B | C | B | B | B | B | B | B | B | B | B | B | B | B | B | B |
| B | B | B | B | B | B | B | B | B | B | C | B | B | B | B | B | B | B | B | B |
| B | B | B | B | B | B | B | B | B | B | B | B | B | B | B | C | B | B | B | B |
| B | B | B | B | B | B | B | B | B | B | B | B | B | B | B | B | B | B | B | B |
| C | B | B | B | B | B | B | B | B | B | B | B | B | B | B | B | B | B | B | B |
| B | B | B | B | B | C | B | B | B | B | B | B | B | B | B | B | B | B | B | B |
| B | B | B | B | B | B | B | B | B | B | C | B | B | B | B | B | B | B | B | B |
| B | B | B | B | B | B | B | B | B | B | B | B | B | B | B | C | B | B | B | B |
| B | B | B | B | B | B | B | B | B | B | B | B | B | B | B | B | B | B | B | B |
| C | B | B | B | B | B | B | B | B | B | B | B | B | B | B | B | B | B | B | B |
| B | B | B | B | B | C | B | B | B | B | B | B | B | B | B | B | B | B | B | B |
| B | B | B | B | B | B | B | B | B | B | C | B | B | B | B | B | B | B | B | B |
| B | B | B | B | B | B | B | B | B | B | B | B | B | B | B | C | B | B | B | B |
| B | B | B | B | B | B | B | B | B | B | B | B | B | B | B | B | B | B | B | B |

Example 2: Clustered Uniform Distribution

Corruption sequence includes blocks at locations:
1, 2, 3, 4, 101, 102, 103, 104, 201, 202, 203, 204, 301, 302, 303, and 304.

TABLE 8b

| MS2(CR4, R0) | | | | | | | | | | | | | | | | | | | |
|---|---|---|---|---|---|---|---|---|---|---|---|---|---|---|---|---|---|---|---|
| C | C | C | C | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| C | C | C | C | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| C | C | C | C | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| C | C | C | C | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |

Example 3: Random Distribution

Corruption sequence includes blocks at locations:
7, 37, 41, 85, 120, 140, 167, 180, 195, 240, 250, 256, 265, 271, 298, and 391.

TABLE 8c

| MS2(CR4, R0) | | | | | | | | | | | | | | | | | | | |
|---|---|---|---|---|---|---|---|---|---|---|---|---|---|---|---|---|---|---|---|
| B | B | B | B | B | B | C | B | B | B | B | B | B | B | B | B | B | B | B | B |
| B | B | B | B | B | B | B | B | B | B | B | B | B | B | B | B | C | B | B | B |
| C | B | B | B | B | B | B | B | B | B | B | B | B | B | B | B | B | B | B | B |

TABLE 8c-continued

MS2(CR4, R0)

| | | | | | | | | | | | | | | | | | | | |
|---|---|---|---|---|---|---|---|---|---|---|---|---|---|---|---|---|---|---|---|
| B | B | B | B | B | B | B | B | B | B | B | B | B | B | B | B | B | B | B | B |
| B | B | B | B | C | B | B | B | B | B | B | B | B | B | B | B | B | B | B | B |
| B | B | B | B | B | B | B | B | B | B | B | B | B | B | B | B | B | B | B | C |
| B | B | B | B | B | B | B | B | B | B | B | B | B | B | B | B | B | B | B | C |
| B | B | B | B | B | B | B | B | B | B | B | B | B | B | B | B | B | B | B | B |
| B | B | B | B | B | C | B | B | B | B | B | B | B | B | B | B | B | B | B | C |
| B | B | B | B | B | B | B | B | B | B | B | B | C | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | C |
| B | B | B | B | B | B | B | C | B | B | B | B | B | C | B | B | B | B | B | B |
| B | B | B | B | C | B | B | B | B | C | B | B | B | B | B | B | B | B | B | B |
| B | B | B | B | B | B | B | B | B | B | B | B | B | B | B | C | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | B | B | B | B | B | B | B | B | B | B | B |
| B | B | B | B | B | B | B | B | B | C | B | B | B | B | B | B | B | B | B | B |

Example 4: Clustered Random Distribution

Corruption sequence includes blocks at locations: 5, 6, 7, 118, 119, 240, 241, 254, 255, 256, 257, 302, 347, 348, 349, and 350.

TABLE 8d

MS2(CR4, R0)

| | | | | | | | | | | | | | | | | | |
|---|---|---|---|---|---|---|---|---|---|---|---|---|---|---|---|---|---|
| B | B | B | B | C | C | C | B | B | B | B | B | B | B | B | B | B | B |
| B | B | B | B | B | B | B | B | B | B | B | B | B | B | B | B | B | B |
| B | B | B | B | B | B | B | B | B | B | B | B | B | B | B | B | B | B |
| B | B | B | B | B | B | B | B | B | B | B | B | B | B | B | B | B | B |
| B | B | B | B | B | B | B | B | B | B | B | B | B | B | B | B | B | B |
| B | B | B | B | B | B | B | B | B | B | B | B | B | B | B | C | C | B |
| B | B | B | B | B | B | B | B | B | B | B | B | B | B | B | B | B | B |
| B | B | B | B | B | B | B | B | B | B | B | B | B | B | B | B | B | B |
| B | B | B | B | B | B | B | B | B | B | B | B | B | B | B | B | B | B |
| B | B | B | B | B | B | B | B | B | B | B | B | B | B | B | B | B | B |
| B | B | B | B | B | B | B | B | B | B | B | B | B | B | B | B | B | C |
| C | B | B | B | B | B | B | B | B | B | B | C | C | C | C | B | B | B |
| B | B | B | B | B | B | B | B | B | B | B | B | B | B | B | B | B | B |
| B | B | B | B | B | B | B | B | B | B | B | B | B | B | B | B | B | B |
| B | C | B | B | B | B | B | B | B | B | B | B | B | B | B | B | B | B |
| B | B | B | B | B | B | B | B | B | B | B | B | B | B | B | B | B | B |
| B | B | B | B | B | B | C | C | C | C | B | B | B | B | B | B | B | B |
| B | B | B | B | B | B | B | B | B | B | B | B | B | B | B | B | B | B |
| B | B | B | B | B | B | B | B | B | B | B | B | B | B | B | B | B | B |

In some embodiments, determining corruption sequences to achieve a given change rate for a given revision is based upon the change rate and revision values. In some embodiments, determining corruption sequences can also be based upon an additional factor called the "cluster rate" or "cluster probability," which affects how and if corrupted blocks are clustered. For a given change rate revision, change rate, and cluster factor, the same corruption sequence can always be generated. This means the exact same sequence of values can be reproduced at will at anytime, anywhere else for the same change rate and change rate revision values. It also means that any given sequence revision can be directly generated without requiring the generation of all preceding sequence revisions.

At 2008, a (next) data block of the at least subset of the plurality of data blocks to corrupt is determined, wherein the data block comprises a plurality of elements. Each data block from an identified corruption sequence is determined to be corrupted. The data block includes several elements, each of which is a subset of the bits of the data blocks. For example, each block can be seen as N elements. One way to corrupt/modify a block is to modify one or more of its elements. In other words, a deliberate corruption is introduced in a block of the data stream. For example, when two 32-bit based (4 byte) sequences (S1 and S2) are merged to generate an MS2 data stream, each element is 64-bits (8 bytes) and given a block size of 8 KiB each block has 1,024 elements. It is desired to determine in a predictable and deterministic manner what element or elements to modify in a block to corrupt the block and what corruption value to use to replace the element.

At 2010, an element of the plurality of elements to corrupt is determined based at least in part on the change rate revision parameter. For example, one or more specific elements of a data block to corrupt can be modified depending upon the received change rate revision value. The nomenclature for a revision is R<revision value>. For example, for R0, the 1st element in a block is modified, for R1 the 2nd element in a block is modified, and jumping to R1023, the last element in a block is modified. For R1024, the 1st element is modified but a changed corruption value is used. In other words, the element modified in a block is the element whose location is computed by the revision value modulo the number of elements (e.g., 1,024 modulo 1,024 is the zeroth or first element).

At 2012, a corruption value is determined based at least in part on the change rate revision parameter. At 2014, the element is set to the corruption value.

A corruption value is determined to replace at least one determined element of the data block to be corrupted. The following is an example technique of generating a corruption value:

As an example, in the MS2 sequence, each element is 64-bits (8 bytes) and therefore a corruption value "C" is 64-bits (8 bytes). A corruption value can be seen as 8 bytes labelled with a "c" followed by the byte index. All byte values default to zero.

| c1 | c2 | c3 | c4 | c5 | c6 | c7 | c8 |
|----|----|----|----|----|----|----|----|

Table 9, below, illustrates the contents of one block in the data stream to modify. Lower case "b" represents an unmodified element in block "B." Upper case "C" represents a modified element in block "B" with a corruption value of "c." The bytes of an element are indexed "1" through "8." "N" is the location of the element of block "B" that was determined to be corrupted (e.g., to replace the original value with a corruption value).

TABLE 9

| Element Locations | Bytes of Each Element | | | | | | | |
|---|---|---|---|---|---|---|---|---|
| 0 | b1 | b2 | b3 | b4 | b5 | b6 | b7 | b8 |
| 1 | b1 | b2 | b3 | b4 | b5 | b6 | b7 | b8 |
| 2 | b1 | b2 | b3 | b4 | b5 | b6 | b7 | b8 |
| ... | b1 | b2 | b3 | b4 | b5 | b6 | b7 | b8 |
| $N^{th}$ | c1 | c2 | c3 | c4 | c5 | c6 | c7 | c8 |
| ... | b1 | b2 | b3 | b4 | b5 | b6 | b7 | b8 |
| 1021 | b1 | b2 | b3 | b4 | b5 | b6 | b7 | b8 |
| 1022 | b1 | b2 | b3 | b4 | b5 | b6 | b7 | b8 |
| 1023 | b1 | b2 | b3 | b4 | b5 | b6 | b7 | b8 |

As an example, the eight bytes of the corruption value are determined as follows:

Use two bytes c1 and c2 to represent 40 bits of revision. Now we can represent $2^{16}*1,024=64$ MiB (~64 million) revisions for the same change rate. The top two bytes of the corruption value plus the location ($N^{th}$ position) of the corrupted element tells us the change rate revision being processed.

Use the next two bytes c3 and c4 to record the actual change rate. This allows the corrupted value to be different for each CR (change rate) combination which allows the CR to vary from $1/64_K$ % to 100%.

Use the next two bytes c5 and c6 to indicate what mode was used to distribute the corruption sequences: Uniform, Clustered Uniform, Random, or Clustered Random (as shown in Tables 8a, 8b, 8c, and 8d, above). This helps determine where the next corrupted element should be encountered for verification purposes.

Use the last two bytes c7 and c8 to store the XOR of the original two bytes from the stream. This provides a guaranteed way to corrupt the last two bytes but the original stream values can still be recovered and verified.

At 2016, it is determined whether there is at least one more data block of the at least subset of the plurality of data blocks to corrupt. In the event that there is at least one more data block to corrupt, control is returned to 2008. Otherwise, in the event that there are no more data blocks to corrupt, process 2000 ends.

As such, the concept of change rate revisions allows the generation of new sequences each with a given change rate. There are many techniques possible to achieve this. Below are two examples:

Example 1—Use the Same Corruption Sequence

That is, corrupt the same set of blocks, but corrupt with a different corruption value. For example, MS2(CR4,R0) used value C1 to corrupt the blocks in its corruption sequence, then the next sequence generation MS2(CR4,R1) uses a different value of C2 to corrupt the blocks in its corruption sequence. The change rate revision and change rate values affect the determination of the corruption value.

Example 2—Use a Different Corruption Sequence

That is, corrupt a different set of blocks. For example, the MS2(CR4,R0) corruption sequence is blocks 7, 37, 41, 85, 120, 140, 167, 180, 195, 240, 250, 256, 265, 271, 298, and 391, then the next sequence generation MS2(CR4,R1) corruption sequence is blocks 28, 45, 61, 99, 103, 142, 189, 194, 205, 229, 241, 253, 283, 301, 316, and 399. The change rate revision and change rate values affect the determination of the corruption sequence.

In some embodiments, the corruption sequences used may be repeatable. Repeatable corruption sequences mean that once several corruptions have been encountered, the entire corruption sequence can be deduced and the determinations can be made that all encountered corruptions were expected or unexpected. If corruptions are expected, then the locations and values of all remaining corruptions in the sequence are known and can be verified. Since the corruption sequence and values are known, the corruption values themselves can be verified. Unexpected corruptions and corruption values like unexpected data values are actual bona-fide errors in the sequence introduced externally.

A user or a computer program may desire to generate a modified data stream that differs from an original data stream by a percentage specified by the change rate because the original data stream and each modified data stream can be used together to perform testing, such as at a storage deduplication server. For example, a user who is assigned a seed value and a revision value can use the assigned seed value and the assigned revision value to generate a data stream. The user can further generate modified versions of that data stream corresponding to respective specified change rate values. An example of performing storage deduplication using a data stream and a modified version of that data stream is described below with FIG. 21.

Figure 21:
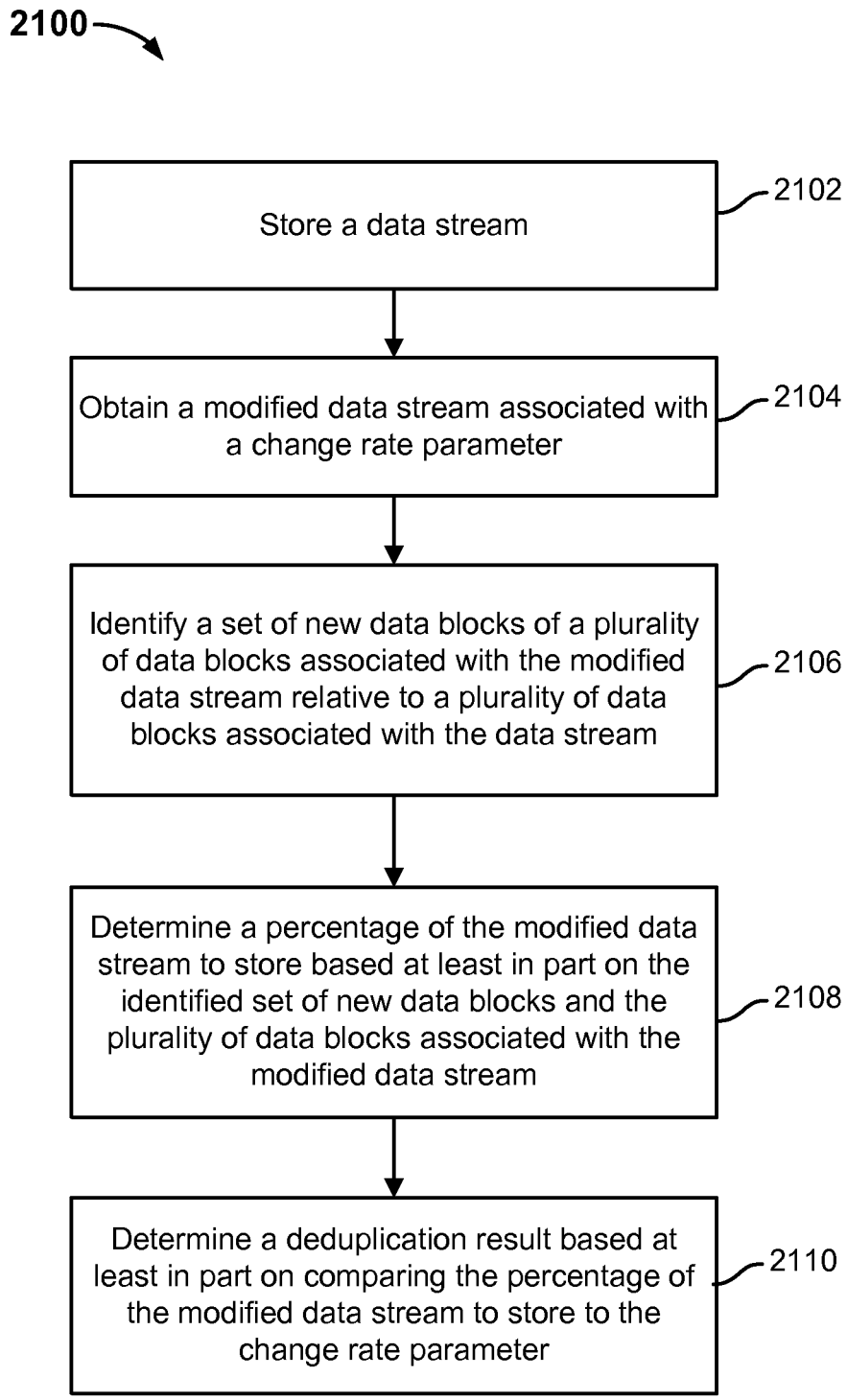
FIG. 21 is a flow diagram showing an embodiment of a process for performing storage deduplication using a data stream and a modified version of that data stream.

FIG. 21 is a flow diagram showing an embodiment of a process for performing storage deduplication using a data stream and a modified version of that data stream. In some embodiments, process 2100 is implemented at system 100 of FIG. 1. Specifically, in some embodiments, process 2100 is implemented at storage deduplication server 102 or quality assurance server 106 of system 100 of FIG. 1.

At 2102, a data stream is stored. In some embodiments, the stored data stream was generated using process 400 of FIG. 4. In some embodiments, the stored data stream comprises a non-compressible data stream that was generated using process 1200 of FIG. 12. For example, in the deduplication process, the data stream is segmented into data blocks of variable block sizes and each data block is compared against previously stored data. Assume that in the example of FIG. 21, all the data blocks identified from the data stream are new (e.g., not duplicates of previously stored data) and therefore, the entire data stream (all data blocks thereof) is stored (e.g., as part of a test backup operation).

At 2104, a modified data stream associated with a change rate parameter is obtained. In some embodiments, a change rate parameter (e.g., a percentage) has been received (e.g., via user input) and a modified data stream is generated using the change rate and the data stream using a process such as process 1900 of FIG. 19 or process 2000 of FIG. 20.

At 2106, a set of new data blocks of a plurality of data blocks associated with the modified data stream is identified relative to a plurality of data blocks associated with the data stream. In the deduplication process, only the data blocks of the modified data stream that are identified as not having been previously stored (e.g., at the test backup storage location) and are therefore a set of new data blocks, are stored. For example, in the deduplication process, the modified data stream is segmented into data blocks of variable block sizes and each data block is compared against previously stored data and only those data blocks that are not duplicates of previously stored data are determined as new data to be stored. For the data blocks that are duplicates of previously stored data, references to the storage locations of those previously stored data blocks are stored instead of the actual data blocks. In the example of FIG. 21, it is assumed that the only data that has been previously stored at the test backup storage location is the original data stream stored at step 2102.

At 2108, a percentage of the modified data stream to store is determined based at least in part on the identified set of new data blocks and the plurality of data blocks associated with the modified data stream. In some embodiments, a percentage of the modified data stream to store is determined as a ratio of the size of the identified set of new data blocks to the total size of the modified data stream.

At 2110, a deduplication result is determined based at least in part on comparing the percentage to the change rate parameter. Given that in this example, all of the data blocks of the original data stream have been stored (e.g., at a test backup location) prior to storing the modified data stream, if the deduplication techniques used are effective, then the percentage of the modified data stream to store should correspond to the specified change rate associated with the modified data stream. How close the percentage of the modified data stream to store and the percentage specified by the change rate are can determine how well the utilized deduplication techniques appear to work, which can be described as a deduplication result. For example, if the percentage of the modified data stream to store and the percentage specified by the change rate are the same or substantially similar, then it can be assumed that the utilized deduplication techniques appear to be effective. Otherwise, if the percentage of the modified data stream to store and the change rate are not similar, then it can be assumed that the utilized deduplication techniques appear to be not effective.

A user who performs quality assurance can therefore use a process such as process 2100 to test various modified streams of data determined by modifying an original data stream by corresponding specified change rates.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
store an unmodified non-deduplicatable data stream, wherein the non-deduplicatable data stream comprises a non-compressible data stream and wherein the processor is further configured to generate the non-compressible data stream at least in part by:
receive an initialization parameter;
determine a first constrained prime number, wherein the first constrained prime number comprises a plurality of component values, wherein each of the plurality of component values comprises a prime number wherein each of the plurality of component values is different;
generate a first non-compressible sequence based at least in part on the initialization parameter and the first constrained prime number;
obtain a second non-compressible sequence, wherein the second non-compressible sequence is associated with the initialization parameter and a second constrained prime number; and
generate the non-compressible data stream including by merging the first non-compressible sequence and the second non-compressible sequence;
receive a change rate parameter, wherein the change rate parameter indicates an amount by which the unmodified non-deduplicatable data stream is to be modified; and
generate a modified data stream that differs from the unmodified non-deduplicatable data stream by the amount indicated by the change rate parameter wherein to generate the modified data stream, the processor is further configured to modify at least a portion of a plurality of data blocks associated with the non-deduplicatable data stream to obtain a corresponding portion of the modified data stream, wherein a data block of the plurality of data blocks is associated with a block size that is based on a segmenting attribute associated with a storage destination;
identify a set of new data blocks, wherein the set of new data blocks are identified based on comparing the unmodified non-deduplicatable data stream with the modified data stream;
determine a percentage of the modified data stream to store;
determine a deduplication result based on comparing the determined percentage to the change rate parameter; and
in response to determining that the determined percentage does not match the change rate parameter, reconfigure a deduplication technique; and
a memory coupled to the processor and configured to store the change rate parameter.

2. The system of claim 1, wherein the processor is further configured to:
receive an initialization parameter; and
use the initialization parameter to generate the non-deduplicatable data stream comprising a merge of a first sequence and a second sequence, wherein the first sequence is generated using a first prime number and the initialization parameter and the second sequence is generated using a second prime number and the initialization parameter.

3. The system of claim 2, wherein the first prime number and the second prime number are selected based at least in part on a revision parameter.

4. The system of claim 1, wherein the first constrained prime number and the second constrained prime number are selected based at least in part on a revision parameter.

5. The system of claim 1, wherein the change rate parameter comprises one or more of the following: a percentage, a proportion, and a value in between 0 and 1.

6. The system of claim 1, wherein the segmenting attribute associated with the storage destination comprises a range of block sizes used by the storage destination.

7. The system of claim 6, wherein the block size is determined based at least in part on an average block size of the range of block sizes used by the storage destination.

8. The system of claim 1, wherein to modify the at least portion of the plurality of data blocks associated with the non-deduplicatable data stream the processor is further configured to change at least one value associated with one location within a data block associated with the non-deduplicatable data stream.

9. The system of claim 1, wherein the processor is further configured to receive a change rate revision parameter corresponding to the change rate parameter and wherein to modify the at least portion of the plurality of data blocks associated with the non-deduplicatable data stream the processor is further configured to:
determine the at least portion of the plurality of data blocks associated with the non-deduplicatable data stream to modify based at least in part on the change rate parameter and the change rate revision parameter;
determine a first data block of the at least portion of the plurality of data blocks to corrupt, wherein the first data block comprises a plurality of elements;
determine an element of the plurality of elements to corrupt based at least in part on the change rate revision parameter;
determine a corruption value based at least in part on the change rate revision parameter; and
set the element to the corruption value.

10. The system of claim 9, wherein the non-deduplicatable data stream is configured to be stored and wherein the set of new data blocks of a plurality of data blocks associated with the modified data stream is identified relative to the plurality of data blocks associated with the unmodified non-deduplicatable data stream.

11. The system of claim 10, wherein a new data block from the set of new data blocks is determined to include the corruption value and wherein the change rate parameter and the change rate revision parameter are determined using at least in part a portion of the corruption value.

12. The system of claim 11, wherein the processor is further configured to:
receive data associated with the identified set of new data blocks;
determine the percentage of the modified data stream to store based at least in part on the identified set of new data blocks and the plurality of data blocks associated with the modified data stream; and
determine a deduplication result based at least in part on comparing the percentage of the modified data stream to store to the change rate parameter.

13. The system of claim 10, wherein the processor is further configured to:
receive restored data associated with the non-deduplicatable data stream;
determine a first prime number based at least in part on a difference between a first pair of non-consecutive values from the restored data associated with the non-deduplicatable data stream;
determine a second prime number based at least in part on a difference between a second pair of non-consecutive values from the restored data associated with the non-deduplicatable data stream; and
use the first prime number and the second prime number to verify the restored data associated with the non-deduplicatable data stream.

14. A method, comprising:
storing an unmodified non-deduplicatable data stream, wherein the non-deduplicatable data stream comprises a non-compressible data stream, wherein the non-compressible data stream is generated at least in part by:
receiving an initialization parameter;
determining a first constrained prime number, wherein the first constrained prime number comprises a plurality of component values, wherein each of the plurality of component values comprises a prime number, wherein each of the plurality of component values is different;
generating a first non-compressible sequence based at least in part on the initialization parameter and the first constrained prime number;
obtaining a second non-compressible sequence, wherein the second non-compressible sequence is associated with the initialization parameter and a second constrained prime number; and
generating the non-compressible data stream including by merging the first non-compressible sequence and the second non-compressible sequence;
receiving a change rate parameter, wherein the change rate parameter indicates an amount by which the unmodified non-deduplicatable data stream is to be modified; and
generating, by a processor, a modified data stream that differs from the unmodified non-deduplicatable data stream by the amount indicated by the change rate parameter wherein generating the modified data stream includes modifying at least a portion of a plurality of data blocks associated with the non-deduplicatable data stream to obtain a corresponding portion of the modified data stream, wherein a data block of the plurality of data blocks is associated with a block size that is based on a segmenting attribute associated with a storage destination;
identifying a set of new data blocks, wherein the set of new data blocks are identified based on comparing the unmodified non-deduplicatable data stream with the modified data stream;
determining a percentage of the modified data stream to store;
determining a deduplication result based on comparing the determined percentage to the change rate parameter; and
in response to determining that the determined percentage does not match the change rate parameter, reconfiguring a deduplication technique.

15. The method of claim 14, wherein modifying the at least portion of the plurality of data blocks associated with the non-deduplicatable data stream includes changing at least one value associated with one location within a data block associated with the non-deduplicatable data stream.

16. The method of claim 14 further comprising receiving a change rate revision parameter corresponding to the change rate parameter and wherein modifying the at least portion of the plurality of data blocks associated with the non-deduplicatable data stream includes:

determining the at least portion of the plurality of data blocks associated with the non-deduplicatable data stream to modify based at least in part on the change rate parameter and the change rate revision parameter;

determining a first data block of the at least portion of the plurality of data blocks to corrupt, wherein the first data block comprises a plurality of elements;

determining an element of the plurality of elements to corrupt based at least in part on the change rate revision parameter;

determining a corruption value based at least in part on the change rate revision parameter; and setting the element to the corruption value.

17. The method of claim 16, wherein the non-deduplicatable data stream is configured to be stored and wherein the set of new data blocks of a plurality of data blocks associated with the modified data stream is identified relative to the plurality of data blocks associated with the unmodified non-deduplicatable data stream.

18. The method of claim 17, wherein a new data block from the set of new data blocks is determined to include the corruption value and wherein the change rate parameter and the change rate revision parameter are determined using at least in part a portion of the corruption value.

19. The method of claim 18 further comprising:

receiving data associated with the identified set of new data blocks;

determining the percentage of the modified data stream to store based at least in part on the identified set of new data blocks and the plurality of data blocks associated with the modified data stream; and determining a deduplication result based at least in part on comparing the percentage of the modified data stream to store to the change rate parameter.

20. A computer program product, the computer program product embodied in a non-transitory computer readable storage medium and comprising computer instructions for:

storing an unmodified non-deduplicatable data stream, wherein the non-deduplicatable data stream comprises a non-compressible data stream and wherein the non-compressible data stream is generated at least in part by:

receiving an initialization parameter;

determining a first constrained prime number, wherein the first constrained prime number comprises a plurality of component values, wherein each of the plurality of component values comprises a prime number wherein each of the plurality of component values is different;

generating a first non-compressible sequence based at least in part on the initialization parameter and the first constrained prime number;

obtaining a second non-compressible sequence, wherein the second non-compressible sequence is associated with the initialization parameter and a second constrained prime number; and generating the non-compressible data stream including by merging the first non-compressible sequence and the second non-compressible sequence;

receiving a change rate parameter, wherein the change rate parameter indicates an amount by which the unmodified non-deduplicatable data stream is to be modified; and generating a modified data stream that differs from the unmodified non-deduplicatable data stream by the amount indicated by the change rate parameter wherein generating the modified data stream includes modifying at least a portion of a plurality of data blocks associated with the non-deduplicatable data stream to obtain a corresponding portion of the modified data stream, wherein a data block of the plurality of data blocks is associated with a block size that is based on a segmenting attribute associated with a storage destination;

identifying a set of new data blocks, wherein the set of new data blocks are identified based on comparing the unmodified non-deduplicatable data stream with the modified data stream;

determining a percentage of the modified data stream to store;

determining a deduplication result based on comparing the determined percentage to the change rate parameter; and in response to determining that the determined percentage does not match the change rate parameter, reconfiguring a deduplication technique.

* * * * *

UNITED STATES PATENT AND TRADEMARK OFFICE
CERTIFICATE OF CORRECTION

PATENT NO. : 10,114,832 B1
APPLICATION NO. : 14/489363
DATED : October 30, 2018
INVENTOR(S) : Salil Dangi et al.

Page 1 of 1

It is certified that error appears in the above-identified patent and that said Letters Patent is hereby corrected as shown below:

In the Specification

In Column 22, Line 13, delete "prime)" and insert --prime1--, therefor.
In Column 22, Line 19, delete "value?" and insert --value7--, therefor.

In the Claims

In Column 50, Claim 20, Line 23, delete "parameter" and insert --parameter,--, therefor.

Signed and Sealed this
Twenty-sixth Day of February, 2019

Andrei Iancu
*Director of the United States Patent and Trademark Office*